United States Patent [19]
Ohsawa

[11] Patent Number: 4,944,034
[45] Date of Patent: Jul. 24, 1990

[54] GEOMETRIC PROCESSING SYSTEM

[75] Inventor: Akira Ohsawa, Higashimurayama, Japan

[73] Assignee: Hitachi, Ltd., Tokyo, Japan

[21] Appl. No.: 867,154

[22] Filed: May 27, 1986

[30] Foreign Application Priority Data

| May 24, 1985 | [JP] | Japan | 60-110346 |
| Jun. 5, 1985 | [JP] | Japan | 60-120401 |
| Jun. 28, 1985 | [JP] | Japan | 60-140301 |

[51] Int. Cl.$^5$ .............................................. G06F 3/14
[52] U.S. Cl. ................................... 364/522; 364/521; 340/747; 340/750
[58] Field of Search ............... 364/521, 522, 518, 512, 364/513, 474.29; 340/747, 790, 728, 729; 382/56, 65, 16, 19, 22, 25, 36, 37, 38

[56] References Cited

U.S. PATENT DOCUMENTS

| 4,730,261 | 3/1988 | Smith | 364/521 |
| 4,748,572 | 5/1988 | Latham | 364/518 |
| 4,758,965 | 7/1988 | Liang et al. | 364/518 |

OTHER PUBLICATIONS

The Use of Objects' Faces in Interpreting Line Drawings, Ruth Shapira–IEEE Transaction an Pattern Analysis, 11/84.
Computer Linguistic Analysis of Line Drawings-Gotchev, Pattern Recognition, vol. 17, No. 4, pp. 433-440, 1984.
Shape Description Using Weighted Symmetric Axis Features, Blum et al., Pattern Recognition and Image Processing, 6/77.
Cases in Scene Analysis–Brown et al.,–Pattern Recognition, pp. 205-228, 1978.

*Primary Examiner*—Gary V. Harkcom
*Assistant Examiner*—Phu K. Nguyen
*Attorney, Agent, or Firm*—Antonelli, Terry, Stout & Kraus

[57] ABSTRACT

In the proposed geometric processing system geometry and space are partitioned into a plurality of subspaces by virtual partitioning lines passing characteristic points of the geometry and geometric sides. Pointers are respectively set for the characteristic points on the left and right side of each subspace. These two pointers set in one subspace point to each other. Each subspace is represented by such a pair of pointers. Based on the above-mentioned partition method, a plurality of subspaces are then adjacent to each characteristic point. Pointers for each characteristic point are grouped so that they correspond to each characteristic point on a one to one basis. This geometric processing system includes a data bse comprising data grouped in such a way. The propsed geometric/graphic data structure enables high-speed geometric processing for a wide range of applications including LSI/VLSI design.

29 Claims, 40 Drawing Sheets

FIG. 4(b)
| V/C | KIND | ATTR. | POINTER | ADDR($b_2\ b_1\ b_0$) |
|---|---|---|---|---|
| 1 | (+EP) | E-ATR | $EP_0$ | 0(000) |
| 1 | (SA) | SA-ATR | $SA_{0.1}$ | 1(001) |
| 1 | (−EP) | E-ATR | $EP_1$ | 2(010) |
| 1 | (SP) | ($SP^r$) | $SP^r_{1.0}$ | 3(011) |
| 1 | ($SA^c$) | V-ATR | $SA^c_{1.0}$ | 4(100) |
| 1 | (SP) | ($SP^L$) | $SP^L_{1.0}$ | 5(101) |
| | | | x | 6(110) |
| | | | y | 7(111) |
(table 21)
FIG. 4(c)
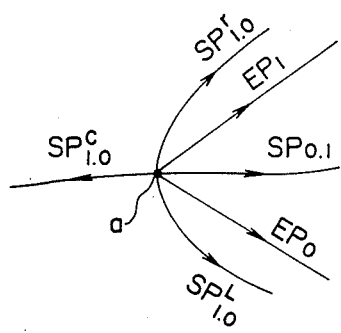
FIG. 4(d)
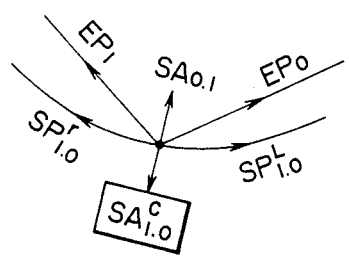

(i)

(ii)

- ① KIND ; POINTER CLASSIFICATION CODE
- ② $Z_{max}$ ; OVERLAPPED MAXIMUM VALUE OF SP OR FP IN Z DIRECTION
- ③ SA ; SP FOR INDICATING SPACE ATTRIBUTION $SA_{ij}^z$ ; SA COUNTED TO THE ORDER Z FROM THE HEAD IN Z DIRECTION, AND PLACED BETWEEN $EP_i$ AND $FP_j$ $FA_{ij}^z$ ; FP FOR INDICATING ATTRIBUTION OF SURFACE

FIG. 14(c)

| CLASSI-FICATION | EXAMPLE OF FORMS | | | EXISTENCE OF SYMMETRICAL FORMS |
|---|---|---|---|---|
| | NO. | BEFORE EVENT Ej | AFTER EVENT Ej | |
| PASSING $B_X$ | 1 | | | $\pm X$ <br> $\pm Y$ |
| | 2 | | | $\pm X$ <br> $\pm Y$ |
| | 3 | | | $\pm X$ <br> $\pm Y$ |
| PASSING $B_Y$ | 4 | | | $\pm X$ <br> $\pm Y$ |
| START POINT OF EDGE $\overrightarrow{ait}$ | 5 | | | $\pm X$ |
| | 6 | | | TOTAL 7 FORMS INCLUDING THE LEFT SIDE FOUR FORMS EACH $\pm X, \pm Y$ |
| | 7 | | | |
| END POINT OF EDGE $\overrightarrow{ait}$ | 8 | | | $\pm X$ |
| | 9 | | | TOTAL 7 FORMS INCLUDING THE LEFT SIDE FOUR FORMS EACH $\pm X, \pm Y$ |
| | 10 | | | |

BEFORE PASSING THE SURFACE Bz

AFTER PASSING THE SURFACE Bz

REGARD AS A LINE INCLINED TO RIGHT OR LEFT SIDE

REGARD AS TWO POINTS WHICH ONE IS PLACED AT RIGHT SIDE TO OTHERS

REGARD AS TWO LINES SEPARATED WITH EACH OTHER

PASSING POINT OF THE CORNER

TABLE OF CHARACTERISTIC POINT

CROSSING POINT OF THE THREE SURFACES

TABLE OF CHARACTERISTIC POINT

GEOMETRIC PROCESSING SYSTEM

BACKGROUND OF THE INVENTION

The present invention relates to a geometric processing system, and in particular, to a data base system for geometric/graphic processing in which geometric/graphic data can be efficiently processed at a high speed by use of a local processing when executing the geometric/graphic processing in a computer.

Examples of geometric/graphic processing include the design of LSI/VLSI, logic circuits, car bodies, buildings, machines, and plants, computer aided design (CAD) using the computer graphics technology, object analysis on data from satellites, and graphic analysis adopted in the medical field.

For example, in a CAD system to design LSI's, machines, buildings, and plants through a geometric processing, the size of geometry to be processed often becomes great, namely, the total number of the necessary elements is $10^4$–$10^7$. Specifically, the amount of data to be processed is considerably increased in a data processing system in which the processing must be effected on each data item related to the pertinent data. Moreover, the processing time elapsed in the computer increases as the value N becomes greater in such cases. Although the processing is possible in principle, the processing time is beyond the allowable range in the practical data processing, and hence the processing may become impossible in some cases.

One of the reasons why such a processing cannot be executed is that all the geometric data is processed even when the geometric processing essentially handles relationships between adjacent geometric items or manipulates overlapped items between geometric data. This is because special information related to the adjacent geometric data is not contained in the geometric data base. That is, even when only a portion of geometric data is to be locally processed, the data processing must be effected on all the geometric data. As a result, the processing other than the local processing required for the necessary portion must be executed.

There has been developed a system in which the geometric processing is performed with the specific information related to the adjacent geometric data stored in advance so as to avoid the difficulty. In such a system, however, the geometric shape is limited; furthermore, the amount of data is increased and the processing time accordingly becomes longer. Consequently, this scheme does not solve the problem described above.

Such a difficulty leads to a greater problem in a case of three-dimensional geometric processing in which the amount of data is considerably increased.

SUMMARY OF THE INVENTION

It is therefore an object of the present invention to provide a geometric processing system which is capable of locally processing geometric or graphic data so as to achieve an efficient data processing at a high speed.

Another object of the present invention is to provide a geometric processing system which is capable of partially processing three-dimensional geometric or graphic data so as to achieve an efficient data processing at a high speed.

Another object of the present invention will become apparent from the following detailed description taken in conjunction with the accompanying drawings.

Briefly, the present invention is characterised as follows. A geometry and a space including the geometry are partitioned into subspaces, which are then represented by pairs of pointers, respectively. Adjacent geometric data and overlapped geometric data are retrieved and processed by use of the pertinent pointers, which implements an efficient processing at a high speed.

More concretely, the geometry and the space in which the geometry is placed are partitioned by use of lines passing characteristic points such as vertices so that a subspace thus obtained is defined by a pair of characteristic points on both sides enclosing the subspace.

As a result, a subspace can be retrieved with a characteristic point pair, and hence the geometric processing can be effected on a portion of the geometry; for example, a processing on adjacent geometric data can be achieved as a local processing.

In short, the processing such as the processing of relationships between adjacent geometric data, retrieval on overlapped three-dimensional geometric data, logical processing such as AND and OR processing between three-dimensional geometric data, and processing of a concealed surface can be effectively accomplished, thereby implementing a high-speed geometric processing.

BRIEF DESCRIPTION OF THE DRAWINGS

The present invention will be apparent from the following detailed description taken in conjunction with the accompanying drawings in which:

FIG. 2 (b) is a flowchart of processing of an interpreter program in a space data processing unit of the geometric processing system;

FIG. 2 (c) is a processing flowchart of a program control section in a central processing unit thereof;

FIG. 3 (b) is a schematic diagram depicting a fundamental procedures for partitioning a space in the system;

FIG. 4 (b) is an explanatory diagram illustrating a concrete example of end points in other than the X direction in the characteristic point table;

FIG. 4 (c) is a schematic diagram corresponding to the two-dimensional table of FIG. 4 (a);

FIG. 4 (d) is an explanatory diagram corresponding to the table of FIG. 4 (b);

FIG. 4 (e) is a schematic diagram showing codes in the tables;

FIG. 4 (f) is an explanatory diagram of an example depicting a concrete configuration of each data in the tables;

FIG. 4 (g) is a schematic diagram showing a case where the space attribute cannot be set;

FIG. 5. (b) is an explanatory diagram of space pointer pairs to be generated for the geometric shapes;

FIG. 6 (b) is a schematic diagram showing relationships of space pointer pairs between three-dimensional geometric data;

FIG. 6 (c) is a schematic diagram explaining a concealed intersection in the three-dimensional representation;

FIG. 6 (d) is a diagram showing a projected result of the geometry of FIG. 6 (c) in the Z direction;

FIG. 8 (b) is an explanatory diagram of space data associated with a vertex of the geometry of FIG. 8 (a);

FIG. 9 (b) is a schematic diagram for explaining a concrete example of a characteristic table in the three-dimensional representation;

FIG. 9 (c) is an explanatory diagram of space data around a convex vertex V of a polygon;

FIG. 9 (d) is a diagram for explaining a characteristic table associated with data around the convex vertex V;

FIG. 10 (b) is a schematic diagram for explaining a characteristic table in a case where a concave space exists;

FIG. 11 (b) is an explanatory diagram of attributes in the diagram of FIG. 11 (a);

FIG. 12 (b) is a simplified diagram showing relationships of characteristic point tables in the case of FIG. 12 (a);

FIG. 14 (e) is a flowchart depicting a processing flow to generate geometric data of a point;

FIG. 14 (f) is a flowchart illustrating a processing flow to develop geometric data of an edge;

FIG. 16 (b) is a schematic diagram depicting a three-dimensional guidepost processing;

FIGS. 17 (d) and 17 (e) are diagrams for explaining procedures to generate edge pointer pairs in the respective conditions;

FIG. 17 (f) is an explanatory diagram of pointer pairs in a case of intersections;

FIG. 17 (g) is a schematic diagram for explaining procedures to generate space pointer pairs in a case where curves exist in portions of the geometry;

FIG. 18 (c) and 18 (d) are diagrams for respectively explaining the crossing point of the three surfaces and the characteristic point table;

DESCRIPTION OF THE PREFERRED EMBODIMENTS

A detailed description will be given of embodiments of the present invention with reference to the accompanying drawings.

Figure 1:
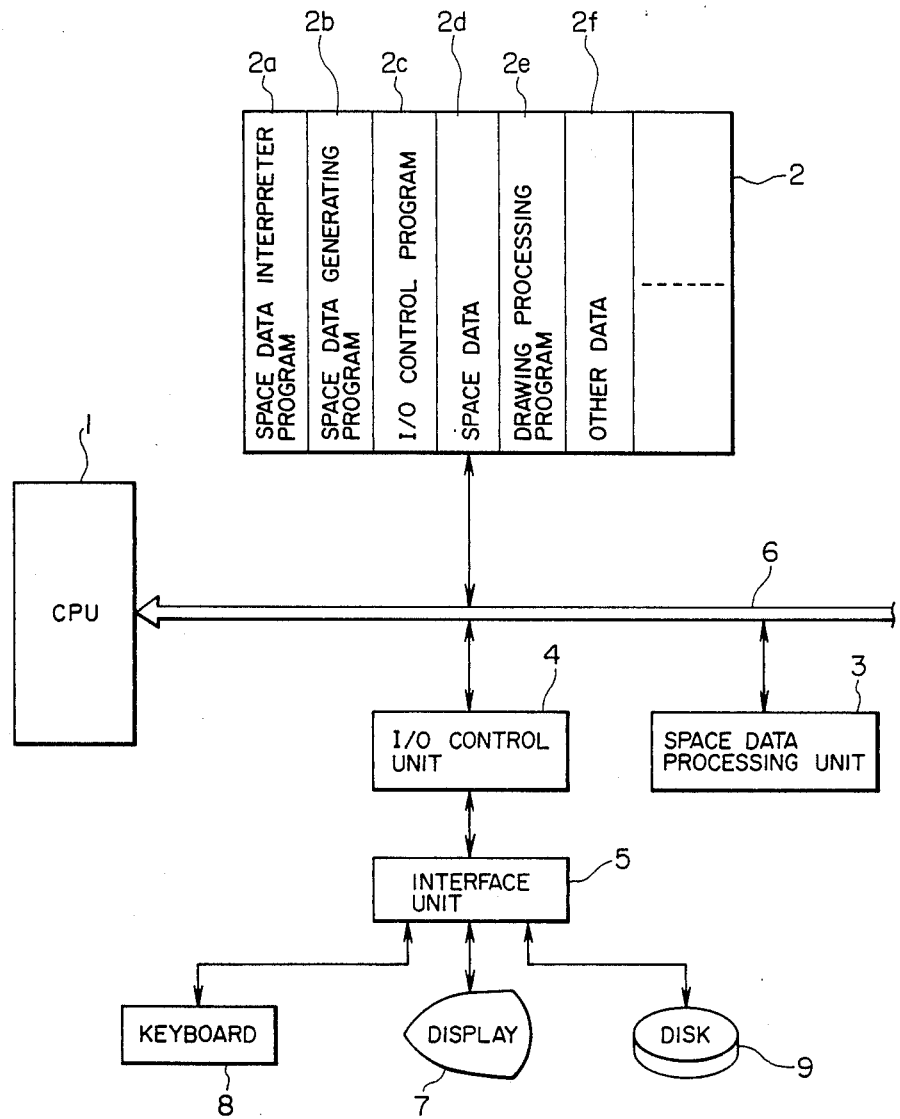
FIG. 1 is a schematic system block diagram showing a computer system to which the geometric processing system of the present invention is applied.

FIG. 1 is a block diagram of a computer system to which the geometric processing system of the present invention is applied.

This configuration includes a central pro-cessing unit (CPU) 1, a memory 2 thereof, a space data processing unit 3, an I/O control unit 4, an interface unit 5, a system bus 6, a display unit 7, a keyboard 8, and a magnetic disk storage unit (to be simply referred to as a disk herebelow) 9. The CPU 1, the memory 2, the space data processing unit 3, and the I/O control unit 4 are respectively interconnected by use of the system bus 6, thereby enabling data to be transferred therebetween. The I/O control unit 4 effects data exchange with the display unit 7, keyboard 8, and the disk 9 through the interface unit 5.

Figure 9A:
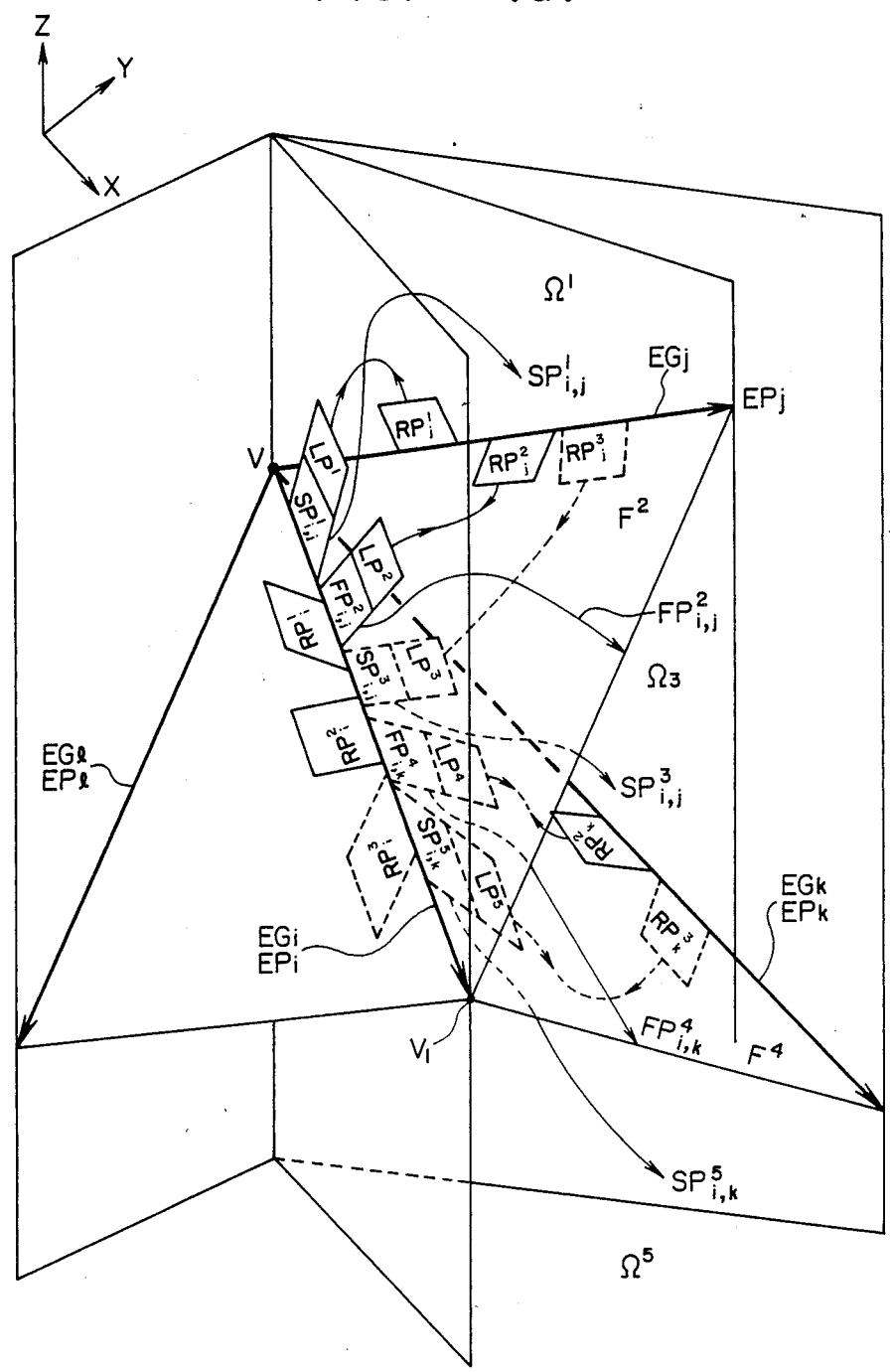
FIG. 9 (a) is a schematic diagram depicting relationships between the space data and the information for linking the data on the left and right sides.
Figure 9B:
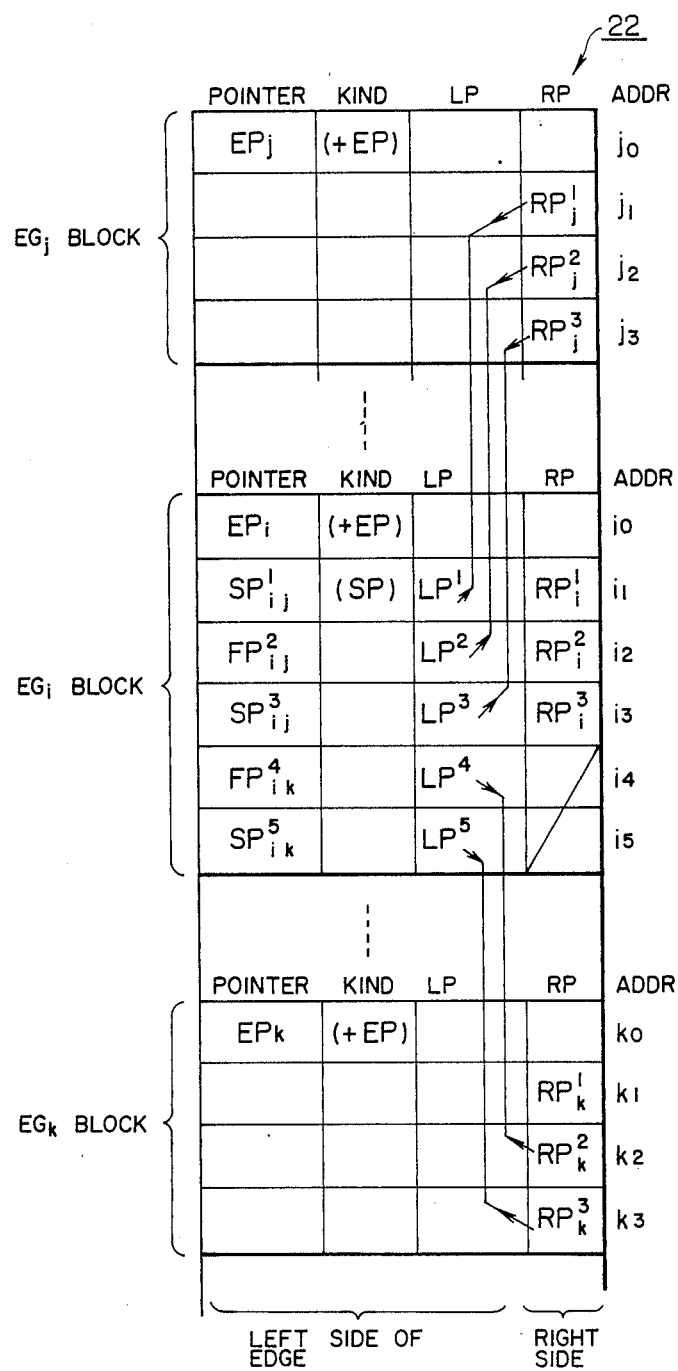
Figure 9C:
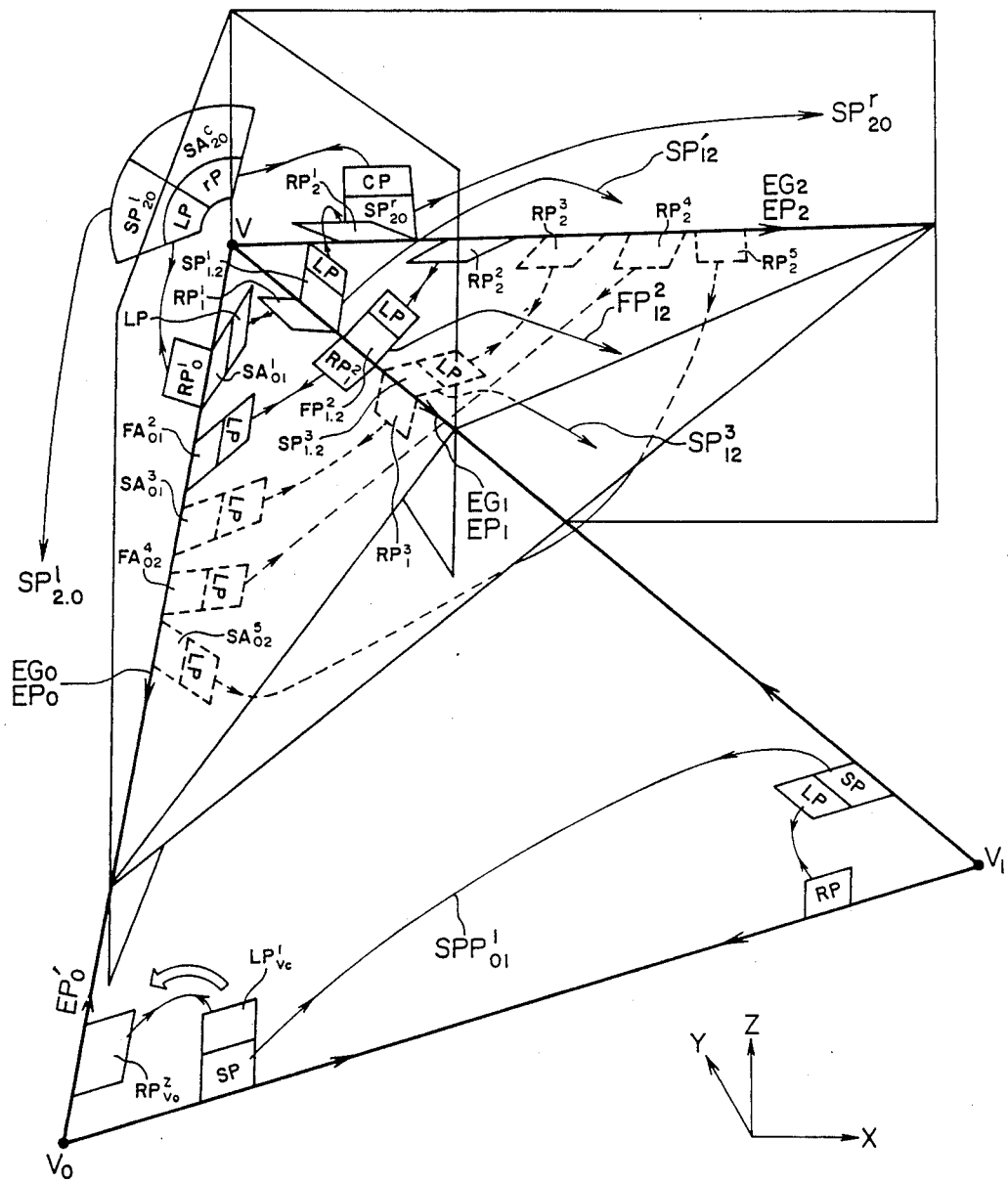
Figure 9D:
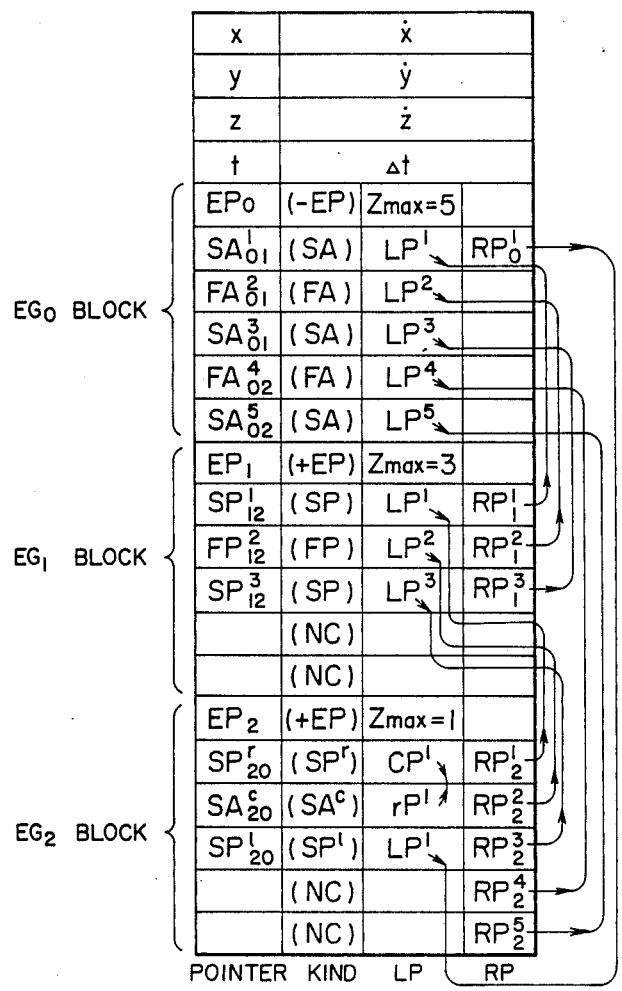

The memory 2 is commonly accessed from the CPU 1, the I/O control unit 4, and the space data processing unit 3. The memory 2 includes a space data interpreter program storage area 2a, a space data generating program storage area 2b, an I/O control program storage area 2c, a space data storage area 2d, a drawing processing program storage area 2e, and other data storage area 2f. In the space data storage area 2d, there are contained two-dimensional characteristic point tables 20–21 as shown in FIGS. 4 (a) and 4 (b) and a three-dimensional characteristic point table 22, as seen in FIG. 9(b), corresponding to the characteristic points (including those other than the vertices) of each geometry. The respective tables each contain information such as a space pointer pair (SPP) in the predetermined sequence. Such information items are referred to in accordance with the retrieval content.

The space data interpreter program storage area 2d of FIG. 1 contains an interpreter program for the space data processing unit 3. Based on the space data stored in the space data storage area 2d, the program generates geometric information to be processed by the CPU.

The space data generating program storage area 2b contains a drawing program to be executed in this computer system or processing program to form a predetermined space data (or a space pointer file, SPF) in a form of the two-dimensional characteristic point tables 20–21 as shown in FIGS. 4 (a) and 4 (b) and the characteristic point table 22 as shown in FIG. 9 (b).

According to the present invention, the concept for modeling a geometric figure is as follows. For easy understanding, the description will be first made of a two-dimensional geometry modeling. As will be clarified later, the three-dimensional or n-dimensional modeling is implemented as an extension of the two-dimensional modeling.

Figure 3A:
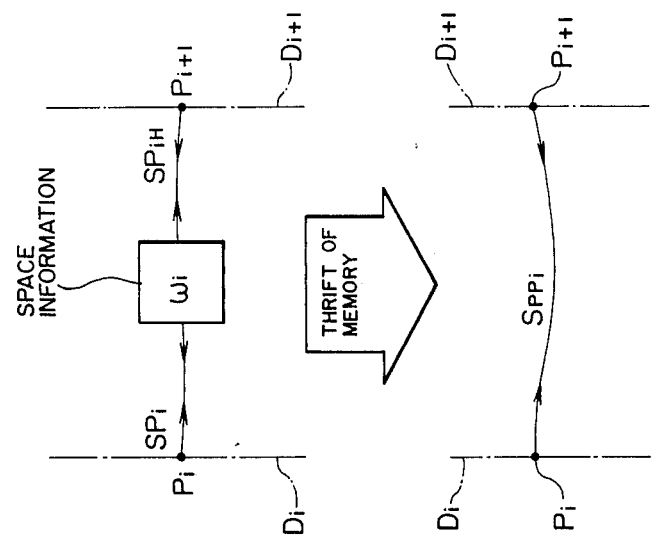
FIG. 3 (a) is a schematic diagram explaining the fundamental representation of a space data of the processing system.
Figures 3B, 4A:
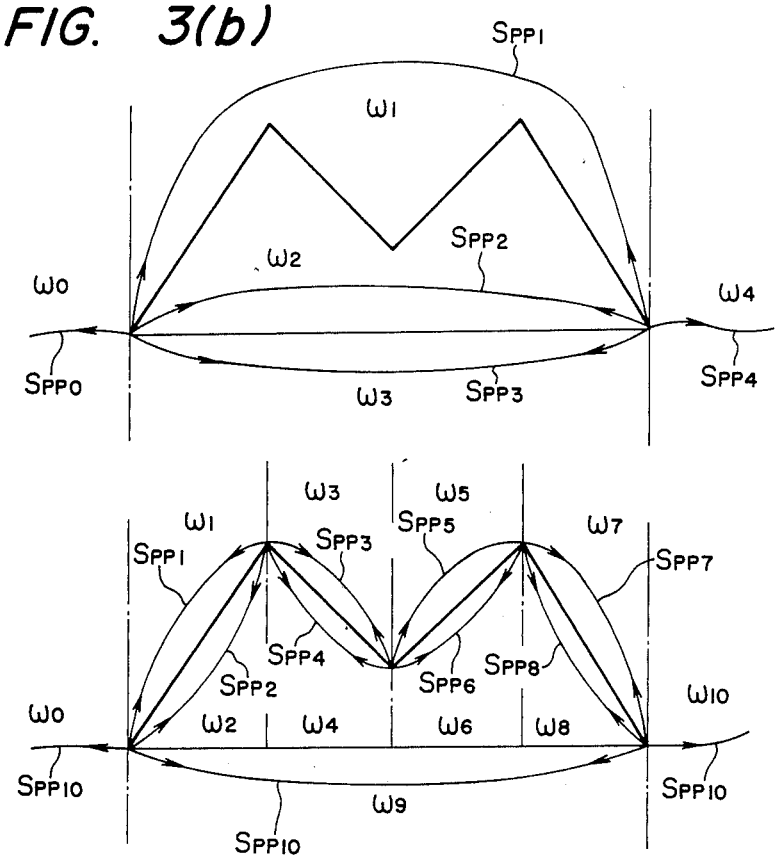
FIG. 4 (a) is an explanatory diagram illustrating a concrete example of X-directional end points in a two-dimensional characteristic point table.
Figure 4E:
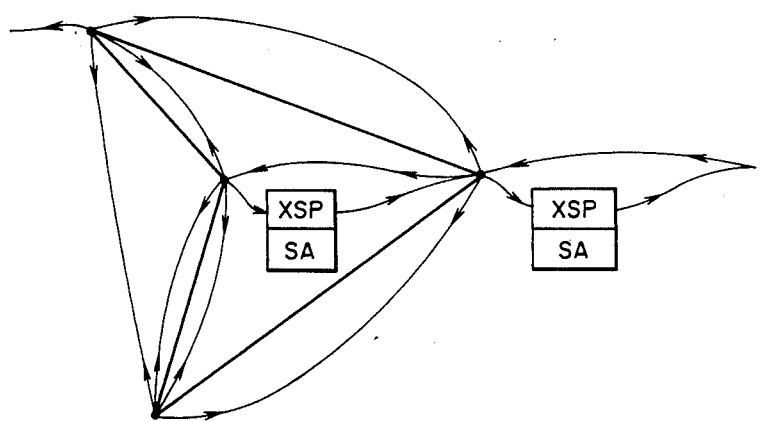

In a case of a two-dimensional geometric figure, characteristic points $P_i$ and $P_{i+1}$ to be set to appropriate positions on edges of the geometric figure are set as shown in FIG. 3 (a). The geometric space in which the geometric figure is located is assumed to be partitioned into a plurality of subspaces by virtual space dividing lines $D_i$ and $D_{i+1}$ passing the characteristic points $P_i$ and $P_{i+1}$, respectively and edges of the geometry. Space pointers $SP_i$ and $SP_{i+1}$ are assigned to the respective characteristic points, and the space pointers $SP_i$ and $SP_{i+1}$ corresponding to a subspace is set as a pair of space pointers each indicating the address of the associated space pointer. This pair is defined by a space pointer pair, $SPP_i$. A space $\omega i$ enclosed with the characteristic points $P_i$ and $P_{i+1}$ is represented by this space pointer pair.

Since a subspace $\omega i$ is treated as an item represented by a space pointer pair $SPP_i$ as described above, a geometric processing related to the space can be locally effected by use of the space pointer pair, which contributes a minimization of the amount of data to be processed and to the saving of memory areas. As will be clarified later, even in a case of a three-dimensional geometry, only the line partition is replaced with a surface partition, namely, the basic concept is the same.

A characteristic point $P_i$ can be set to an appropriate position on an edge of a geometric figure; furthermore an arbitrary number of characteristic points $P_i$ can be set. If the characteristic points are excessive, however, the size of the geometric data file must be necessarily increased.

To prevent the size of the geometric data file or the space pointer file from being increased, points protruding in the positive or negative X direction or vertices of the geometry are favorably set as characteristic points.

FIG. 3 (b) shows a concrete example in which such a geometric data processing is achieved. The two-dimensional geometry space is partitioned into a plurality of subspaces with the edges of the polygon DRW and partioning (dot-and-dash) lines. In the upper section of FIG. 3 (b), the characteristic points are set to the vertices on the right and left sides of the polygon; whereas in the lower section thereof, each vertex of this figure is set as a characteristic point. For example, if there does not exist any other geometric object to be drawn on the left or right side of DRW, the subspaces $\omega_0$ and $\omega_4$ on the left and right sides thereof are each assumed to be an unbounded subspace. To enable a pointer pair to be set to such an unbounded subspace, the respective external form lines in the X direction and the space partitioning lines are conceptually assumed to be placed at the negative and positive infinite positions, respectively. Similarly, the external form lines in the Y directions are assumed to be located at the negative and positive infinite positions, respectively. That is, in space pointer pairs SPP0 and SPP4 for unbounded subspaces $\omega_0$ and $\omega_4$, the space pointers of the associated components of the pairs respectively indicate the negative X value with the maximum absolute value and the negative Y value with the maximum absolute value, and the maximum positive X value and the maximum positive Y value in the geometry space. Similarly, in the lower section of FIG. 3 (b), unbounded subspaces $\omega_0$ and $\omega_{10}$ are associated with space pointers SPP0 and SPP10. In these pointer pairs, the space pointers of the respective components are assumed to indicate X and Y values substantially equal to $\pm \infty$, respectively. Naturally, when the overall geometry space is partitioned by X and Y external form lines each having an appropriate size, the space pointers for the subspaces regarded as substantially unbounded may be set so as to denote X and Y values indicated by the X and Y external form lines, respectively.

The space data storage area 2d contains various two- and three-dimensional space data items in the form of tables. The table format is not restricted. For example, characteristic tables 20 and 21 of FIGS. 4 (a) and 4 (b), respectively are typical in the two-dimensional representation; whereas, the characteristic tables of FIG. 9 (b) are representative as a three-dimensional space data tables. A plurality of these tables are stored in the space data storage area 2d. The space data, however, is not limited to storage in such a table form.

The space data processing unit 3 is accessed from the CPU 1 and executes the space data interpreter program to refer to the characteristic point tables 20–22. Although not particularly restricted, the space data processing unit 3 selects, based on an address accessed from the CPU 1, a kind of geometric processing to be accomplished, retrieves space data by use of the space data interpreter program, and interprets the data to generate the corresponding geometric data, and then the geometric data is transferred to the CPU 1.

On receiving the geometric data, the CPU 1 performs a predetermined geometric processing and activates the I/O control unit 4 of FIG. 1. As a result, for example, the data is transferred to and displayed on the display unit 7.

The I/O control unit 4 executes a predetermined I/O processing when the space data interpreter program is started by the space data processing unit 3 and an access is made by the CPU 1. That is, the I/O control unit 4 is used to transfer geometric data to the display unit 7 so as to display the data thereon or to transfer the geometric data to the disk 9 so as to store the data thereon. Furthermore, the I/O control unit 4 executes an interrupt processing on the CPU 1 and receives an interrupt signal from the CPU 1.

The I/O control program storage area 2c for the I/O control unit 4 includes various programs to be executed to communicate data between the I/O control unit 4 and the display unit 7, the disk 9, and the keyboard 8.

The processing described above and the following operation are basically the same for the two-, three-, and n-dimensional space data. The dimensional difference appears only as the discrepancy in the contents of the objective space data.

Figure 2A:
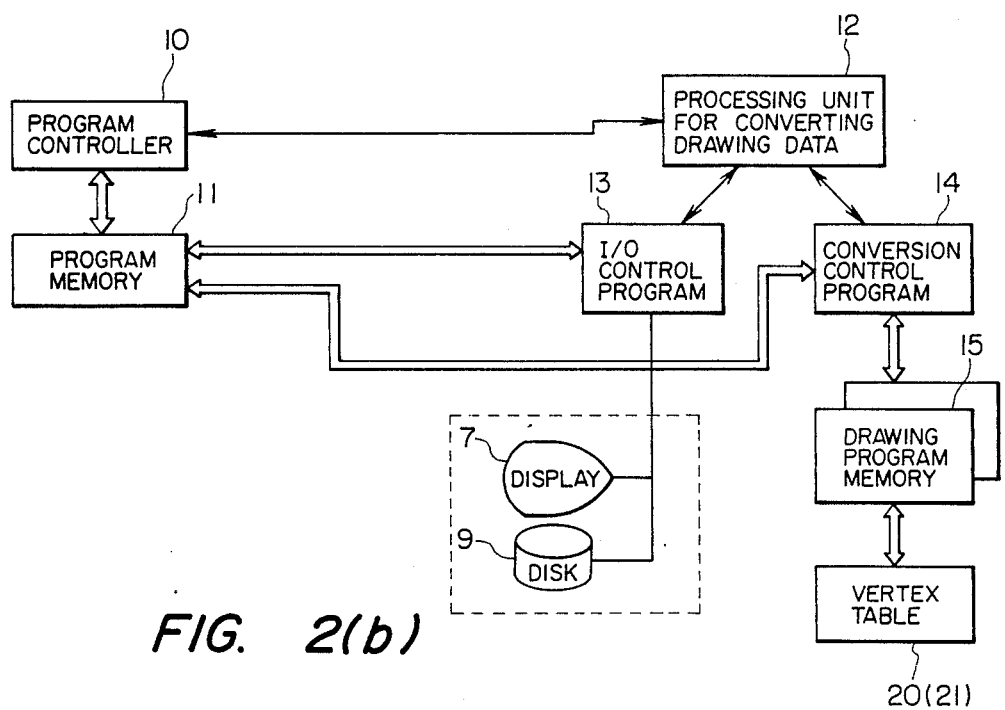
FIG. 2 (a) is a functional configuration diagram of geometric processing in the geometric processing system.
Figure 2B:
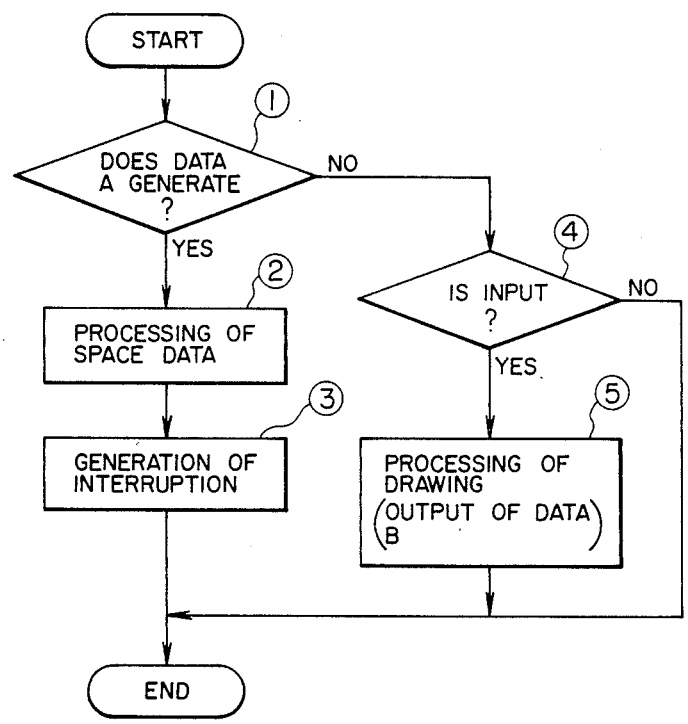
Figure 2C:
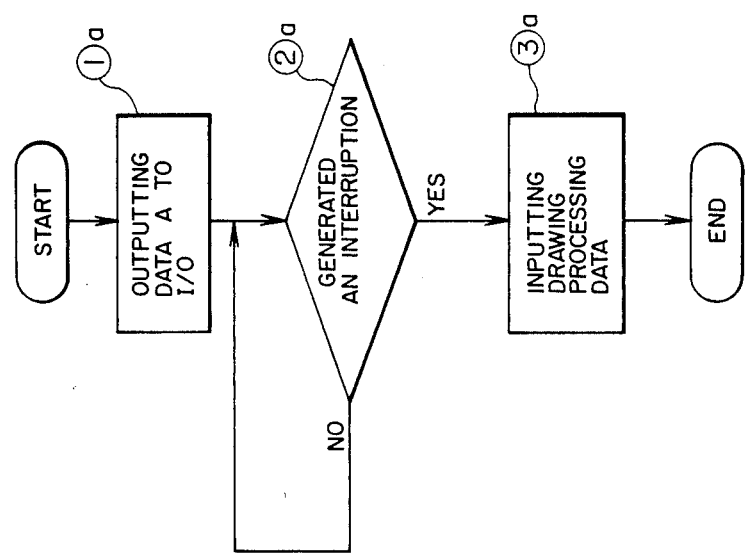

The overall operation of the space data will be next described according to FIG. 2 (a).

The geometric processing program or geometric data stored on the disk 9 is fetched into a specific storage area, for example, the geometric processing program area 2e of the memory 2 when a predetermined function key of the keyboard 7 is depressed. Next, when a key associated with the space data generating processing is pressed on the keyboard 8, control is passed from the CPU 1 to the space data processing unit 3, which in turn refers to the space data generating program storage area 2b. This causes the space data generating program to be started, and when a geometric processing program is executed as a result of the execution of the space data generating program, a geometric space data is generated.

After the generated space data is stored in the memory 2, the computer system operates as follows. Namely, the CPU 1 operates to start a geometric processing control program, which enables the CPU 1 to function as the program controller 10 of FIG. 2 (a). Moreover, the objective geometric processing program and the geometric data each stored in the geometric processing program storage area 2e serve as the geometric program memory 11 of FIG. 2 (a). Each instruction stored in the geometric program memory 11 is interpreted and executed by the program controller 10. When a corresponding geometric processing program is initiated, the space data processing unit 3 of FIG. 1 functions as the geometric data converting unit 12 in accordance with the instruction from the CPU 1.

As described above, the program controller 10 reads the geometric processing program from the program memory 11, interprets the content thereof, and executes processing associated with the interpreted content. In this processing, the program controller 10 passes control to the geometric data conversion processing section 12 at an occurrence of a partial geometric processing, for example, a search for an adjacent geometric data, a geometric overlap control, or a separation of a specified range of geometric data.

The geometric data conversion processing section 12 determines whether the instruction from the program controller 10 indicates the space data generating processing or the reference conversion processing due to the space data. According to the determination, the conversion processing section 12 starts the interpreter program or the space data generating program, thereby starting the pertinent control.

When the space data generating processing is found to be requested and the associated program for the processing is selected and executed, the characteristic point tables 20-22 as shown in FIGS. 4 (a) and (b) and FIG. 9 are generated corresponding to each vertex (or each selected characteristic point) based on the geometric data transferred from the control program 10.

On the other hand, the interpreter program performs an execution of a program associated with the space data instruction and a data transfer for the control program 10. In FIG. 2 (b), the interpreter program is stored in the conversion control program section 14 and the drawing program memory 15. The drawing program memory 15 is used to store therein a group of space data conversion programs for various retrieval processing related to the space data and for the data generation used in a partial processing such as a logic processing of geometry. For example, the conversion control program section 14, based on the access address, selects a group of space data conversion programs associated with the processing from the drawing program memory section 15.

The interpreter program is configured as shown in FIG. 2 (b). That is, step 1 of FIG. 2 (b) determines whether or not data A (or an instruction; this applies to the subsequent description) has been transferred from the program controller 10. If this is the case, step 2 executes the corresponding space data processing, for example. In step 3, an interruption for a program of the I/O control unit (FIG. 2 (c)) is caused. As a result of step 1, if it has been found that data A has not been transferred, processing of step 4 is executed. Step 4 determines whether or not an interruption has occurred. In step 5, geometric processing data B generated by the space data processing is output and is passed to the drawing processing program in the program controller 10 or the drawing program memory section 10.

The space data processing in step 2 is executed as follows. For the two-dimensional geometric processing, data such as the characteristic point tables 20-21 shown in FIGS. 4 (a) and 4 (b) are referred to; whereas, for the three-dimensional geometric processing, data such as the characteristic point table 22 of FIG. 9 (b) is referred to, thereby retrieving information including the associated space pointer pairs.

On the other hand, the program controller 10 operates as follows. That is, when the program controller 10 accesses the drawing data conversion unit 12 for the conversion control program section 14, step 1a of FIG. 2 (c) accesses a specific address of the memory to obtain data A, and then the data A is output to the drawing data conversion unit 12.

Next, control is passed to a wait loop in step 2a to await an interruption signal from the drawing data conversion unit 12. On receiving an interruption signal from the conversion unit 12, step 3a obtains as input data the drawing processing data B from the conversion unit 12 and passes the data B via the program controller 10 to the drawing processing program of the drawing program memory section 11. In this case, the drawing processing data B may be passed directly from the data conversion unit 12 to the drawing processing program.

The space data configuring the characteristic point table data of the two-dimensional geometric figure of FIG. 4 (a) will be concretely described with reference to FIGS. 5 (a) and 5 (b).

Figure 5A:
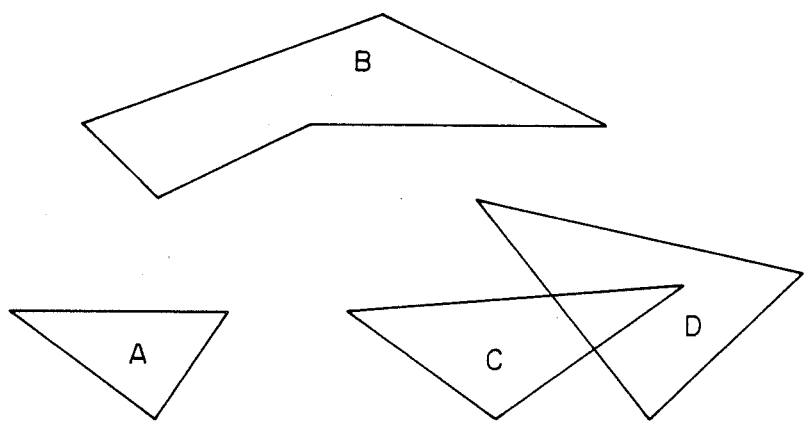
FIG. 5 (a) is a diagram schematically illustrating examples of geometric shapes to be processed in the two-dimensional representation.
Figure 5B:
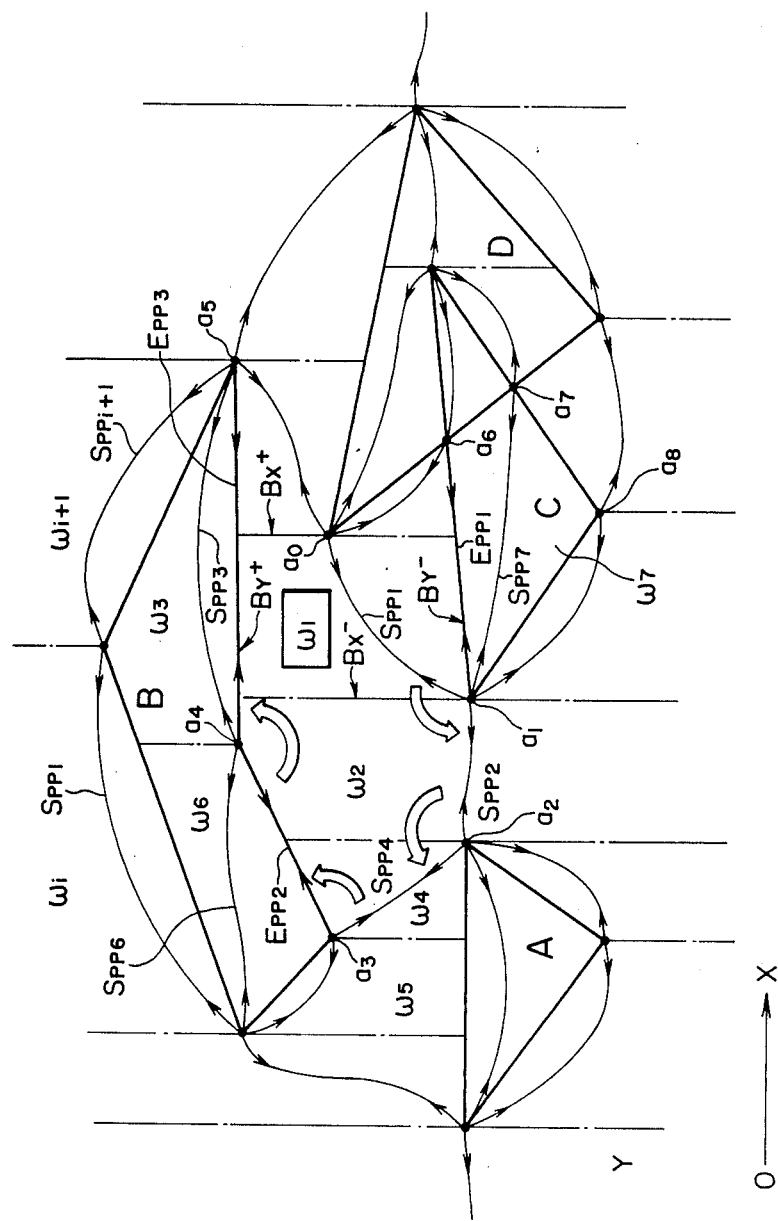
Figure 6A:
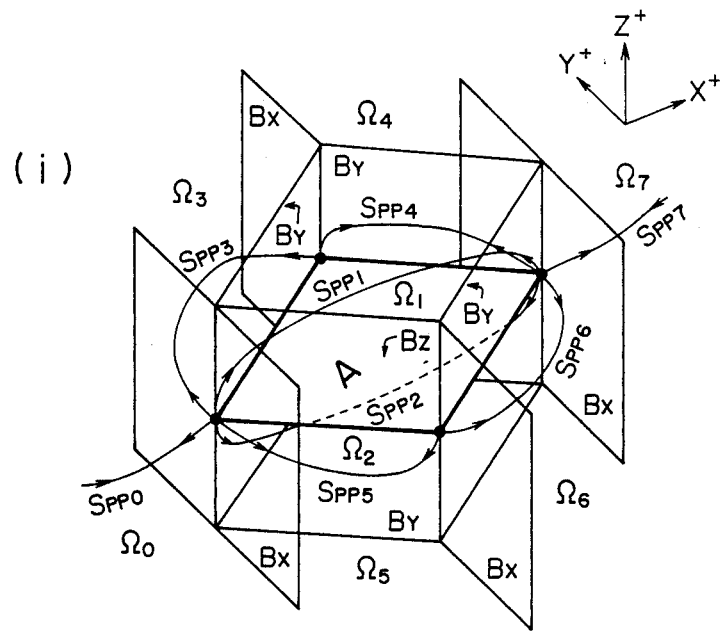
FIG. 6 (a) is an explanatory diagram depicting a procedure for partitioning a space in the three-dimensional representation.
Figure 6A:
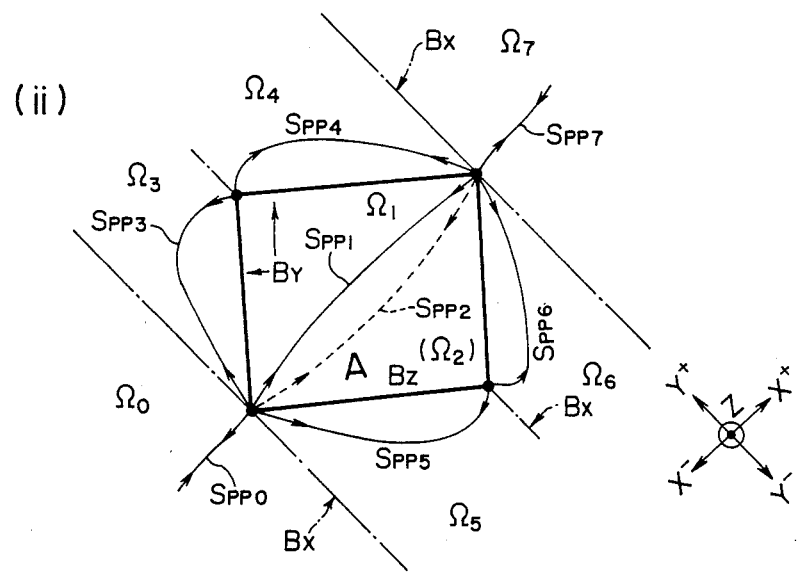
Figure 6B:
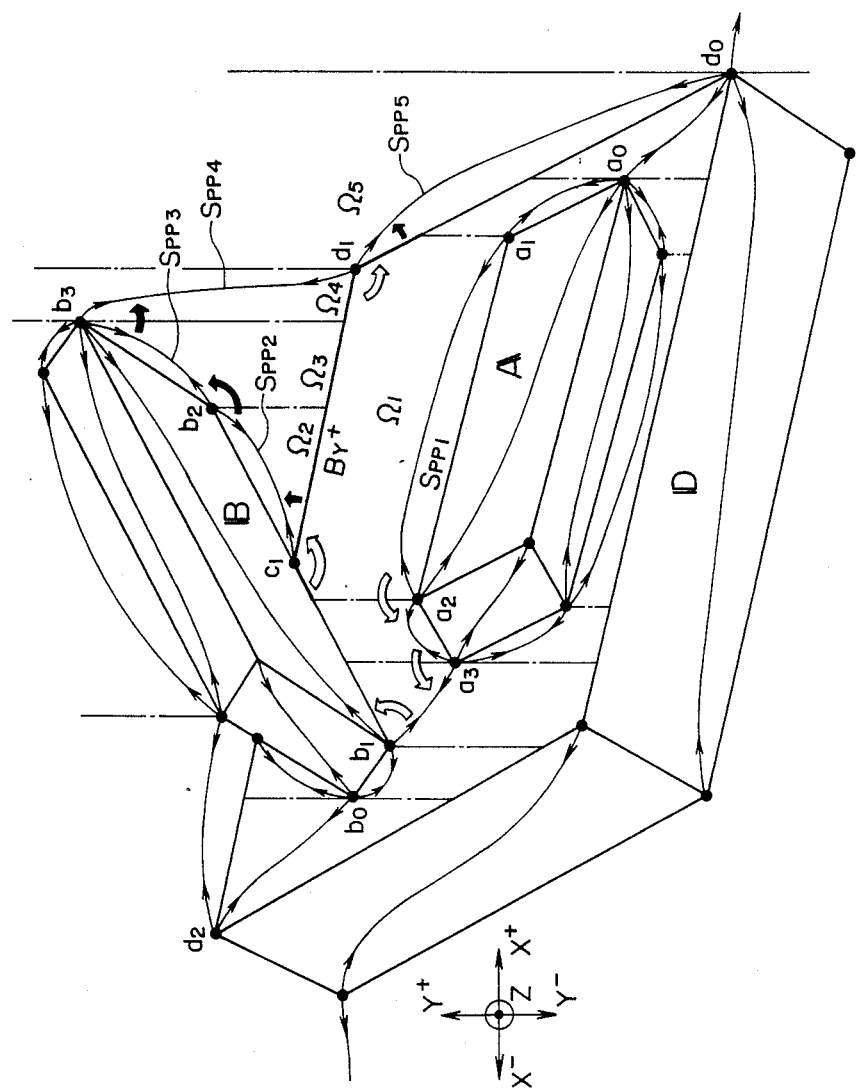
Figure 6C:
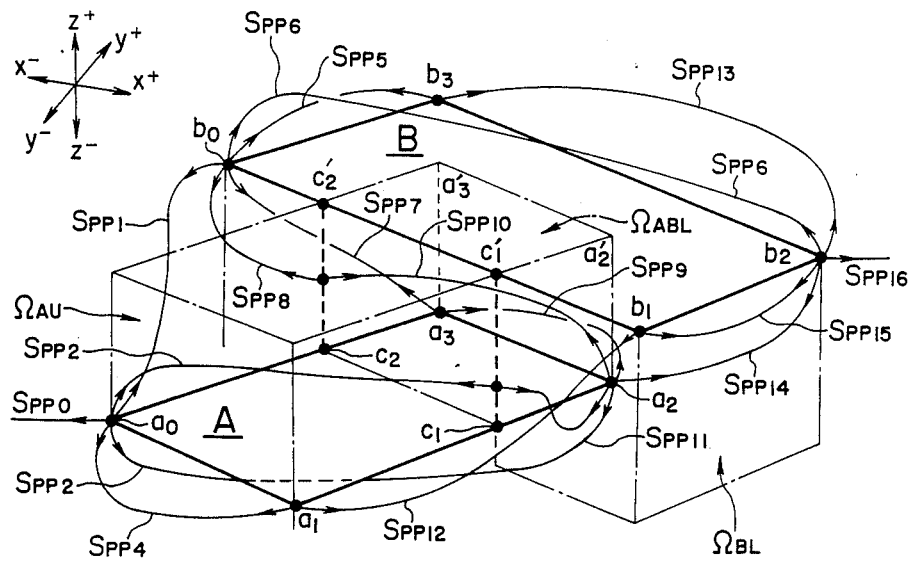
Figure 6D:
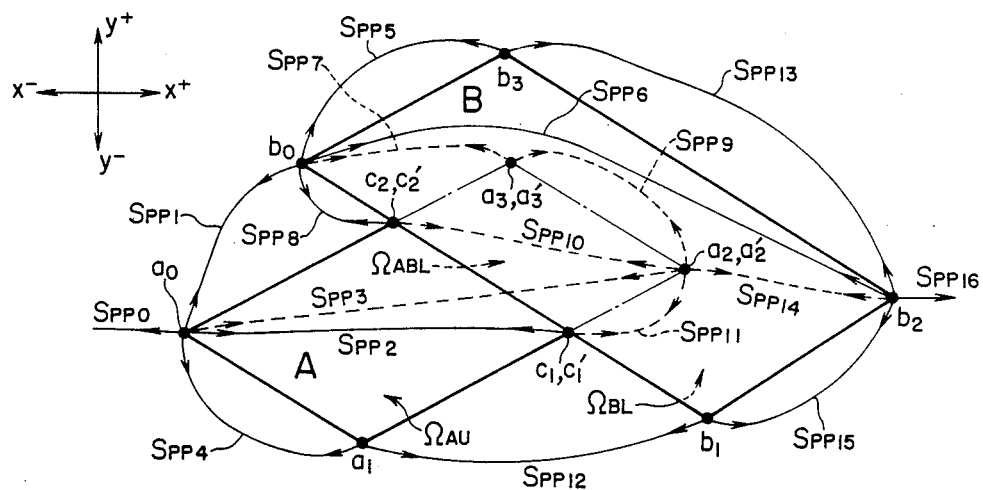

Two-dimensional geometric figures A, B, C, and D of FIG. 5 (a), although not particularly restricted, are assumed to be displayed on the display unit 7 of FIG. 1, for example. For the geometric figures, the geometric data is formed according to the method described below, and an appropriate processing is achieved in accordance with the generated geometric data.

First, the geometry space in which the geometric figures A and D of FIG. 5 (a) are located is assumed to be partitioned into a plurality of subspaces as shown in FIG. 5 (b) depending on the figures A and D.

That is, in FIG. 5 (b), the X-Y coordinate system applies to the geometry space, which is considered to be partitioned by a partition line Bx which passes a vertex of each figure and is perpendicular to the X axis. Although not restrictive, however, a concave space around each vertex (a space extending on a side where the angle enclosed with the edges of the figures exceeds 180°) is selected as an object of the space partition in this case to minimize the number of the subspaces. The space partition is not conducted for the convex space (a space associated with a side where the angle enclosed with the edges of the figures is less than 180°).

In a case where the X-Y coordinate system is used as shown in FIG. 5 (b), the shape of a subspace represented by a space pointer pair $SPP_i$ need only satisfy the following two conditions.

(1) A vertex for connecting the $SPP_i$ exists on each of the boundaries $Bx^-$ and $Bx^+$ of a subspace $\omega i$ with respect to X values, where Bx such as $Bx^-$ or $Bx^+$ is a line drawn along the Y coordinates from the vertex specified by the $SPP_i$.

(2) External form lines $By^+$ and $By^-$ of $\omega i$ in the Y direction comprise edges of geometric figures, and no edge (or point) exists inside $\omega i$.

FIG. 5 (b) is a diagram showing the subspaces (i=1 to n) obtained by partitioning the space with the edges of the, figures and the partition (dot-and-dash) lines under the above-mentioned conditions. The partition lines are virtual lines as already described and hence are not treated as data. Namely, the partition lines of each subspace are inserted to facilitate the understanding of the concept of space partition.

In each subspace of this figure, there always exists a characteristic point on each corresponding side in the X-axis direction. The two characteristic points on the respective sides have a one-to-one correspondence with respect to each partitioned subspace. A pointer pair indicating the characteristic point pair therefore can be processed as data specifying a subspace. In the diagram "." indicates a vertex as a characteristic point and the portion drawn with a solid line indicates an edge of a figure.

As described above, a pointer pair representing a space $\omega i$ (i=1 to n) established in the inside and outside of a figure by the space partition is referred to as a space pointer pair (SPP) in this specification. The space pointer pair is numbered as SPPi (i=1 to n) corresponding to the subspace $\omega i$ (i=1 to n).

In FIG. 5 (b), a space pointer pair SPPi is shown as two points interconnected by an arrowed line. In this diagram, it can be understood that each subspace corresponds to the respective space pointer pair SPPi.

The external form of subspace $\omega i$, for example, is determined by the X partition lines $Bx^-$ and $Bx^+$ and the figure edges $By^-$ and $By^+$. In this case, as can be clear from the diagram, the space pointer pair SPP1 is set to correspond to vertices $a_1$ and $a_0$ of the figures C and D, respectively. However, there does not exist an edge which has a one-to-one correspondence with respect to the space pointer pair SPP1. Furthermore, there does not exist a space pointer pair which has a one-to-one correspondence with respect to the edge $By^-$.

To overcome this difficulty, an edge pointer is set as an indication of an edge. Namely, an edge is represented by two edge pointers located at the ends of the edge. Like the space pointer pair, the two edge pointers associated with an edge are paired so that each component thereof points to each other. In FIG. 5 (b), the edge $By^-$ is represented by an edge pointer pair EPP1.

A search for an external form of a subspace becomes necessary, as will be described later, when a geometric figure is to be added or when a figure interference is to be checked.

At least a portion of the external form lines of a subspace $\omega i$ corresponds to a portion or all of the edges of the figure. The outer form is retrieved by a program which conducts the processing described below. Description will be given of the retrieval according to an example of $\omega i$.

A search for an edge of a geometric figure is accomplished by use of a sequential search for space and edge pointer pairs connecting vertices of the figure and a range check in the X direction to be executed when the edge pointer is obtained by the search. Although not specifically restricted, for the pointer pair search, a pointer pair is searched counterclockwise with respect to the initial pointer pair as marked by an arrowed arc in FIG. 5 (b). This is referred to as a rotary search.

In the case of FIG. 5 (b), SPP2 is obtained by the rotary search with the space pointer pair SPP1 set as the initial pointer pair; and SPP4 is attained by the rotary search with the space pointer pair SPP2 set as the initial pointer pair. In the counterclockwise direction of SPP4, there is located an edge pointer pair EPP2; consequently, EPP2 is obtained by the rotary search with the SPP4 set as the initial pointer pair. When an edge pointer pair is obtained by the search, the relationship between the X range indicated by the obtained edge pointer pair and the X range denoted by the initial pointer pair SPP1 is checked. In the case of FIG. 5 (b), the X range associated with EPP2 is clearly different from that corresponding to the SPP1; consequently, a rotary search is executed again with EPP2 set as the initial pointer pair. As a result of the rotary search, a new edge pointer pair EPP3 can be attained. The relationship between the X ranges associated with the EPP3 and SPP1, respectively is checked again. As a result, it is found that the edge $By^+$ indicated by EPP3 forms an upper edge of the subspace $\omega i$.

As described above, the rotary search is conducted in the counterclockwise direction with respect to the space pointer pair SPP1 as shown by an arrowed arc so as to sequentially search pointer pairs, and the searched pointer pair is checked to see whether or not it is to be (included) in the range along the X direction of the subspace, thereby enabling the upper external form to be obtained. Namely, the upper external form can be searched.

Furthermore, the lower external form can be determined by conducting the rotary search in the clockwise direction. Sequentially applying the retrieval procedure beginning from a given edge or space, an edge or a space can be sequentially searched in an arbitrary direction, namely, the upward, downward, left, or right direction. Since the rotary search can be achieved in an arbitrary direction. When a point is specified only by coordinates (x, y), the search is conducted in a direction toward the point represented by the coordinates (x, y)

with an arbitrary space or edge set as the initial point, thereby finally reaching a space including the specified point. This procedure makes it possible to search a space which includes the specified point. Moreover, if the length of the external form is desired to be known, the length can be easily calculated by referring to the values of coordinates of the vertices associated with the edges forming the external form just obtained.

As described above, the relationship between a geometric figure and its adjacent geometric figure can be represented as a set of subspaces; consequently, the relationship between geometric figures, particularly, the logic processing of a geometric figure, deletion of all/portions of a geometric figure, and the move, change, add, and update processing of a figure can be easily accomplished. This geometric processing can be efficiently executed by use of the attribute information to be described later.

As described above, by representing a subspace with a space pointer pair SPPi, a geometric figure can be retrieved for processing by use of the space pointer pair SPPi, and hence various geometric data items can be attained by effecting a data processing in subspace units, namely, many geometric data items need not be obtained by specifically executing a comprehensive data processing related to the all data items.

A vertex table is established corresponding to the vertices or characteristic points of a geometric figure. The vertex table keeps space pointers, edge pointers, and other data to be described later.

To implement the search described above, the pointers associated with the vertices are next set to the vertex table in a predetermined sequence as clearly shown in FIGS. 4 (a) and 4 (b). Although not restrictive, the space and edge pointers originated from a vertex are ordered in a counterclockwise direction around the vertex. For example, a vertex table for a vertex $a_1$ of FIG. 5 (b) is formed as follows. That is, for example, an edge pointer indicating the edge pointer of the vertex $a_8$ is first set to the vertex table; subsequently, one of the pointers of the next pointer pair located in the counterclockwise direction, namely, a space pointer indicating the space pointer of the vertex $a_7$ is set. Similarly, the pointers located in the counterclockwise direction are sequentially set to the vertex table. That is, in the vertex table associated with the vertex $a_1$, there are sequentially stored a space pointer indicating the space pointer of the vertex $a_0$, a space pointer indicating the space pointer of the vertex $a_2$, and a space pointer indicating the space pointer of the vertex $a_8$.

In the two-dimensional geometric figure, the vertex table is favorably configured in a form shown in FIGS. 4 (a) and 4 (b).

Next, the contents of the characteristic point table as shown in FIG. 4 (a) will be described.

The characteristic point table 20 is controlled by use of a code or number identifying each vertex and is stored in the memory 2 beginning from a predetermined corresponding address. In this example, the vertex point table is so configured as to include 8-line storage area in principle.

The symbols of FIGS. 4 (a) and 4 (b) each have the meanings listed in Table 1 as follows.

A vertex table of FIG. 4 (a) corresponds to vertex a as shown in FIG. 4 (c) or (d). Each data item is stored in the table in the above-mentioned order. That is, in the table of FIG. 4 (a), data corresponding to figures shown in FIG. 4 (c) or (d) are stored in sequence counterclockwise with respect to an edge at a lower side. First line of the table is the data storage position of figure reference edge $EP_0$, second line is data storage position of space pointer $SP_{01}$, third line is data storage position of next edge $EP_1$ when rotated counterclockwise, fourth line is data storage position of space pointer $S_{10}{}^r$ fifth line is data storage position of space pointer $SP_{10}{}^c$, and sixth line is data storage position of space pointer $SP_{10}{}^L$. Seventh line and eighth line are storage positions of information of X, Y coordinates of the vertex a, respectively.

Each of space pointers SP, $SP^r$, $SP^c$, $SP^L$ assigns an address of an adjacent space pointer to be combined thereto and constitutes a pair into space pointer pair SPPi.

In addition to space pointers SPi, edge pointers EPi (i=1 to n) to constitute pairs to vertexes at both sides are stored in the table as above described. The edge pointers are represented by EPPi (i=1 to n). When space pointer pairs SPPi and edge pointer pairs EPPi are taken in this manner, in the case of the vertex a of FIG. 4 (c), six pointers become necessary and exist actually.

First column V/C of the characteristic table 20 is a flag to indicate a vertex or cross point in the figure. As seen in the above-mentioned table 1, flag "1" means vertex and flag "0" means cross point. Second column KIND means code to indicate kind of edge pointer pair or space pointer pair. Third column ATTR means attribution thereof, and fourth column POINTER indicates address position where partner for a pair exists. As seen in a characteristic table of FIG. 4 (b), space attribution, for example, color, data address to indicate information of data to be entered in the space, definition information of the space or the like, may be also expressed as SA of the characteristic point table 21 of a vertex being not in the X direction. If SA is set in this manner, when attribution of a figure is retrieved, SA can be readily searched by referring to ATTR. being attribution column of a space pointer pair. If the "size" of the characteristic point table 21 of a vertex being not in the X direction is equalized to that of a the table 20 of vertex in X direction, the POINTER column of the vertex being not in the X direction naturally has no connecting object and will become blank. However, this system effectively utilizes the POINTER column for expressing space attribution SA and therefore has good memory use efficiency. In a figure without a vertex being not in the X direction as shown in FIG. 4 (e), since there is no position where SA can be added, a remedy is required, for example, in that SA is additionally installed outside of the characteristic point table of the figure as shown in FIG. 4 (e). Or, it is required that the vertex which does not affect the figure shape (angle between edges being 180°) is added on the figure edges and SA is installed on the added vertex.

A specific example of data constitution of the characteristic point tables 20, 21 is shown in the following table 2.

Contents of two-dimensional space data have been described.

TABLE 1

Figure 20:
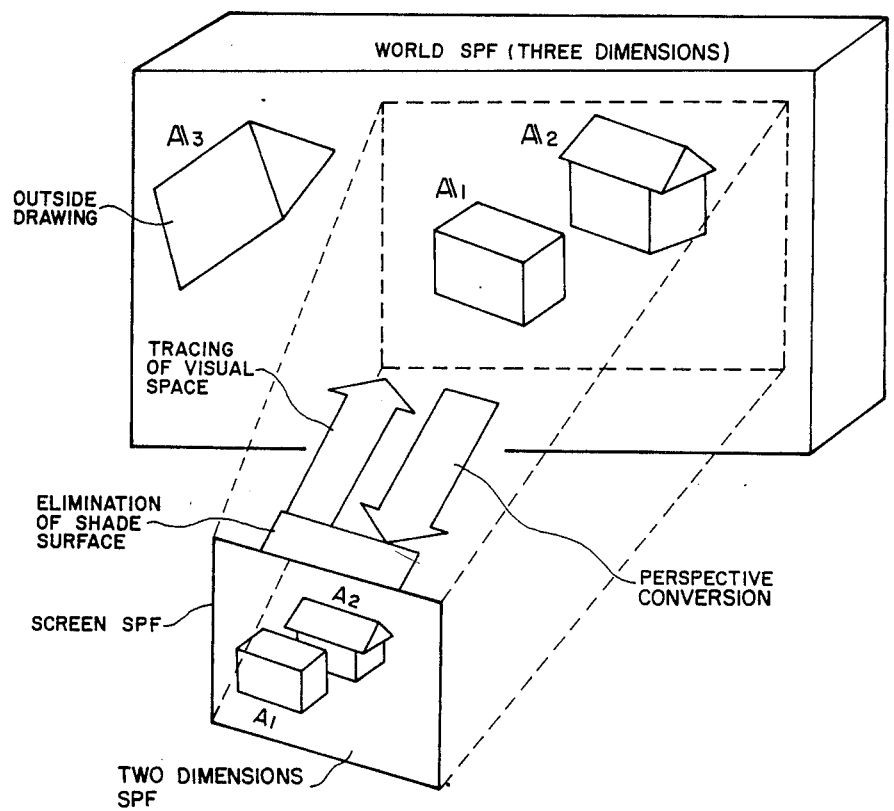
FIG. 20 is an explanatory diagram depicting procedures to delete a concealed surface.
Figure 21:
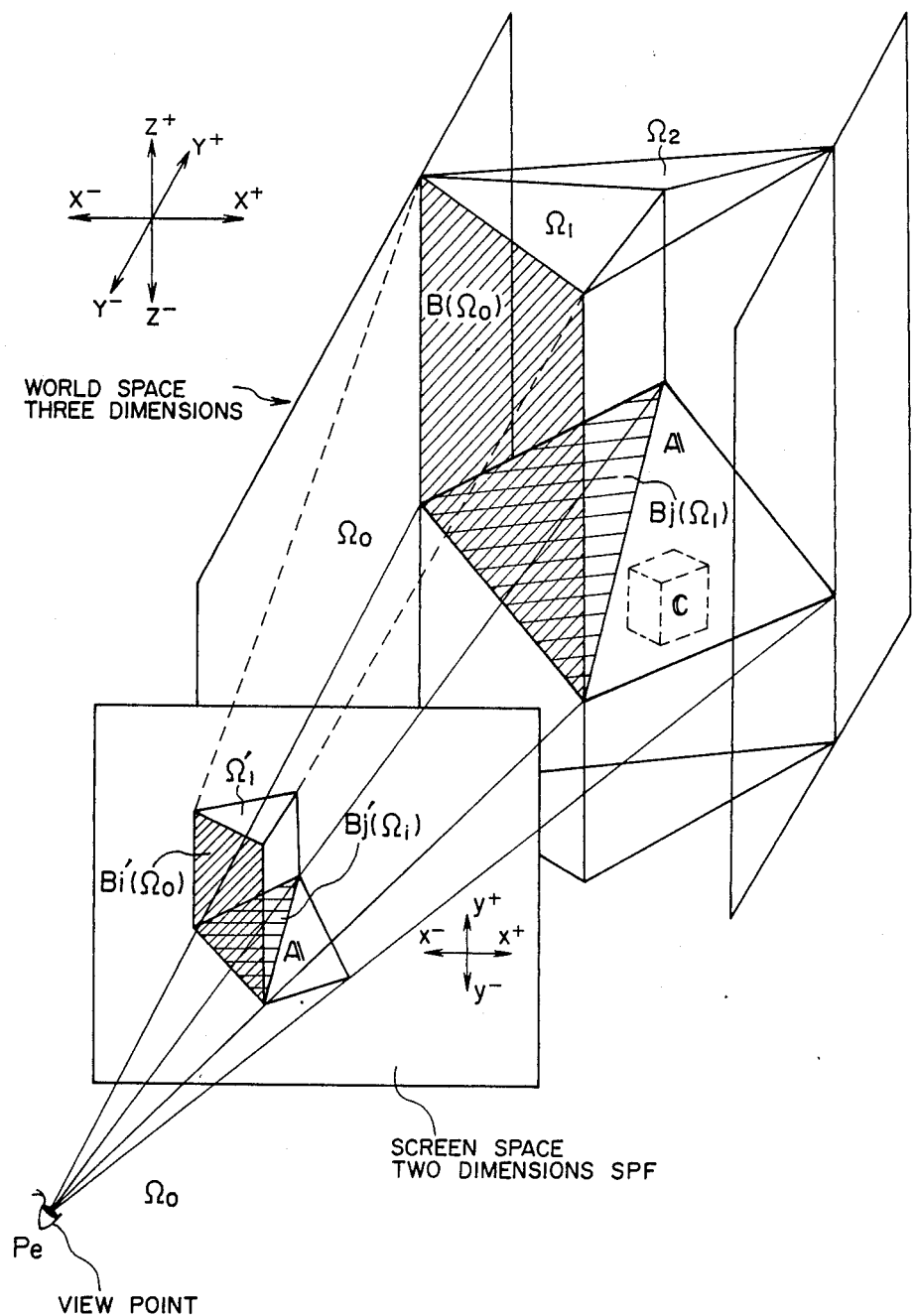
FIG. 21 is a schematic diagram explaining a case where a visible space tracing method is used.
Figure 22:
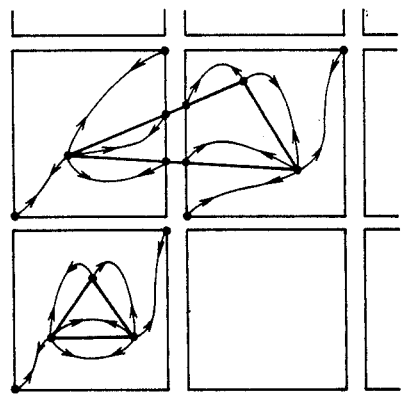
FIG. 22 is a diagram showing a procedure to generate space pointer pairs in a case where the geometric data is partitioned into a plurality of subregions.
Figure 23:
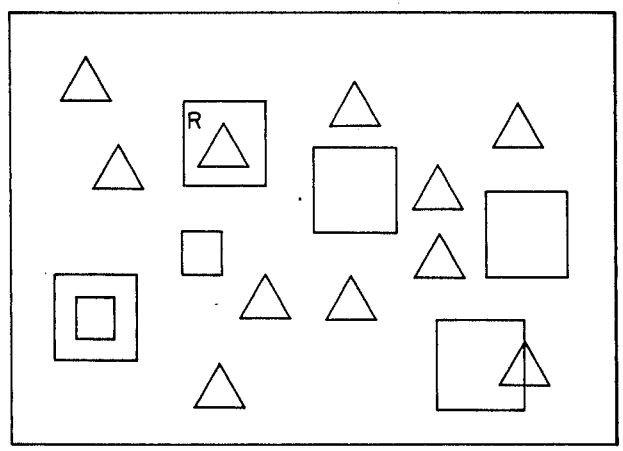
FIG. 23 is a schematic diagram for explaining a case where a particular geometry is searched.

| SYMBOL | CONTENTS |
| --- | --- |
| ADDR | ADDRESS WITHIN VERTEX TABLE |
| $b_2 b_1 b_0$ | LOWER THREE FIGURES 22, 21 and 20 OF A WORD ADDRESS |
| V/C | V/C = 0; CROSS POINT |

TABLE 1-continued

| SYMBOL | CONTENTS |
|---|---|
|  | V/C = 1; VERTEX |
| EPi | EDGE POINTER FOR INDICATING AN EDGE |
| SPi.j | SPACE POINTER FOR INDICATING A CONVEX SPACE (BETWEEN EPi AND EPj) |
| $SP_{k,j}{}^r$ | SPACE POINTER FOR INDICATING A |
| $SP_{i,j}{}^c$ | CONCAVE SPACE (BETWEEN EPi AND EPj) |
| $SP_{i,j}{}^L$ | r: right / c: center / L: left  ⎫ DIRECTION LOOKED FROM A VERTEX |
| $SA_{i,j}$ | POINTER FOR INDICATING AN ATTRIBUTION OF A SPACE |
| x, y | VALUE OF COORDINATES OF A VERTEX (EACH FOUR BYTES) |
| KIND | CODE (TWO BITS) FOR INDICATING KIND OF POINTER (SEE NEXT TABLE) |

TABLE 2

| ADD | ITEMS | | | CONTENTS | |
|---|---|---|---|---|---|
|  | KIND 2 BITS | ATTR 5 BITS | KIND OF POINTER | MEANING OF ATTR | |
| EVEN ADDRESS ($b_0$ = 0) | 00 (+EP) | E-ATR | EP FOR X+ DIRECTION | ATTRIBUTION OF EDGE | |
|  | 01 (−EP) | E-ATR | EP FOR X− DIRECTION | ATTRIBUTION OF EDGE | |
|  | 10 ($SP^c$) | V-ATR | CENTER OF CONCAVE SPACE POINTER | ATTRIBUTION OF VERTEX | |
|  | 11 ($SA^c$) | V-ATR | SPACE ATTRIBU- TION | ATTRIBUTION OF VERTEX | |
| ODD ADDRESS ($b_0$ = 1) |  | (SP) CODE | SP OF CONVEX SPACE | KIND OF POINTER; SP | |
|  | 00 (SP) | ($SP^r$) CODE | $SP^r$ OF CONCAVE SPACE | KIND OF POINTER; $SP^r$ | |
|  |  | ($SP^L$) CODE | $SP^L$ OF CONCAVE SPACE | KIND OF POINTER; $SP^L$ | |
|  | 01 (SA) | SA-ATR | SPACE ATTRIBU- TION | SUPPLEMENT TO SPACE ATTRIBUTION | |
| 10 (JP) |  | AP POINTER | NUMBER OF WITHIN ADJOINING PAGE | ADJOINING PAGE | |
|  | 11 (IP) | (Index) | INDEX CORRE- SPONDING TO VERTEX | INDEX PAGE | |

Next, three-dimensional space data will be described. Three-dimensional space data is a development of two-dimensional space data. Now, three-dimensional space will be divided into partial solid spaces which will be expressed by space pointer pair SPPi.

Basic property of three-dimensional space data (or space pointer file, SPF) is similar to the case of two-dimensional space data that direct retrieval of adjacent-/overlapped space can be performed at high speed by local processing.

That is, (1) interference check by local processing and other three-dimensional high-speed logical processing, (2) high-speed hidden-surface elimination indication and its partial correction (partial hidden-surface elimination), (3) detection of movement and collision of figure in three-dimensional space, and the like can be executed efficiently.

Since the above-mentioned processing is essentially local processing similar to two-dimensional processing, high-speed processing is possible irrespective of scale of whole figure and on-line interactive processing can be executed.

Corresponding to an example of the case of two-dimensional space as shown in FIG. 3 (b), FIG. 6 (a) shows a drawing where three-dimensional space is grasped as X-Y-Z coordinate space.

Three-dimensional space division and its expression in space pointer pair SPPi are executed according to following rules.

(1) X-boundary surface Bx

In a prism-like space produced by projection of a figure in the Z direction at a plus side and minus side (refer to FIG. 6 (a)), when concave angle space exists around the Z-axis from a vertex at the center (space with angle larger than 180° when cut by perpendicular surface to Z-axis) similarly to two-dimensional space, the concave angle space is divided by a surface which passes through the vertex and is perpendicular to the X-axis and parallel to the X-Z plane (plane in the example of FIG. 6 (a)) and the divided surface is made X-boundary surface Bx. Extent of surface Bx in Y and Z directions is to lines intersecting to By surface and Bz surface as hereinafter described.

(2) Y-boundary surface By

When an edge of each surface constituting a figure is projected in the Z direction at a plus side and minus side, a surface parallel to the Z-axis (plane in the example of FIG. 6 (a)) is made the Y-boundary surface By of the partial space. Extent of surface By extends to adjacent surface Bz in Z the direction (upward and downward) and ends there.

(3) Z-boundary surface Bz

Boundary surface Bz as upper base or lower base of the partial space is really figure adjacent to the space in Z direction.

As above described, the partial solid space divided according to the three rules usually has a prism-like form with the upper base Bz and lower base Bz being the upper and lower surfaces of a three-dimensional figure and is perpendicular to the X-Y plane.

Also, in three-dimensional space data, a partial solid space divided according to the above-mentioned rules similar to that of two-dimensional space data is expressed by a space pointer pair SPPi. The space pointer pair SPPi is extended between vertexes of the X plus end and the X minus end of the partial solid space in a similar manner to the case of two-dimensional space as shown in FIG. 3 (b) and FIG. 5 (b). In FIG. 6 (a) (i), $\Omega$ represents partial solid space in three dimensions corresponding to $\omega$ in two dimensions. FIG. 6 (a) (ii) is a view of FIG. 6 (a) (i) from the Z+ direction. FIG. 6 (b) shows three-dimensional solid figure in simplification corresponding to FIG. 5 (b).

Now, it must be pointed out in three dimensions that even if edge of one figure does not directly intersect edge of another figure, the edge of one figure may be hidden by the edge of another figure thereby crossing of shade may be produced. FIG. 6 (c) and (d) illustrate the crossing of shade.

FIG. 6 (c) shows relatively simple example where plane figures A and B are in a solid arrangement. That is, the figure B is disposed to an upper side of the figure A (in the Z direction at plus side), and a part of the figure B is in solid crossing with a part of the figure A separately in the Z direction. In this constitution, since space division is performed according to the above-mentioned three rules, partial space $\Omega_{ABL}$ in solid crossing position of the figure B with the figure A, i.e., partial space disposed at the lower side of the figure B and at the upper side of the figure A, has a part of the surface determined by the edge between points $C_2'-C_1'$ in the figure B. In order that a space pointer pair can be set to the partial space $\Omega_{ABL}$, a cross point which does not exist respectively in the figures A and B must be taken into consideration. In FIG. 6 (c), lines $C_1-C_1'$, $C_2-C_2'$ are crossing lines of shade. Four partial spaces abut on each other around the crossing lines, and two diagonal spaces among them become vertexes of spaces sharpened in the X-axis direction and space pointer pair SPPi is set corresponding to these.

FIG. 6 (d) is a view of figures of FIG. 6 (c) projected in the Z-axis direction. Referring to FIG. 6 (d), it will be understood that space division of a three-dimensional figure and the setting constitution of a pointer pair corresponding to the division are quite similar to that of a two-dimensional figure.

Figure 7:
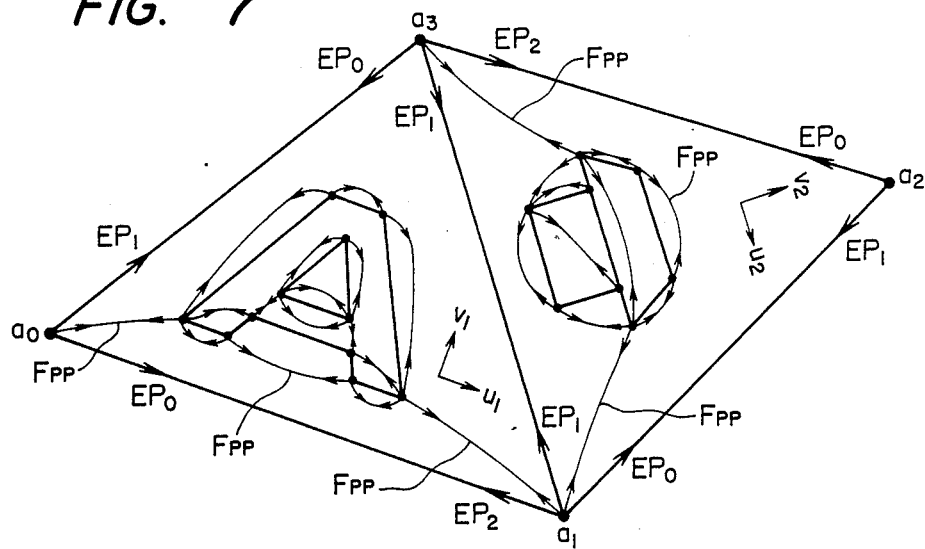
FIG. 7 is an explanatory diagram showing relationships between geometric shapes and surface pointer pairs.

In the case of a three-dimensional figure, in addition to space pointer SP and its space pointer pair SPPi, edge pointer EP and its edge pointer pair EPPi, existence of the information to specify attribution of surfaces of a solid figure is preferable. So a pointer pair regarding these surfaces is represented by surface pointer pair FPPi which is added as new information to the characteristic point table. The surface pointer pair FPPi is effective when patterns exist on a surface of a body as shown in FIG. 7.

Figure 8B:
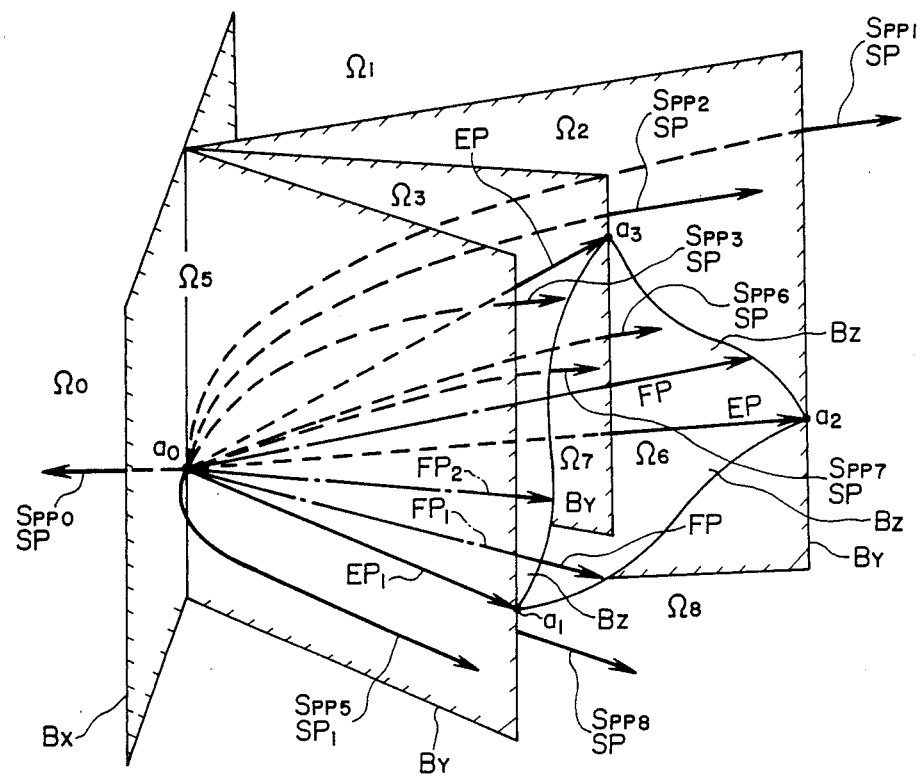
FIG. 8 (a) is a diagram explaining relationships between the space partition of a three-dimensional geometry and space pointer pairs.
Figure 8A:
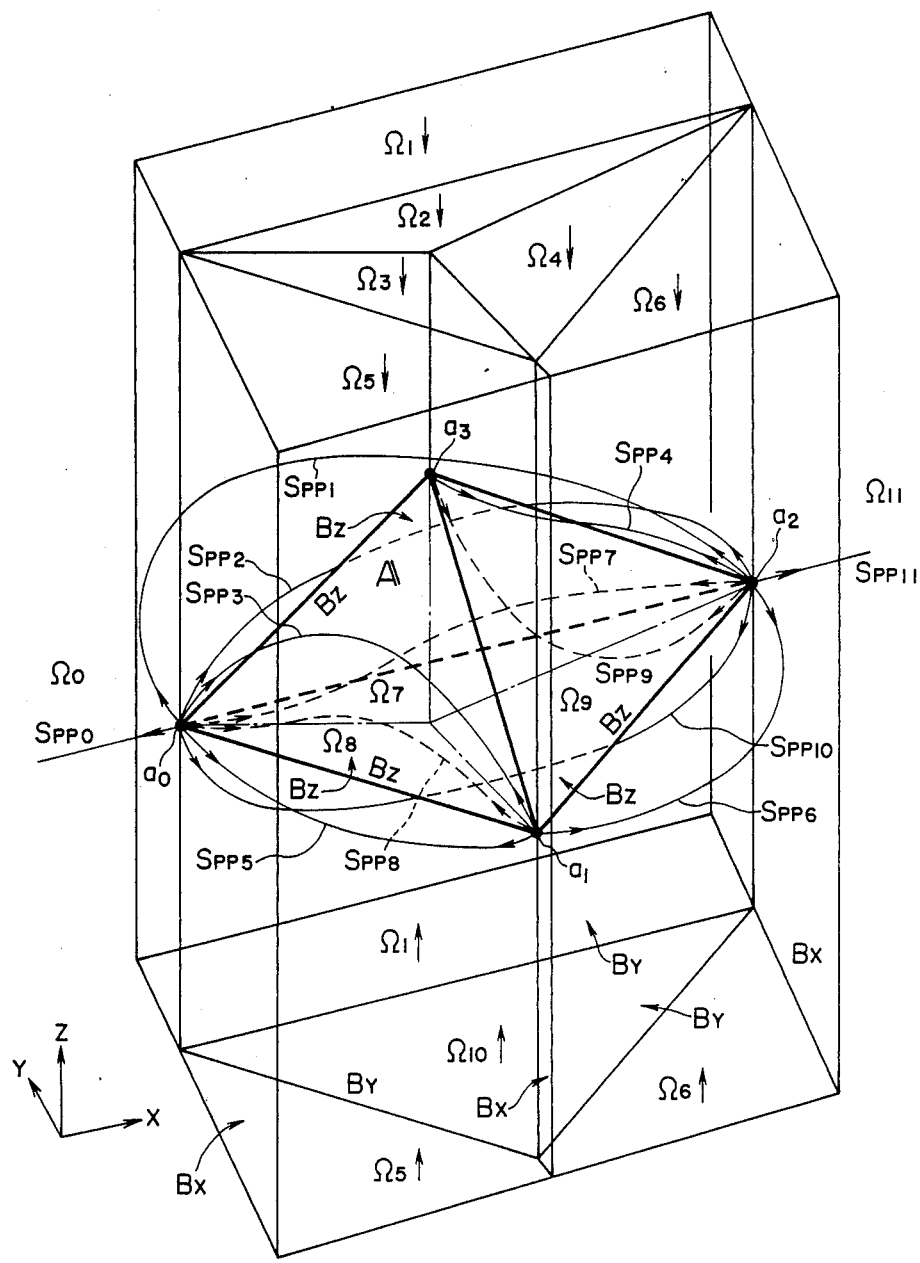

Next, in view of these aspects, referring to FIG. 8 (a), space data to three-dimensional figure A1 will be formed corresponding to that of the two-dimensional figure as shown in FIG. 4 (c) or (d). If various pointers are indicated on FIG. 8 (a), the drawing will be significantly complicated. So FIG. 8 (b) is prepared for easy understanding. FIG. 8 (b) shows vertex $a_0$ of solid figure in FIG. 8 (a) and space pointer SP set corresponding thereto, edge pointer EP and surface pointer FP.

Following pointers are set corresponding to the vertex $a_0$. That is, spacer pointer $SP_1$ to one of the spacer pointer pair $SPP_5$ corresponding to the partial space $\Omega_5$ in FIG. 8 (a), edge pointer $EP_1$ to one of the edge pointer pair $EP_1$ corresponding to the edge between vertexes $a_0-a_1$, surface pointer $FP_1$ corresponding to the surface specified by vertexes $a_0$, $a_1$ and $a_2$, and the like are set.

FIG. 9 (a) shows one vertex V of the three-dimensional figure, figure edges EGi through EGk, and various pointers set corresponding to the edge EGi. In FIG. 9 (a), SP with a subscript represents a space pointer pair, and FP represents a surface pointer. LP with a subscript represents an edge pointer, and RP represents a surface pointer or space pointer. A manner of regarding pointers LP and RP will be hereinafter described.

In the case of a two-dimensional figure or three-dimensional figure, since local data processing is achieved, if respective information in the characteristic point table is not formed according to rule to a enable retrieval of each space among several partial spaces, the data processing will become meaningless.

In the case of a two-dimensional figure, as above described and shown in FIG. 4 (a) and (b), EP and SP around the vertex can be represented in uniqueness by the characteristic point table where various pointers are set in counterclockwise form, and contiguity of an edge with a space around the vertex can be completely represented. Thereby high speed of rotational search can be attained.

On the contrary, in the case of a three-dimensional figure, as exemplified in FIG. 9 (a), adjacent spaces exist not only at left and right sides of one edge EGi but also at upper and lower sides thereof. Consequently, contiguity of a three-dimensional figure space cannot be represented only by such method as a table of one-dimensional loop form to be set in a two-dimensional figure, i.e., method that a plurality of pointers are set on the table in a prescribed sequence.

In the case of a three-dimensional figure, therefore, a space determining rule with uniqueness is required to establish a relation where each partial solid space corresponds to specified information.

FIG. 9 (b) shows a system of a general-purpose characteristic point table for a three-dimensional figure, which can solve the problem of contiguity and represent contiguity of the figure spaces without depending on the number of edges EGi generated from the vertex and without depending on the number of spaces or surfaces adjacent to the edges EGi. The characteristic point table of FIG. 9 (b) has data blocks arranged by the number of edges EG, i.e., a plurality of data blocks corresponding by one to each edge. Edge pointers together with space pointers SP and surface pointers are set to each data block according to the following rule.

That is, an edge as object of the EG block (hereinafter referred to as "reference edge") and a plurality of space pointers and surface pointers adjacent to the reference edge are noticed. Decision is performed regarding the fact that the plurality of pointers are disposed to the left side of the reference edge or to right side thereof. Criterion for determining the left side or right side in this case is relative and not absolute. Although not particularly limited, the vertex V is deemed to be substantial view point for referring to the reference edge and the plus side of the Z-axis is deemed to be an upper side. According to such method of determining the left side or right side, space pointers $SP^z$ and surface pointers FP$^z$ deemed to be adjacent to the left side of the reference edge (subscript z: sequence of SPz and FPz counted from the upper side of the Z-axis, Z=1, 2, ... ) are set in sequence within the EG block. By entering in the EGi block, contiguity of the edge EGi with SP$^z$, FP$^z$ at its left side or with partial space can be represented.

For example, a table for FIG. 9 (a) is made as follows. For convenience, the following description will be performed regarding the EGi block corresponding to the edge EGi in FIG. 9 (a).

In the EGi block of FIG. 9 (b), edge pointer EPi for the edge EGi of FIG. 9 (a) is set to the first line in which top address $i_0$ of the block is given although not particularly limited thereto. Of course, the edge pointer EPi indicates a vertex as a partner to the vertex V or edge pointer to the characteristic point according to the intention of the pointer pair.

In FIG. 9 (a), a partial space disposed to the left side of the edge EGi and to most plus side in the Z-axis is a partial side $\Omega^1$ disposed at the upper side to surface $F^2$ specified by the edges EGi and EGj. Consequently, space pointer SPij$^1$ for the partial space $\Omega^1$ is set to the second line (address $i_1$) of the EGi block.

In the case of FIG. 9 (a), the next pointer disposed to the lower side of the space pointer SPij$^1$ is surface pointer FPij$^2$ for the surface $F^2$. Consequently, the surface pointer FPij$^2$ is set to the third line (address $i_2$) of the EGi table.

Partial space adjacent to the lower side of the partial space $\Omega^1$ is partial space $\Omega^3$ where the top surface is surface $F^2$ and the bottom surface is surface $F^4$ specified by the edges EGi and EGk. Consequently, space pointer SPij$^3$ for the partial space $\Omega^3$ is set to the fourth line (address $i_3$) of the EGi table.

In a similar manner, surface pointer FPik$^4$ for the surface $F^4$ is set to the fifth line (address $i_4$) of the EGi table. Also space pointer SPik$^5$ for the partial space $\Omega^5$ disposed to the lower side of the surface $F^4$ is set to the sixth line (address $i_5$).

In FIG. 9 (a), in order to prevent the drawing from being significantly complicated, pointers which would be disposed to the left side of the edges EGj, EGk are not shown. In the EGj block and the EGk block of FIG. 9 (b), space pointer and surface pointer corresponding to the edges EGj and EGk are set actually. However, no symbol is shown to portion of FIG. 9 (b) where the space pointer and the surface pointer of the EGj block and the EGk block should be set on account of simple reason to facilitate contrast of FIG. 9 (a) with FIG. 9 (b).

Above-mentioned pointers together with pointers LP, RP are set to the EG blocks of FIG. 9 (b). The pointers LP, RP are set to represent a contiguity relation of partial space and a surface disposed to the left side of the edge EGi as shown by the space pointer SP$^z$, the surface pointer FP$^z$ in the EGi block, for example, with partial space and surface disposed further to the left side as shown by the space pointer, the surface pointer corresponding to the edges EGj, EGk to the left side of the edge EGi. To put it briefly, the contiguity relation is represented by mutual pointing between the inside table pointer LP (Left Edge Pointer) belonging to each SP$^z$, FP$^z$ and pointing EP at the left side and the inside table pointer RP$^z$ (Right SP or FP) belonging to each EPj, EPk and pointing to the right side.

Necessity of expression of contiguity by pointers LP, RP will now be described.

According to the above-mentioned system, i.e., a system in which the EG blocks are set and edge pointers together with space pointers and a surface pointer are set to each EG block, a three-dimensional rotational search can be supported.

That is, if the vertex table is divided and controlled corresponding to each edge, connection of a surface of a partial space adjacent to one edge in the upward and downward direction of the Z-axis can be directly searched corresponding to the above-mentioned arrangement of each pointer within each block. In other words, the longitudinal rotational search becomes possible. On the contrary, the contiguity relation of each partial space viewing from the upper side of the Z-axis downward, i.e., the contiguity relation in the leftward and rightward direction or lateral direction cannot be searched directly. For example, space pointers and surface pointers set to the EGj block corresponding to the edge EGj of FIG. 9 (a) are pointers for representing partial spaces adjacent to left side of the edge EGj as above described and not pointers for representing partial spaces $\Omega^1$, $\Omega^3$ or the like at the right side of the edge EGj. Consequently, partial spaces adjacent to the right side of the edge EGj cannot be searched substantially by pointers in the EGj block.

In the lateral rotational search in the case of three dimensions therefore, information of LP, RP is provided so that the lateral relation of the partial space is clarified directly.

The information of LP, RP specifies a lateral relation regarding space pointer pair SPPi and surface pointer pair FPPi being each space data, and is written in LP, RP fields of the EG block respectively, LP, RP are made a pointer pair and linked by indicating the address in each other. The information LP, RP is now called link information, and the pointer pair is called a link pointer pair. Since the LP, RP pointers to constitute the link pointer pair are pointers indicating a partner within the table of the same vertex, they may be made data of bits with the small number, for example, one byte.

FIG. 9 (b) shows a characteristic point table constituted to vertexes in FIG. 9 (a). In FIG. 9 (b), link arrow lines indicate a connection in a lateral direction by a link pointer pair LP-RP (connection within a surface in the direction of the X-Y plane).

In the EGi block of FIG. 9 (b), the first space pointer SPij$^1$ is set to pointer field of the second line (address $i_1$), and link space pointer LP$^1$ is set to a LP field thereof. The link space pointer LP$^1$ indicates an address within the vertex table where the link space pointer RPj$^1$ to constitute a pair thereto is set.

Since the pointer LP$^1$ is related to the first space pointer SPij$^1$ in the EGi block, the link space pointer RPj$^1$ is set to a line where the first space pointer of the EGj block is to be set, i.e., the second line (address $j_1$) of the EGj block. The pointer RPj$^1$ indicates an address within the vertex table where the pointer LP$^1$ is set in a similar manner to the above description.

The left link surface pointer LP$^2$ and the left space pointer LP$^3$ are set to the EGi block as shown in FIG. 9 (b) corresponding to figures in FIG. 9 (a). The right link surface pointer RPj$^2$ and the right link space pointer RPj$^3$ to constitute pairs respectively with these pointers LP$^2$, LP$^3$ are set to the EGj block.

Right link surface pointer RPk$^2$ to constitute a pair with left link surface pointer LP$^4$ is made the first right link surface pointer to be set to the EGk block although not particularly limited thereto. Corresponding to this, the pointer RPk² is set to a line where the first surface pointer of the EGk block is to be set, i.e., the third line (address k₂).

Thus, right link pointers to constitute pairs respectively with left link pointers are set to each EG block in sequence.

In usual, a plurality of SP, FP are overlapped in the Z direction and adjacent also to the right side of one edge EG. Corresponding to such SP, RP at the right side, if RP pointers are also arranged in the EP block from the Z-axis plus side as shown in the figure, complete expression can be performed.

In FIG. 9 (a), right link pointers RPi³ to the partial space adjacent to the right side of the edge EGi are shown. Wherein RPi³ and RP³ mean the link space pointers, and RPi² means the link surface pointer. Corresponding to this, the link pointers RPi¹ through RPi³ are set in sequence to the EGi block as shown in FIG. 9 (b).

Since the vertex table is constituted as above described, link information LP at the left side of a pointer pair is linked with link information RP at the right side of a pointer pair into a LP-RP pointer pair. In FIG. 9 (b), the connection manner in upward and downward direction shown by arrow lines, i.e., the problem that pointers such as RPj¹ through RPj³ should be arranged in the vertex table at a front side or rear side of the pointers such as LP¹ through LP³, is not an essential problem. Such upper and lower position relation of link pointers in FIG. 9 (b) only results from the fact that space data of partial spaces and surfaces disposed to the left side of the Y direction boundary surface corresponding to the edge EGi are represented in sequence from the upward direction of the Z-axis plus side. Since the relative position of each EG block becomes clear by setting the link pointer pair, the sequence of each EG block within the vertex table, does not become an essential problem. Consequently, the upper and lower relation as above described varies depending on how each EG block is disposed with respect to what position of the vertex table. In FIG. 9 (b), whatever the space data in the connection relation is, the content or kind of the space data is specified by referring to information in the KIND field of the block. In other words, it is recognized that the space data is a space pointer pair SPPi or an edge pointer pair EPPi or a surface pointer pair FPPi.

Such characteristic point table 22 is constituted, thereby the three-dimensional characteristic table can be searched contiguously in sequence similarly to the two-dimensional characteristic point table, and local processing of a partial space or surface becomes possible with uniqueness.

In this case, there are two sorts of search methods as above described. One is rotational search to follow pointers within each edge in an upward and downward direction, i.e., rotational search in an upward and downward direction of the Z-axis. The other is a rotational search developed from a pointer pair of space data to a lateral link information pointer pair LP-RP, i.e., rotational search around the Z-axis in a perpendicular direction. In actual geometrical processing, these search methods are combined and utilized.

The vertex table or characteristic point table 22 for the three-dimensional figure of the example of FIG. 9 (b) has a constitution that coordinate values (x, y, z) of the vertex are arranged at the head position, and further blocks of the characteristic point table are arranged in sequence from the block of the reference edge EPo as above described although not particularly limited thereto.

FIG. 9 (c), (d) show an example of space data to the convex vertex V of a polyhedron developed in a similar manner to FIG. (a), (b), i.e., an example indicating the relation of a space pointer pair SPPi, edge pointer pair EPPi, pointer pair FPPi to be set to the convex vertex V (FIG. 9 (c)) and the relation of the characteristic point table thereto (FIG. 9 (d)).

In the case of the figure shown in FIG. 9 (c), the X-coordinate value of the vertex V is made larger than that of the other vertex (hereinafter referred to as "Vertex V₀") of a partner (not shown) directed through the edge EGo. That is, the vertex V is at plus side relatively. The X-coordinate value of the vertex V is also made smaller than that of the other vertex (hereinafter referred to as "vertex V1") of the partner (not shown) directed through the edge EG1. Consequently, a partial space adjacent to a surface having the edges EGo and EG1, for example, is represented by a space pointer pair to be set to the vertexes V₀ and V₁. No space pointer is set to the EGo block within the vertex table for the vertex V. No surface pointer is set for a similar reason.

In the vertex table of FIG. 9 (d), such data field to be made empty are utilized effectively. For example, data SAo1¹ indicating space attribution is set to the pointer field in the second line of the EGo block, and data FAo1² indicating surface attribution is set to a similar field in the third line. What data should be set to a pointer field of each line is indicated by discrimination data set to the KIND field. The link pointer RP1¹ in the second line of the EG1 block is indicated by the link pointer LP1¹ set to the LP field in the second line of the EGo block.

Attribution data for a partial space are searched as follows. For example, SAo1¹ set to the EGo block in the vertex table of the vertex V indicates the space attribution of a space adjacent to a surface having the edges EGo and EG1, i.e., a space which is set to the vertexes Vo and V1 and represented by space pointer pair SPPo1¹ of the figure. When SPPo1¹ is given, in order to estimate its space attribution, first, according to rotational search shown by white arrow from SPPo1¹ (search to estimate RPvo^z of the figure), pointer EPo¹ corresponding to the edge EGo and Z-value of RPvo^z (item number of RPvo^z within the EG block having EPo¹, Z=1 in this case). Next, from EPo¹, EPo within the characteristic pointer table of the vertex Vo in the address indicated by EPo¹ is estimated. Among the EG block indicating EPo, the position of the item number where condition Z=1 is set previously is searched, thereby Sao1¹ is estimated. Then, the KIND field and the pointer field in the same line is referred to. As a result, the attribution data SAo1¹ is estimated. In this case, since the attribution data SAo1¹ is set to the first space pointer field of the EGo block, it is deemed to indicate attribution of a partial space at the upper side of the Z direction adjacent to the left side of the edge EGo, i.e., the partial space on a surface having the edges EGo and EG1.

Figure 10A:
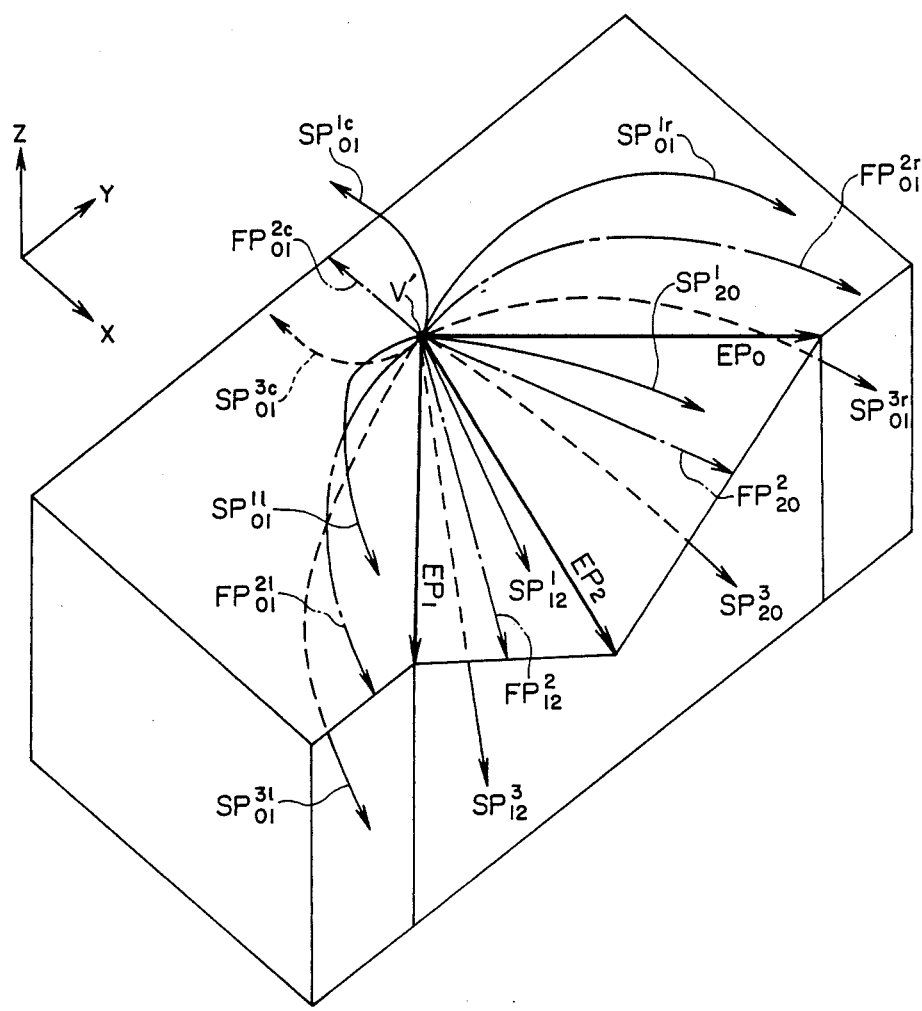
FIG. 10 (a) is an explanatory diagram of space data associated with a vertex having a concave space.
Figure 10B:
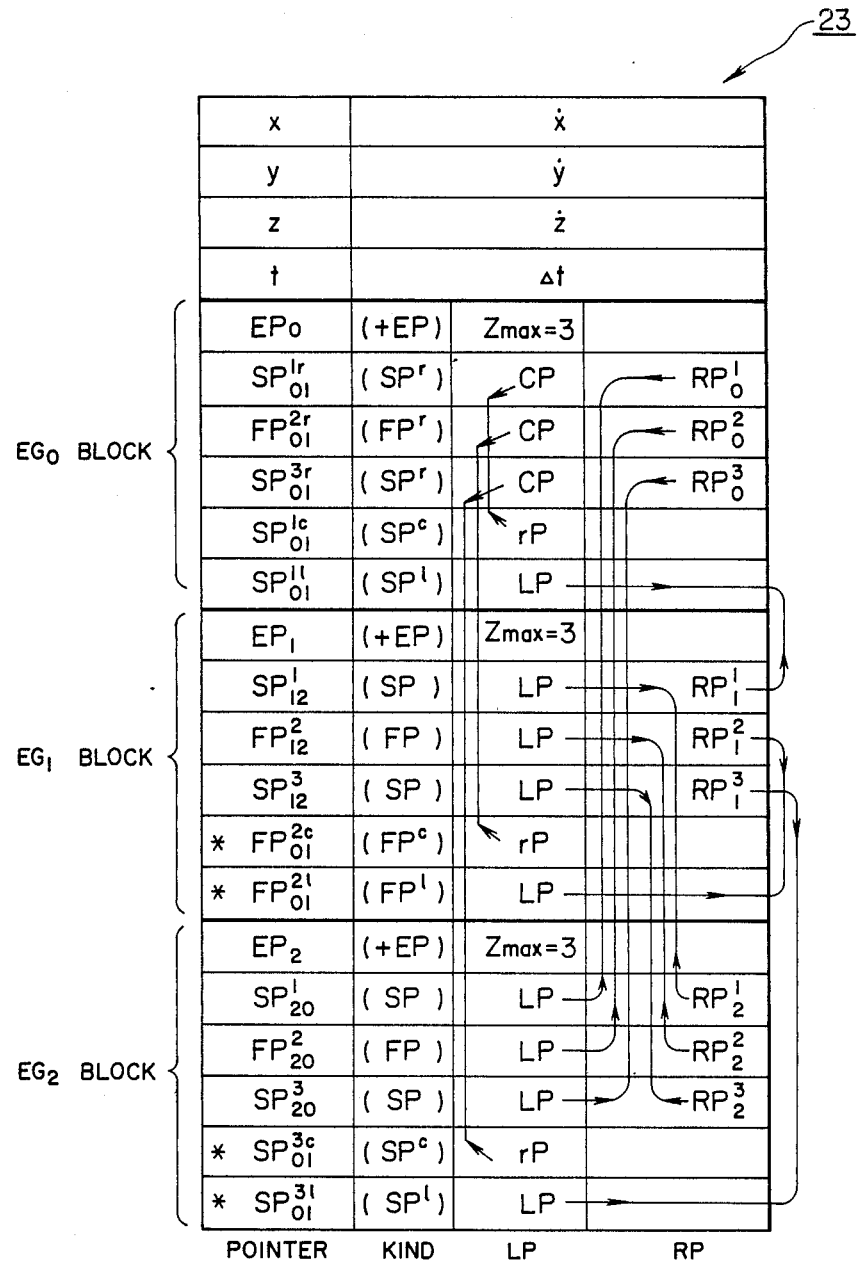

Attribution data for a surface can be searched in a similar manner. FIG. 10 (a) shows an example of a concave space and surface (in the figure, space and surface disposed at the left side of EPo viewing from V1 and also at the left side of EP1). FIG. 10 (b) shows an example where the concave space and surface of FIG. 10 (a) are represented in a characteristic point table.

Space pointer SP or surface pointer FP is provided with subscripts r, c, L for distinction in a similar manner to the case of two dimensions. Since the information amount increases in the EG block where pointers representing the concave space and surface in the characteristic point table are set, if these are set to the same EG block, the EG block field having a partial solid space with concave form will become large.

Consequently, specific information of a concave block is stored in an empty field of other block which is not concave, and the stored information can be referred to.

In the characteristic point table 23 of FIG. 10 (b), information of the EGo block is stored in the EG1 block and the EG2 block, and the stored block is indicated with * mark in the fields of the EG1 block and the EG2 block. The information of the * mark is one to be originally stored in the EPo block, and the position to be stored is indicated by a link information pointer pair cp-rp.

Figure 11A:
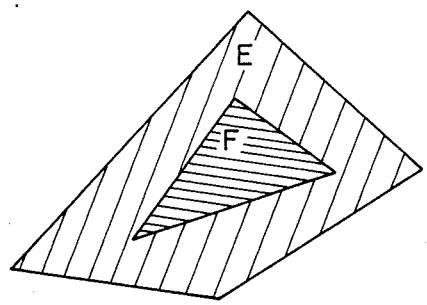
FIG. 11 (a) is a schematic diagram illustrating overlapped geometric data in a case where the overlapping is to be detected.
Figure 11B:
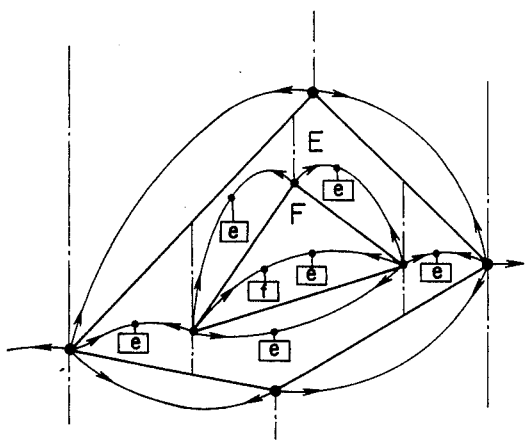

FIG. 11 (a) shows an overlapped figure where figures E and F are overlapped in the two-dimensional figure. For high speed search of a figure including such overlapped figure, color information such as "e, f" or space attribution data to mean geometrical code shown in FIG. 11 (b) is added to the characteristic table to constitute a space pointer pair. The space attribution data is set, for example, to the ATTR. field of the characteristic point table. More specifically, for setting of a plurality of space attribution data corresponding to the overlapped figure, the ATTR. field of the characteristic point table is divided into a plurality of space attribution fields, and space attribution data S-ATR are indicated in respective fields. For the space attribution data, special fields may be added corresponding to space pointers. Also, for the space attribution data, several bits may be assigned among bits of the ATTR. field.

In the characteristic point table or vertex table corresponding to the figure vertex which is not the end point in the X direction, a space pointer to constitute a pair may not be set. In other words, an empty area may be produced in the characteristic point table. So the space attribution data SA may be indicated in the empty area of the characteristic point table of the vertex which is not the end point in the X direction. However, if the figure does not include the vertex which is not in the X direction as shown in FIG. 4 (e), the space attribution SA cannot be set. In this case, SA must be added as shown in FIG. 4 (e), or a vertex having an angle of 180° formed between two edges without affecting the figure shape directly must be added at one position on the figure edge and SA must be set to the empty area of Vo vertex table corresponding to the added vertex.

Figure 12A:
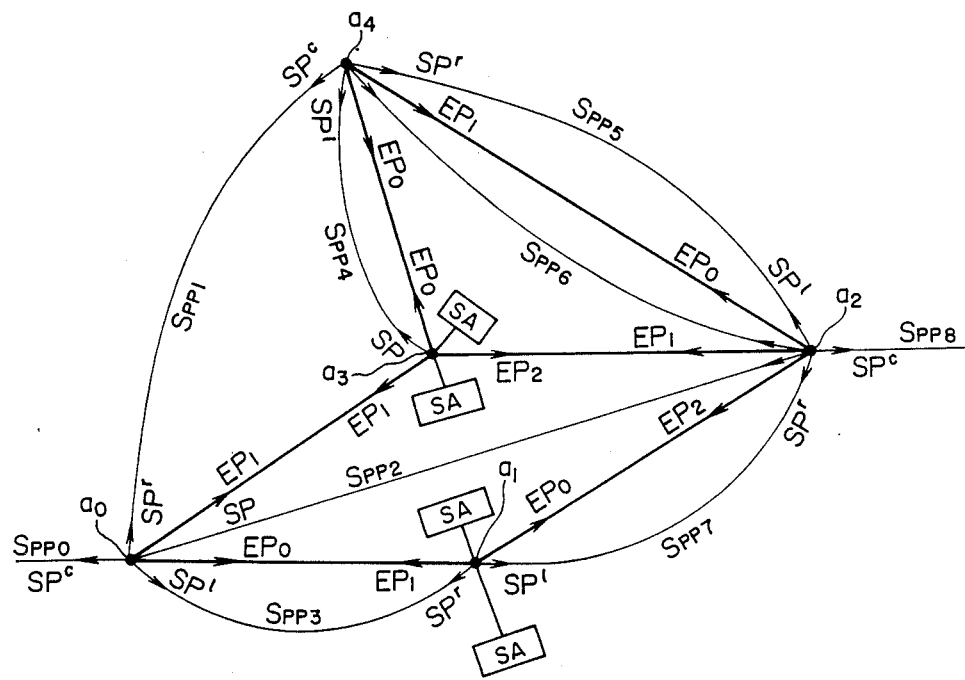
FIG. 12 (a) is a diagram depicting an example representing pointers in a two-dimensional, multicolor geometry.
Figure 12B:
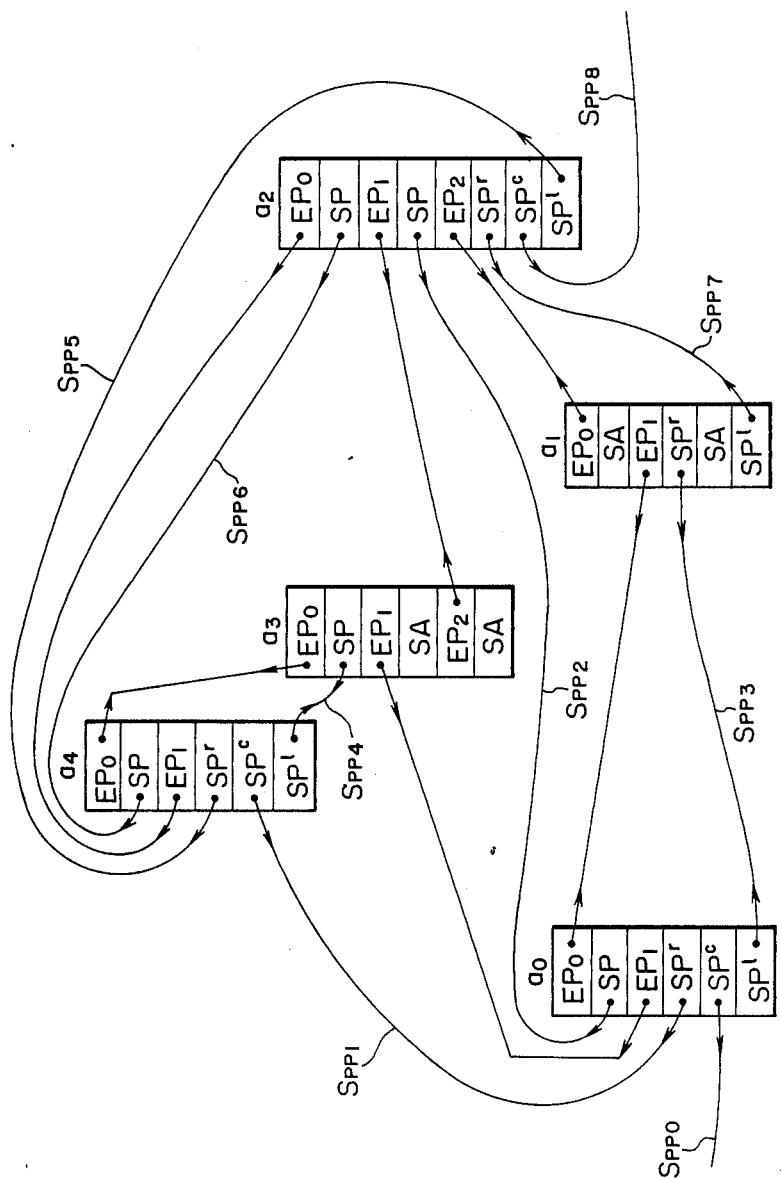

FIG. 12 (a) shows an example of a figure where an empty pointer is produced similarly to FIG. 4 (d). In FIG. 12 (a), the space attribution data SA may be set to the empty pointer portion. FIG. 12 (b) shows a characteristic point table corresponding to the figure in FIG. 12 (a). Coordinate data of a vertex to be set to each table shall be emitted.

In this constitution, whether or not the figure is overlapped can be readily found if the attribution field ATTR. of the characteristic point table for setting the space pointer pair is referred to by the program processing.

Figure 19:
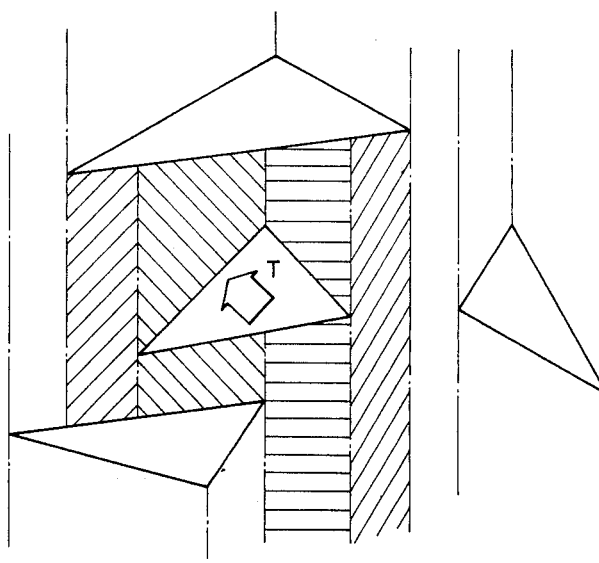
FIG. 19 is a diagram explaining spatial relationships with respect to a moving geometry.

FIG. 19 shows the case in which a figure T is moved in the geometrical space. In moving such a figure, it becomes a material subject to detect on what figure the figure T will impinge. For the observation of the adjacent figure relationship such as for anticipating the impingement of a moving two-dimensional figure on another one as shown in FIG. 19, the foregoing space data system is particularly effective. Namely, in the case of moving the coordinates of a moving figure as a function of time, the neighboring states of partial spaces can readily be searched by use of the space pointer pair. When the impingement of figures occurs or the space division mode varies, new space data is created in the latest space divisions. Accordingly, the system can readily be realized by sequentially searching and creating space data.

Figure 13:
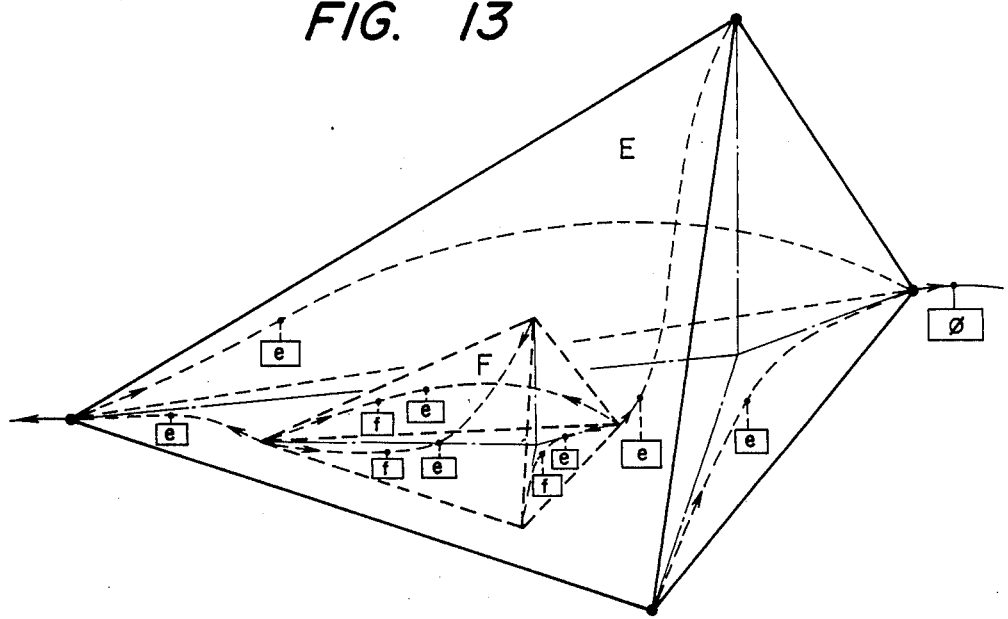
FIG. 13 is an explanatory diagram of the overlapped state of three-dimensional geometric data.
Figure 14B:
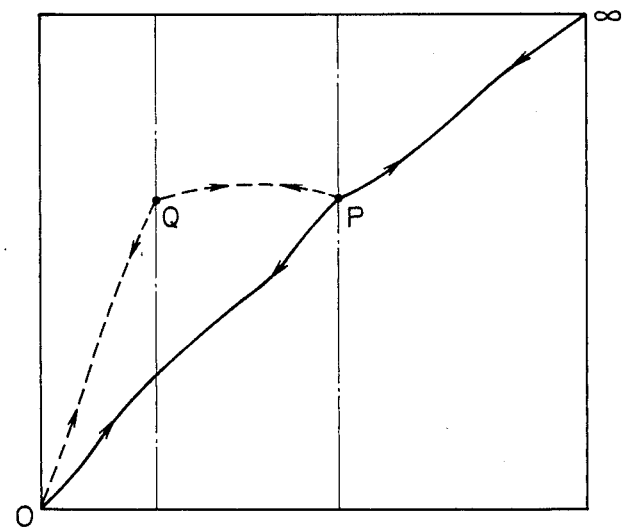
FIGS. 14 (a) to 14 (d) are diagrams for explaining procedures to generate the respective space pointer pairs.
Figure 14A:
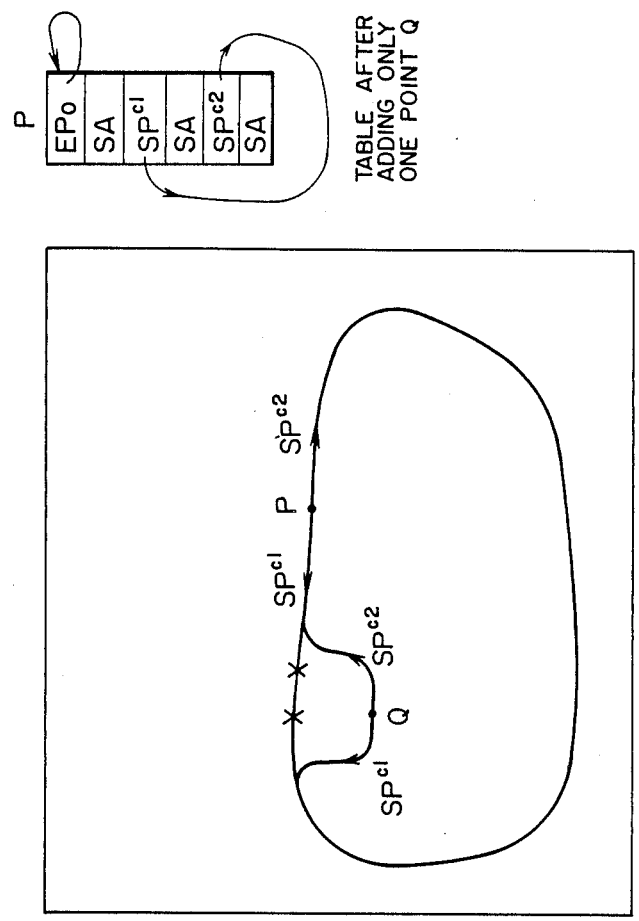
Figure 14A:
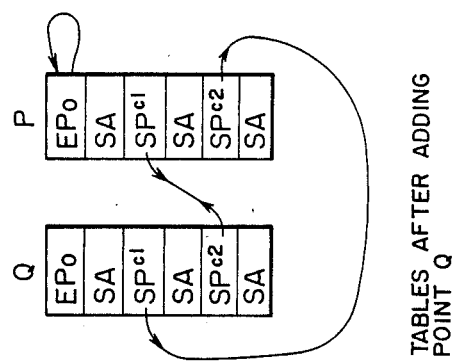
Figure 14D:
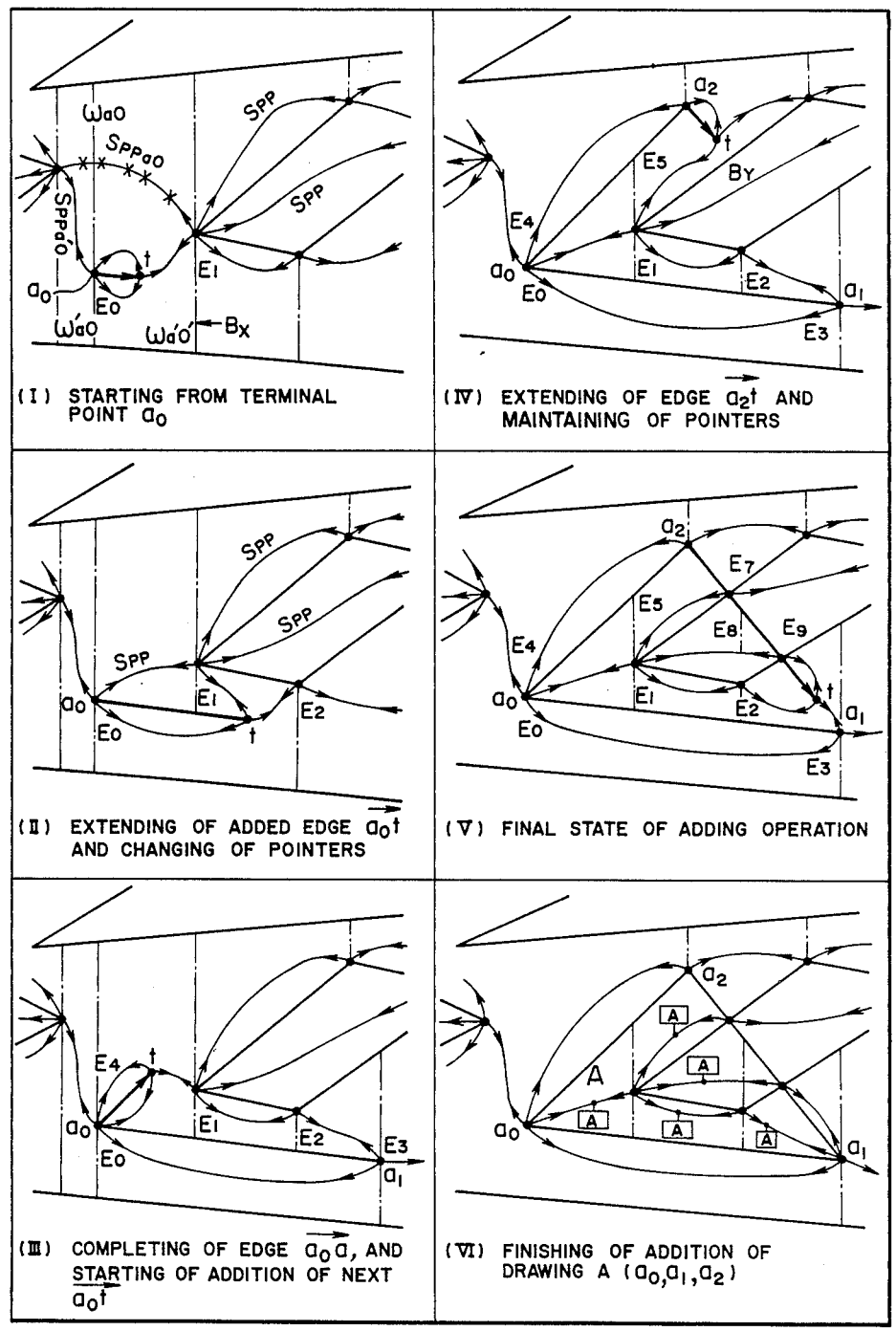
Figure 14E:
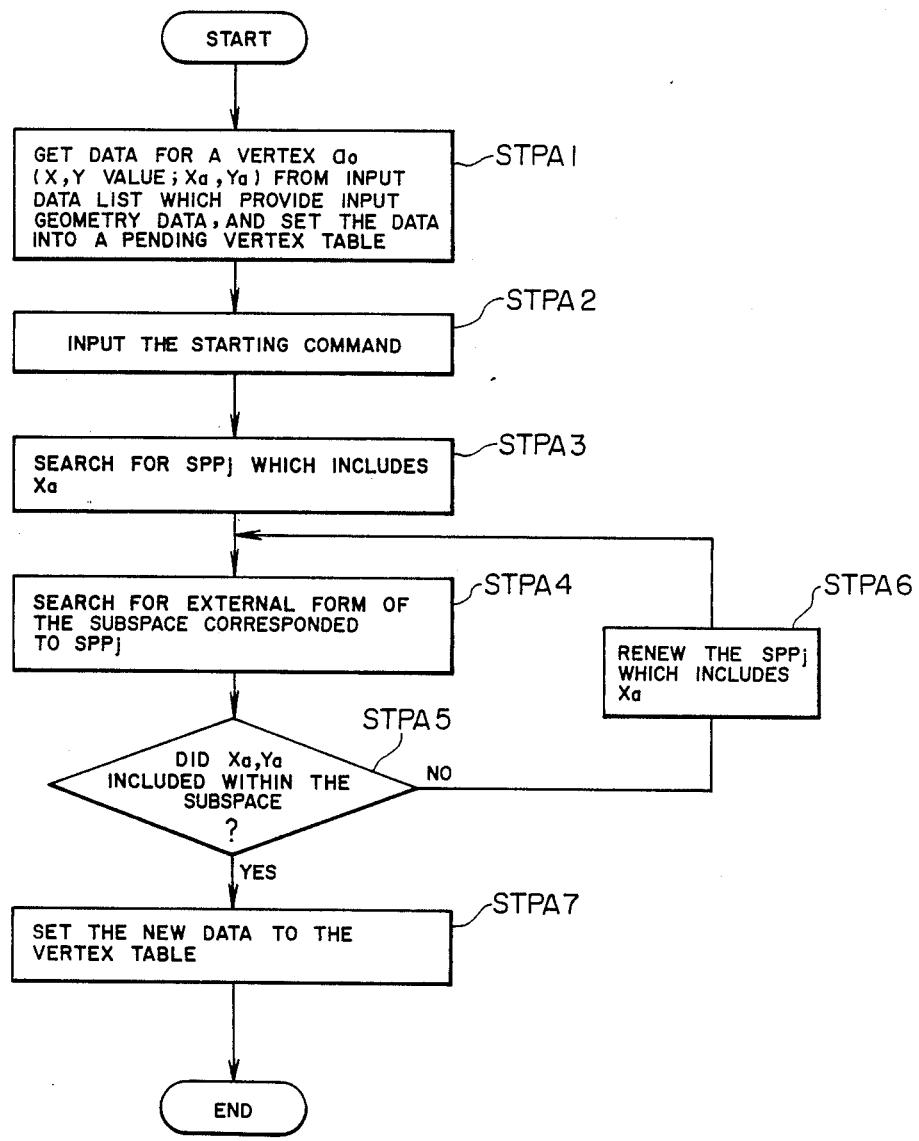
Figure 14F:
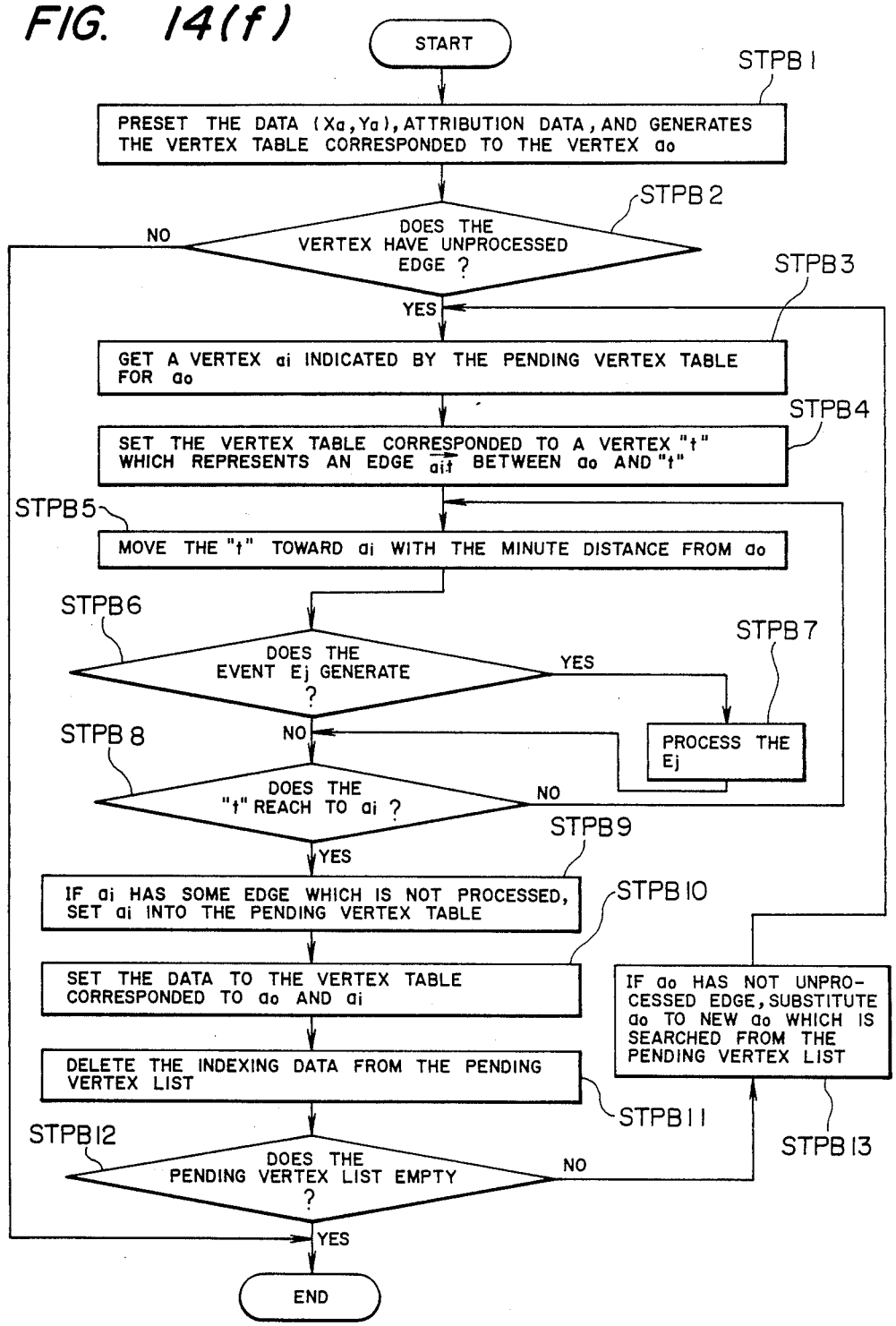
Figure 15A:
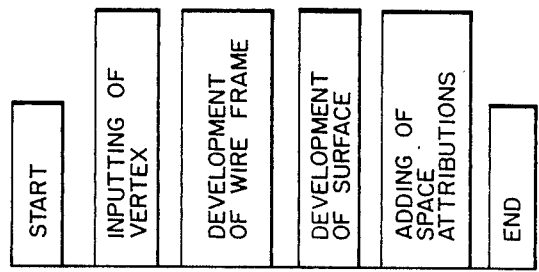
FIGS. 15 (a) to 15 (g) are diagrams respectively explaining procedures to input data in a three-dimensional data base.
Figure 15A:
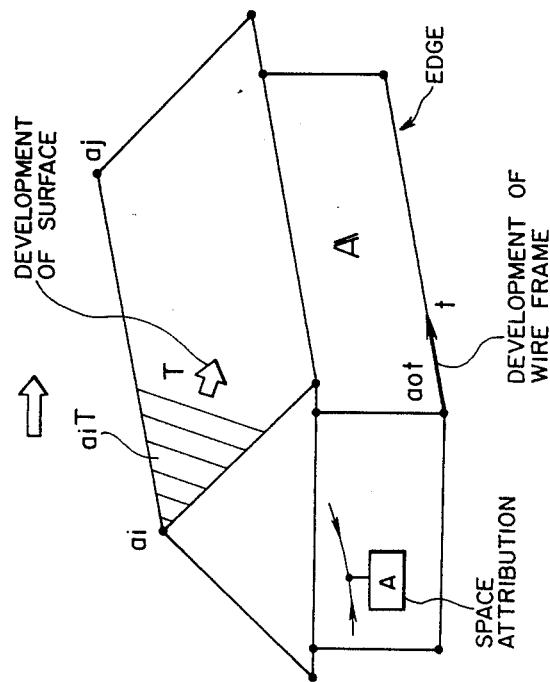
Figure 15B:
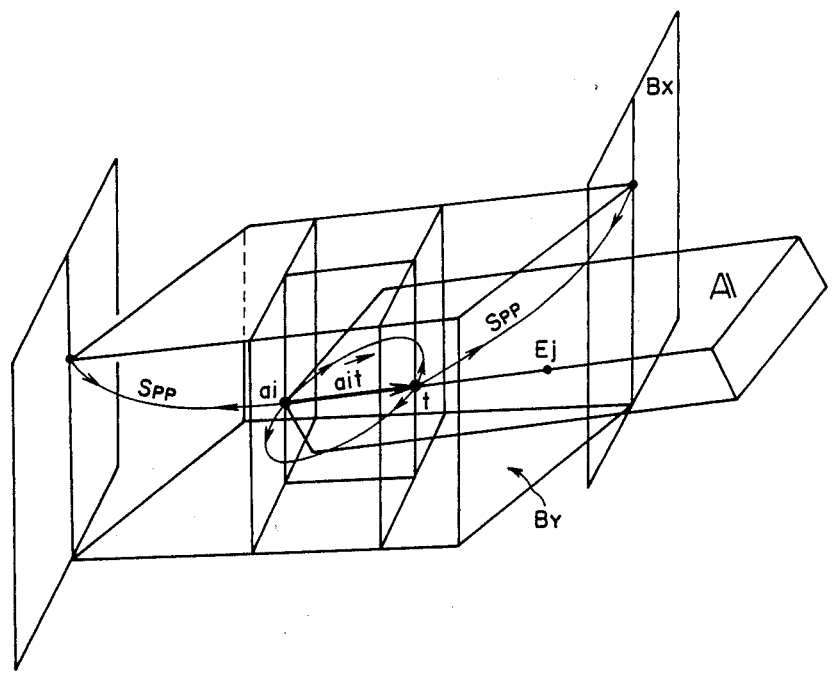
Figure 15C:
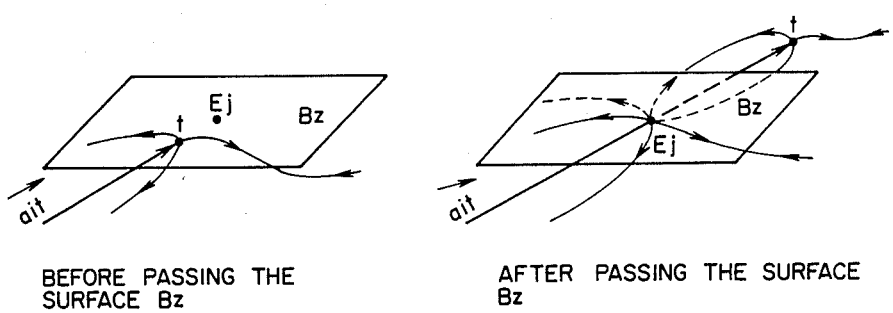
Figure 15D:
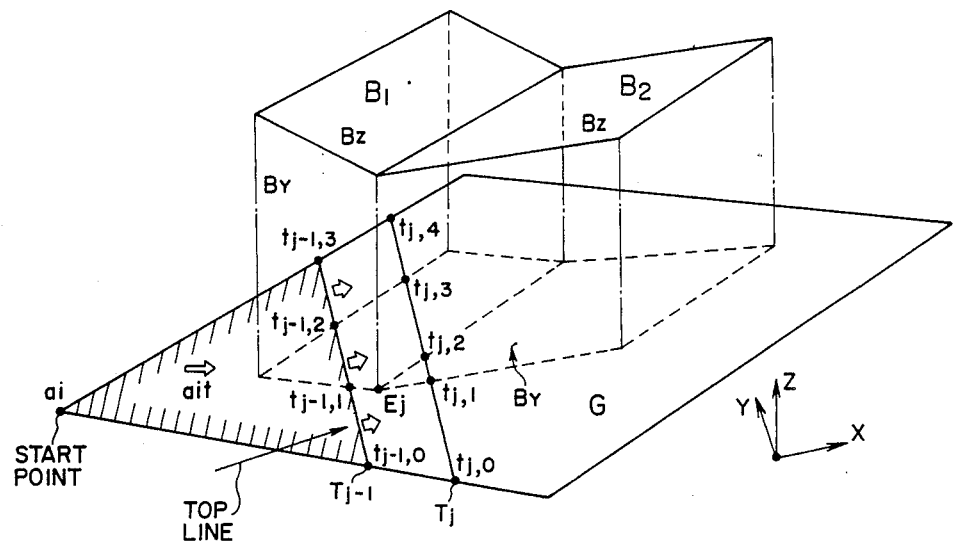
Figure 15E:
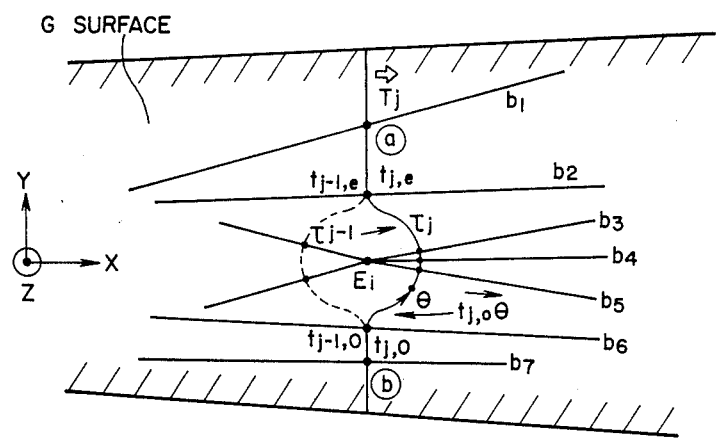
Figure 15F:
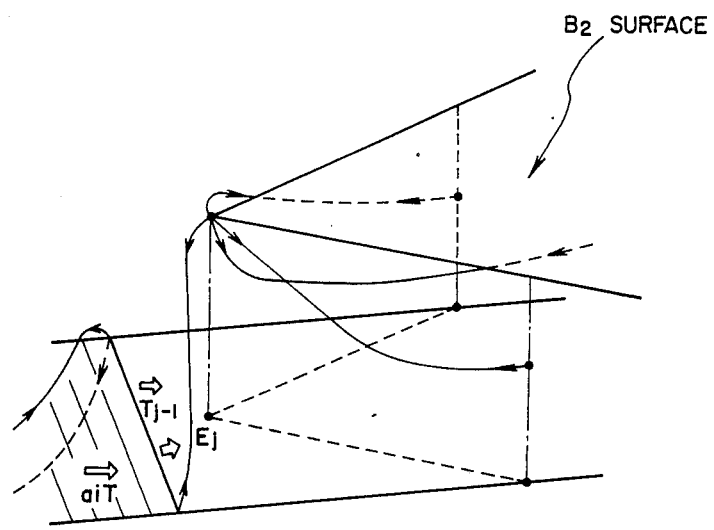
Figure 15G:
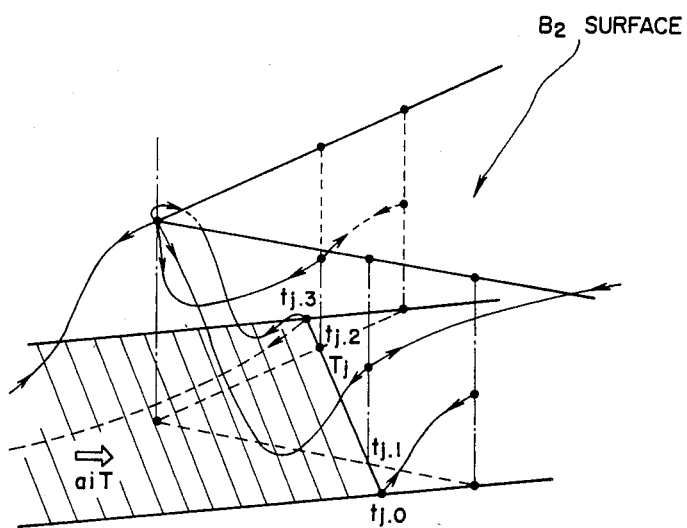

It will be appreciated that the above situation is also true for the characteristic point table 22 in FIG. 9 (b). The following deals with overlapping figures in a three-dimensional space. An example of overlapping figures corresponding to two-dimensional figures as shown in FIGS. 11 (a) and 11 (b) is a pair of tetrahedrons as shown in FIG. 13. The drawing-to-data relationship for the two-dimensional figure in FIGS. 12 (a) and 12 (b) is indentical to a three-dimensional drawing. In this case, however, depiction of the geometric relationship of the drawing is complex, and it is not shown here.

Addition of a new figure to the geometrical space and removal of a figure from the geometrical space signify the creation and deletion of a new partial space. The following describes the creation of a space pointer pair in a two-dimensional space with reference to FIGS. 14 (a), 14 (b), 14 (c) and 14 (d). First, the drawing shown in FIG. 14 (a) will be described. FIG. 14 (a) shows a simplest example, in which a point P is set and thereafter a point Q is set. Initially, a characteristic point P as a reference point is inserted in the geometrical space. In this case, only a single point P is inserted and no other characteristic point exists. For facilitating the understanding of the table of FIG. 14 (a), features of the characteristic point table will be described in connection with FIG. 4 (c) and FIG. 12 (a).

As has been explained previously, a geometrical space is assumed to be divided into a plurality of partial spaces by characteristic points such as vertexes constituting end points in the X-axis of the drawing. In this case, as is obvious from FIG. 4 (c) and FIG. 12 (a) a concave space made up of two spaces adjoining at an angle of 180° or larger between two edges including the end points in the X-axis is defined by setting three space pointers originating from the vertexes. One space pointer is for a partial space extending on the left side from the vertex toward the concave space, such as $SP_{1,0}^L$ in FIG. 4 (a) and $SP^L$ in FIG. 12 (a), and other one pointer is to express a partial space existing adjacent to the left side of the figure side $P_1$ and extending from the vertex toward the concave space, such as and $SP_{1,0}^r$ and $SP^r$. A remaining space pointer is to express a partial space existing at the center of the concave space, such as $SP_{1,0}^C$ and $SP^c$.

In FIG. 14 (a), insertion of the characteristic point P does not impose a restriction, but the characteristic point P is regarded virtually as two points. On this account, the space point $SP^{c1}$ is made to indicate the space pointer $SP^{c2}$ in the same table for the characteristic point P, while the space pointer $SP^{c2}$ is made to indicate the space pointer $SP^{c1}$. Based on the idea of space division described previously, a geographical space is split on a imaginary line passing through the point P and extending perpendicularly to the X-axis by the insertion of the characteristic point P. In case only the characteristic point P exists, a space having its X-axis coordinate more negative than P connects via $X=-\infty$ to $X=+\infty$, with the result of connection with a space having its X-axis coordinate more positive than P, and it may be conceived that both spaces are integrated and expressed by the combination of space pointers $SP^{c1}$ and $SP^{c2}$. The point on the drawing may be regarded as a special edge, i.e., an edge having no length. On this account, the edge pointer EPo in the table of FIG. 14 is arranged to indicate its own address, although it is not confined to this. In this case, it becomes apparent that a vertex table signifies a figure as a point through the reference of the edge pointer EPo, and it will be appreciated that there is no inherent distinction between the space pointers $SP^{c1}$ and $SP^{c2}$. The remaining space pointers may be dealt with, for example, by setting a space attribute SA which expresses vacancy.

Subsequently, when the characteristic point Q is inserted as a second characteristic point, the aforementioned loop for the characteristic point P is released, and a space pointer pair is formed against the characteristic point Q.

The space pointer pair for the characteristic points P and Q following the addition of Q is created as follows. The memory address where the space pointer information (right-hand space pointer $SP^{c2}$) for the characteristic point Q is stored is memorized in the position of the space pointer SP (left-hand space pointer pair $SP^{c1}$) corresponding to the characteristic point table for the characteristic point P, and the address where the space pointer information (left-hand space pointer $SP^{c1}$) for the characteristic point P is stored is memorized in the position of the space pointer SP (right-hand space pointer $SP^{c2}$) corresponding to the characteristic point table for the characteristic point Q. Consequently, the space pointer pair for the partial space between the characteristic points Q and P is established. Similarly, for the setting of the space pointer pair for the characteristic point P outside of the characteristic point Q, the memory address where the space pointer information (left-hand space pointer $SP^{c1}$) for the characteristic point Q is stored is memorized in the location of the space pointer SP (right-hand space pointer pair $SP^{c2}$) corresponding to the characteristic point table for the characteristic point P, and the address where the space pointer information (right-hand space pointer $SP^{c2}$) for the characteristic point P is stored is memorized in the location of the space pointer SP (left-hand space pointer $SP^{c1}$) corresponding to the characteristic point table for the characteristic point Q.

Next, the generation of a space pointer pair based on the reference characteristic point (termed simply "reference point" hereinafter) will be described. As shown in FIG. 14 (b), when the first and second reference points are placed on the origin and an infinite distance point $(X=+\infty, y=+\infty)$ on the X-Y coordinate system, characteristic points other than the first-entered characteristic point P merely include the first reference point O and the second reference point $\infty$. Accordingly, a space pointer pair is formed between these two points. The space pointer pair is generated as follows. The space pointer pair for the first reference point O for the characteristic point p is generated by storing the address containing the space pointer information for the first reference point O into the location of the space pointer SP corresponding to the characteristic point table for the characteristic point P, while storing the address containing the space pointer information for the characteristic point P into the location of the space pointer SP corresponding to the characteristic point table for the first reference point O. Similarly, the space pointer pair for the second reference point $\infty$ for the characteristic point P is generated by storing the address containing the space pointer information for the second reference point $\infty$ into the location of the space pointer SP corresponding to the characteristic point table for the characteristic point P, while storing the address containing the space pointer information for the characteristic point P into the location of the space pointer SP corresponding to the characteristic point table for the second reference point $\infty$. The characteristic point table providing the initial characteristic points is thus completed, and in consequence the space pointer pair is generated.

Assuming that the characteristic point Q is added as the second characteristic point between the origin and the first characteristic point P, points existing more positive on the X-axis than the characteristic point P are the characteristic point Q and the second reference point $\infty$. The characteristic point Q is located between the first reference point, i.e., the origin, and the characteristic point P. The characteristic point P has its space pointer more negative on the X-axis being paired with the space pointer for the characteristic point Q. Namely, the address containing the space pointer information for the characteristic point Q is stored in the location of the space pointer corresponding to the characteristic point table for the characteristic point P, while the address containing the space pointer information for the characteristic pointer P is stored in the location of the space pointer SP corresponding to the characteristic point table for the characteristic point Q. In this case, the space pointer on the $+\infty$ side is not changed. Similarly, the space pointer pair for the first reference point O of the characteristic point Q is generated by storing the space pointer information for the first reference point O into the position of the space pointer corresponding to the characteristic point table for the characteristic point Q, while storing the address containing the space pointer information for the first reference point O into the location of the space pointer corresponding to the characteristic point table for the characteristic point Q. These are the method for initially entering point data into the graphic data base, and a similar method is applicable to the case in which a plurality of drawings are already stored in the graphic data base.

Setting of a point figure is implemented by dividing the geometrical space successively in accordance with entered points as described above. In contrast to this, in setting figure edges, it becomes necessary to clarify the relationship between new figure edges to be set and figure edges which have been set in the geometrical space and its partial spaces. The graphic processing system includes a new processing method for such new figure edges. In brief, setting of figure edge data is implemented by initially entering points, and then extending proper lines along edges to be obtained by making reference to these points (termed "input lines" hereinafter). As the input lines extend, changes occur in the topology of division of the input lines and the topology of partial spaces. During these changes, the connecting relationship for the edge pointers and space pointers is changed. These points where changes occur in the connecting relationship of the edge pointers and space pointers will be termed "events" in the following discussion.

The following describes, first for the case of two-dimension, the method of entering figure edges based on points which have been entered by the foregoing point data entry method. First, the entry of a figure (called figure A hereinafter) will be described with reference to FIGS. 14 (c) and 14 (d). For the entry of figure A, a vertex ao is entered by the input processing for points described previously. After that, as seen in (I)-(VI) of FIG. 14 (d), a polygonal line aot starting at the vertex ao is extended along the edges of the figure A. If the extension of the line aot necessitates changes of space division (called "event Ej"), the space pointer pair SPPi is renewed sequentially. After the figure A has been rounded along its edges, space attributes including the figure name and color of the figure A are added to the space pointer pair SPPi for the space within the figure A. Entry of the figure A is thus completed.

The above procedure is called "developing process" for figure A. Events caused by the extension of aot occur basically only when the top t of the extending aot breaks through the boundary Bx or By of the space. On this account, the space pointer pair SPPi merely necessitates an intermittent maintenance.

Possible types of events are the above-mentioned break through of the boundaries Bx and By by the aot and processings at the start point and end point of the aot, as listed in FIG. 14 (c).

The event processing program is designed to identify the type of an event occurring subsequently and change the connection of pointers in accordance with the identified result. In order to simplify the handling by reducing the types of events, a possible method is to restrict the extension of aot in one direction by resolving all edges of the additional figure into polygonal lines in the direction from $X^-$ to $X^+$ at the beginning as shown in FIG. 14 (d).

The developing process is a local process confined in a space around the input figure edges (extension process for aot) and the interior of the input figure (addition of space attributes), as in the case of the foregoing rotation search and the like. On this account, the maintenance time for the space pointer file (SPF) is expected to be improved to around $o(N^\circ)$ besides the speed-up of point entry (guidepost process), as will be described using FIGS. 16 (a) and 16 (b) later, and the initial generation time for the overall SPF is expected to improve to around $o(N)$, provided that special cases can be ignored and the number of geometrical spaces to which space attributes are to be added inside the input figure is independent of the total number of vertexes N.

In consequence, although the above conditions are imposed, the SPF is expected to be a sophisticated graphic data base suitable for both online and batch processings.

FIG. 14 (e) shows in a flowchart an example of the processing for forming space data. The flowchart shows the processing for convexes or characteristic points of a figure carried out initially in entering geographical data. The processing for the edges of the figure will be explained later in connection with the flowchart of FIG. 14 (f).

In the processing step STPA1 in FIG. 14 (e), coordinates Xa and Ya of an object convex ao and attribute data for the figure are set in the input data list. By making reference to the input data list, data for indicating unprocessed vertexes corresponding to the vertex ao is set in the pending vertex table.

In step STPA2 next to the step STPA1, the commencement of point data processing is dictated.

In steps STPA3 and STPA4, the partial space in which the object vertex is located is searched. Namely, the step STPA3 searches for the space pointer pair SPPj which includes the X-coordinate Xa of the vertex ao. Searching is conducted by way of starting with an appropriate space pointer pair and following space pointer pairs near the Xa. The following describes in more detail the search process using the vertex tables of FIGS. 4 (a) and 4 (b) and the example of the geometrical space shown in FIG. 5 (b).

Figure 16A:
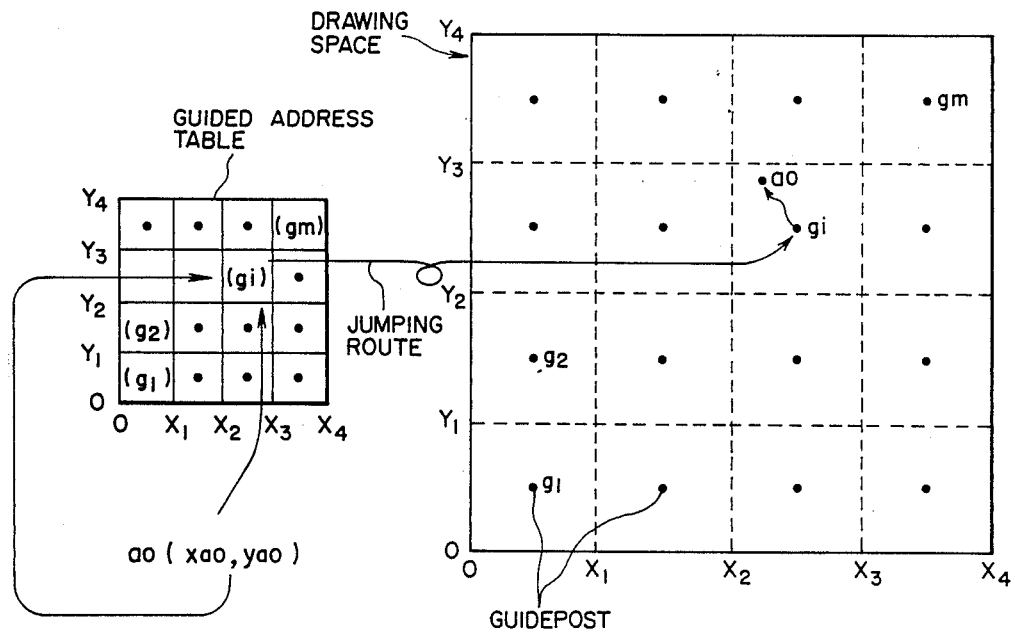
FIG. 16 (a) is an explanatory diagram of a guidepost processing to retrieve characteristic points in the two-dimensional representation at a high speed.
Figure 16B:
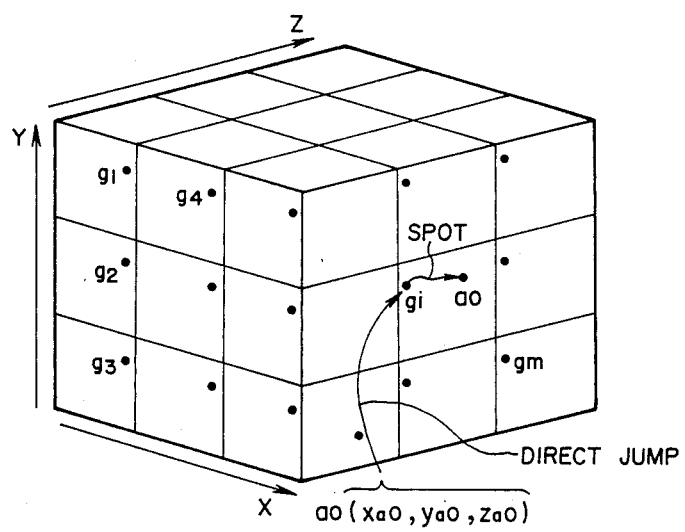
Figure 17A:
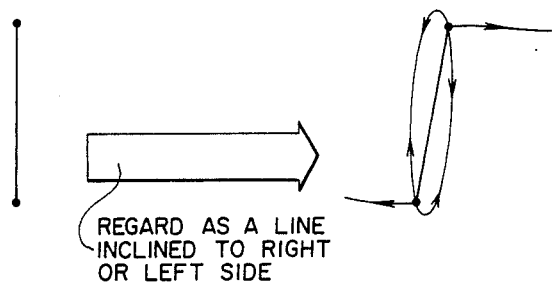
FIGS. 17 (a) to 17 (c) are explanatory diagrams of procedures to generate space pointer pairs in the respective special conditions.
Figure 17B:
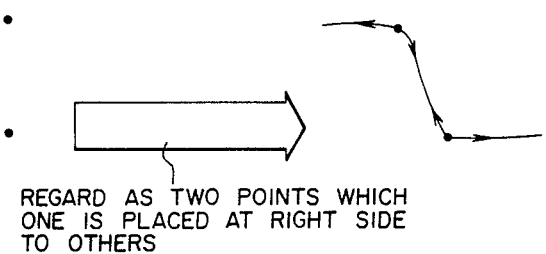
Figure 17C:
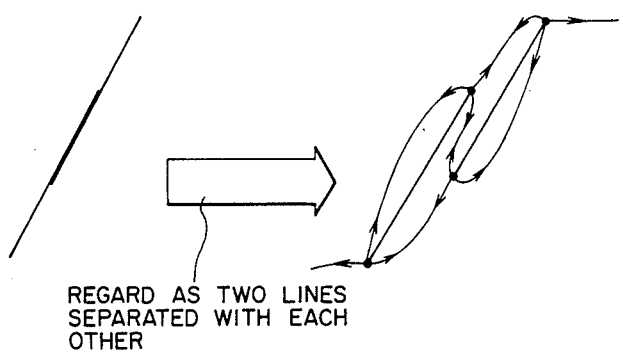
Figure 17D:
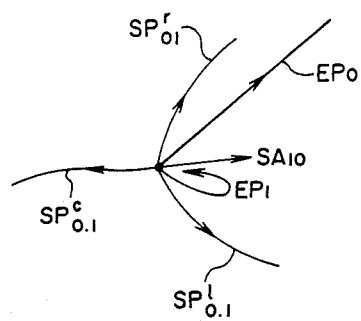
Figure 17G:
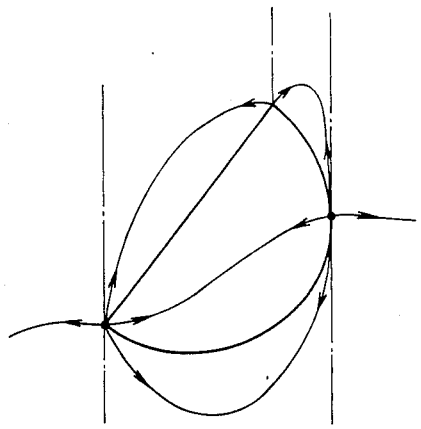
Figure 17E:
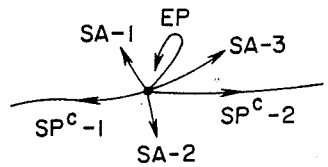
Figure 17F:
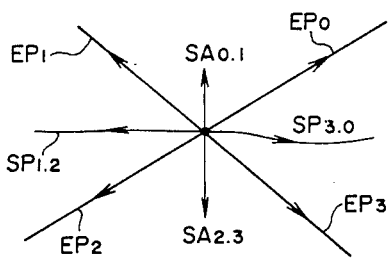
Figure 18A:
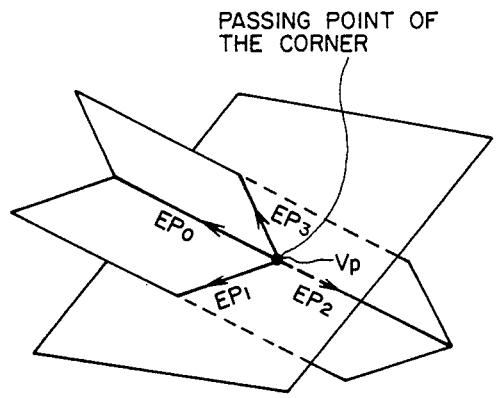
FIG. 18 (a) and 18 (b) are diagrams for respectively explaining the passing point of the corner and the characteristic point table in the three-dimensional representation.
Figure 18B:
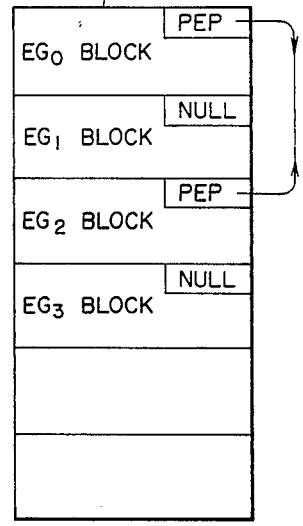
Figure 18C:
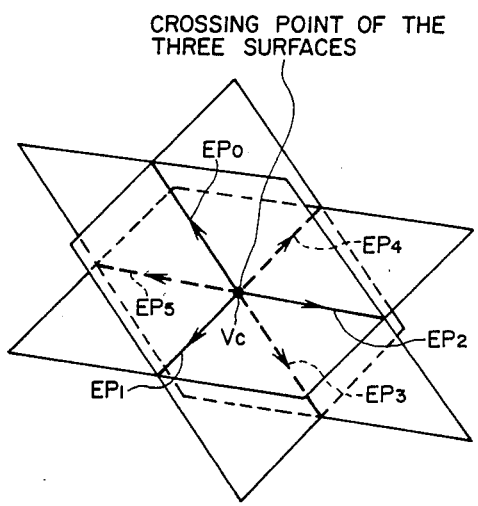
Figure 18D:
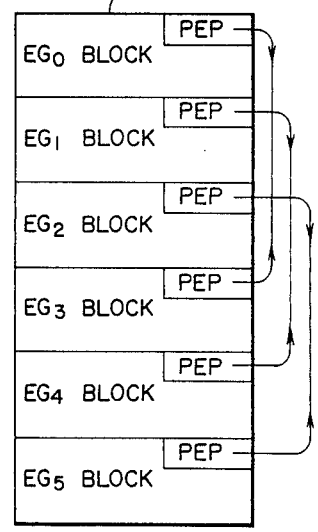

Initially, reference is made to the first space pointer in the first vertex table in correspondence to the starting pointer pair. Using this space pointer pair, the space pointer pair corresponding to the second vertex table (termed "second space pointer" hereinafter) is directly searched. Reference is made to the X-coordinate field of the second vertex table at which the second space pointer has been set. The X-coordinate in the first vertex table is compared with the counterpart Xa in the second vertex table. If Xa resides within the range defined by the X-coordinates in the first and second vertex tables, the processing of step STPA3 terminates. If, on the other hand, Xa is out of the range defined by the X-coordinates in the first and second vertex tables, the following process proceeds. Namely, a vertex table containing X-coordinate data nearer to Xa, among the first and second vertex tables, is selected. In the selected vertex table, a new space pointer is selected, and it is used to make reference to a space pointer in another vertex table. A similar process is repeated, and finally the space pointer SPPj including Xa is searched. In order to speed up the search of step STPA3, a space pointer near Xa needs to be selected at the beginning. A desirable method for setting a proper pointer initially uses a guide post address table, as shown in FIGS. 16 (a) and 16 (b), and this method will be explained in detail later.

After the space pointer pair SPPj has been searched in step STPA4, the following step STPA4 determines the outer shape of the partial space expressed by SPPj. Among the outer shape factors, the X boundary is indicated by the X-coordinate in the vertex table in which the space pointer pairs are set. The outer shape in the Y direction is obtained by rotary search as shown in FIG. 5 (b). There is the following relationship between rotary search and vertex tables as shown in FIGS. 4 (a) and 4 (b). In one vertex table, space pointers and edge pointers related to a vertex of a figure are set in the counterclockwise direction around the vertex. Accordingly, counterclockwise rotary search is equivalent to referencing to the row next to the row in attention in each vertex table. For example, when a space pointer $SP^c$ on the fifth row in the table as for SPPj in the step STPA3, reference is made to the pointer $SP_{1,0}^L$ on the sixth row in the same table by implementing a counterclockwise rotary search. The pointer $SP_{1,0}^L$ is used to make reference to a pointer in another vertex table (second vertex table) indicated by the pointer $SP_{1,0}^L$. Similarly, in the second vertex table, reference is made to the row next to the pointer which has been referenced.

After an edge pointer has been searched, it is used to obtain the edges of the figure. Namely, the edge pointer is referenced to obtain the corresponding edge pointer, and subsequently by referencing the X and Y coordinates in two vertex tables where the two edge pointers are set, the edge of the figure is obtained. If the X range of the edge clarified by the two edge pointers is within the range of the partial space clarified by the object space pointer pair SPPj, the obtained edge signifies the outer shape edge on the positive Y direction in the partial space to be determined. Otherwise, reference is made to a pointer on the row next to the newly obtained edge pointer. The similar search and determinative operations are repeated until the outer shape edge on the positive Y direction for the object geometrical space is obtained.

After the outer shape of the partial space expressed by the space pointer SPPj has been obtained in step STPA4, the sequence proceeds to the next process (step STPA5). The step STPA5 tests as to whether the vertex (Xa, Ya) to be set resides within the partial space obtained in step STPA4. If the vertex is found to be outside the range, the process in step STPA6 will be executed. Step STPA6 is to search (Y-direction search) for a partial space nearer to the vertex (Xa, Ya) to be set among partial spaces adjacent above or below the partial space obtained previously. Implemented in the searching operation are references to space pointers located on the rows above and below the space pointer obtained in advance, and determination similar to that mentioned previously. These references and the determinative process is identical to that mentioned before, and detailed explanation thereof is omitted here.

Following the Y-direction search in step STPA6, the processes of steps STPA4 and STPA5 are carried out again. The steps STPA4 through STPA6 take place cyclically until the partial space to be obtain becomes to include the vertex (Xa, Ya).

After the partial space including the vertex (Xa, Ya) has been obtained by the above steps, the sequence proceeds to the next step STPA7. The step STPA7 establishes space data so that the partial space obtained in advance is divided by the vertex (Xa, Ya). Namely, the space pointer indicating one space pointer constituting SPPj is set in a space pointer field such as the second row of the vertex table for the vertex (Xa, Ya), and a space pointer indicating another space pointer constituting SPPj is set in a space pointer field such as the fourth row of the vertex table. Space pointers constituting SPPj are modified to indicate the space pointers in the vertex table for the vertex (Xa, Ya). After the step STPA7, data indicating the generation of the vertex table for the vertex ao is erased in the pending vertex table, although it is not shown in the figure. Thereafter it is checked as to whether data indicating "unprocessed" remains in the pending vertex table. In case a drawing is made solely of dots, the pending vertex table after the above erasing process becomes vacant, and the figure entry process is complete.

FIG. 14 (f) shows in a flowchart the process for forming edge data, i.e., the developing process. The process of FIG. 14 (f) is designed to produce a vertex table for one of the vertexes of a figure and then extend edges from that vertex, although it is not limited to this. This method enables the speed-up of the process as compared with the method of producing vertex tables for all vertexes through the process as shown in FIG. 14 (e).

Initially, in step STPB1, the process as shown in FIG. 14 (e) is carried out, and consequently the vertex table for the first vertex ao of a figure is produced.

In the next step STPB2, reference is made to the pending vertex table corresponding to the vertex ao, and checking is made for the presence or absence of data indicating unprocessed data. If the vertex ao indicates a point figure, erasure which has been explained in connection with FIG. 14 (e) results in the inexistence of data indicative of unprocessed data, and in this case the process ends. If the vertex ao is one of several vertexes of a figure, data indicative of the formation of edges between vertexes will remain in the pending vertex table even after the above-mentioned erasure, and in this case, the next step STPB3 will be carried out. The step STPB3 makes reference to the next vertex ai indicated by the pending vertex table.

In step STPB4, a subsidiary vertex table is prepared for indicating a subsidiary vertex which forms a line ait, as shown in FIG. 14 (d), between the first selected vertex ao and the next vertex ai. In this case, the line ait is provided between the vertexes ao and t, and therefore an edge pointer pair and space pointer pair are set in the vertex tables of these vertexes. The vertex t established in step STPB4 is made to have virtually the same X and Y coordinates as those of the vertex ao, although it is not limited to this. Namely, the line ait is made to have a length virtually equal to zero.

The step STPB4 is followed by step STPB5. In STPB5, the subsidiary vertex t is moved toward the intended vertex ai by an intended distance on the coordinates. Namely, data in the X and Y coordinate fields in the subsidiary vertex table is modified.

The subsequent step STPB6 checks the generation of an event Ej. Generation of an event Ej can basically be checked through the test as to whether the moved subsidiary vertex t has traversed the X$^-$ or X+ boundary formed in coorespondence to the existing vertexes or edges of the existing figure, as is obvious from FIGS. 14 (c) and 14 (d).

Upon detection of event generation by the step STPB6, the event processing in step STPB7 is implemented. The event processing in step STPB7 is to connect various pointers in the subsidiary vertex table. This process is virtually apparent from the above description on FIGS. 14 (c) and 14 (d), and the explanation thereof will be omitted here.

Following the step STPB6 or STPB7, the determinative process of step STPB8 takes place, in which it is checked as to whether the subsidiary vertex t has been moved up to the intended vertex ai. If the test result is negative, a series of processes starting with STPB5 will be carried out again. Upon coincidence of the subsidiary vertex t with the vertex ai as determined in step STPB8, the sequence proceeds to the next step STPB9. In step STPB9, if the vertex ai is found to be an unprocessed vertex, indication data for the vertex ai is set in the pending vertex table, and thereafter the sequence proceeds to step STPB10. In step STPB10, a vertex table for the vertex ai is prepared. This can be done easily since pointer data to be set for the vertex ai is set in advance in the vertex table for the subsidiary vertex t. The subsequent step STPB11 erases data indicative of the formation of an edge between the vertexes ao and ai in the pending vertex table.

In the subsequent step STPB12, reference is made to the pending vertex table so as to check as to whether or not data indicative of the presence or absence of unporcessed data exists in it. In case a drawing consists solely of a line between the vertexes ao and ai, the indication data is not left in the pending vertex table after the above-mentioned erasure, and therefore the process will end. In another case where the drawing is a polygonal figure, several edges are provided for each of the vertexes ao and ai. In this case, data indicative of unprocessed data is still left in the pending vertex table, and consequently the following step STPB13 is executed.

Step STPB13 makes reference to data indicative of unprocessed edges in the pending vertex table. Among vertexes which have been provided with vertex tables in the above steps, a new vertex having an unprocessed edge is replaced with the old vertex ao. Needless to say if the old vertex ao still has an unprocessed edge, it may take the place of a new vertex. After the step STPB13, the processing of step STPB2 is carried out again. In this way, the process of FIG. 14 (f) continues until the pending vertex table becomes vacant. There is an erasing process opposite to the developing process, but the explanation thereof will be omitted here because of it being a completely reverse procedure.

Next, the generating process for a three-dimensional space pointer pair SPPi will be described. The generation processing time for three-dimension is of the order of $O(N)$, when special cases are ignored, and the maintenance process such as for partial modification is as fast as $O(N°)$ (unrelated to N). Three-dimensional SPF generation can be accomplished by adding figures one by one to the SPF as in the case of two-dimension.

As shown in FIG. 15 (a), a conceivable method for the entry of a figure A is such a step-by-step method in which a vertex ao is entered first as will be described shortly, a wire frame made up of edges of the figure are entered, the frames are paneled with surfaces, and finally the internal space is filled with space attributes (attributes are added to the SPP). Besides the above method, a conceivable methods for adding a figure is the direct entry of surfaces without provision of a wire frame following the entry of a point ao, and the expansion of the volume of the figure A from a point ao.

Addition of a point ao (xao, yao, zao) to the SPF is basically identical to the case of two-dimension. Namely, the SPF is searched for the space SSPao including the point ao, the found space SPPao is cut where the point ao is linked. Search for the SPPao is implemented as follows. First, $SPP^o$ is taken arbitrarily, and from here the adjacent space is followed in the X direction until the X coordinate of the point ao reaches the space including xao. Subsequently, only spaces including xao are followed in the Y direction. Namely, spaces including both of xao and yao are searched. Finally, from here adjacent spaces including both of xao and yao are followed in the Z direction. This method always reaches the point ao (for an example of two-dimensional case, see FIGS. 14 (c) and 14 (d)).

This method avoids looping and vibration on the search route, and the search time is substantially proportional to the distance between $SPP^o$ and point ao. Therefore, an averate speed around $O(N^{\frac{1}{3}})$ can be achieved for the total number N of vertexes provided that special cases are ignored. For the further speed-up of the process, the entire geometrical space is divided into m segments, as shown in FIG. 16 (b), with directly accessible guide points gi (i=1, 2, ..., m) being set in advance, and when the coordinates of the point ao are given, a direct jump is made to the nearest point gi, from which an approach is made to the point ao by the above-mentioned method. This method of a type of backet sort system accomplishes the speed-up to the order of $O(N)$ except for special cases.

Next, SPF development for the wire frame will be described. Following the entry of the point ao as described above, a line aot starting with the point ao is extended along the edges of the input figure A in accordance with FIG. 15 (b). Namely, a wire frame made up of the edges of the figure A is developed on the SPF. As aot extends, when its top t breaks through a wall of the surrounding space, the topology of space division varies, causing the need for changing the connection of SPP accordingly to occur. This is called an event Ej (j=1, 2, ...) as in the case of the foregoing two-dimensional drawing.

Renewal is made for the SPP at each occurrence of an event, while extending the aot along the edges of the figure A so that the entire figure A is covered, and the entry of the wire frame is completed. The type of Ej includes the break-through of Bz (surface of figure) by ait (see FIG. 15(c)) in this three-dimensional case, and the rest is identical to the two-dimensional case. This will be understood from the fact that space division of FIG. 6 (d) when seen from the Z direction appears identical to the two-dimensional case. By the entry of the wire frame, the space around the figure A is newly divided by a plane Bx which passes the vertex of the figure A is perpendicular to the X axis and a plane by which includes the vertex of the figure A and is parallel to the Z axis, and SPP is set for each of new spaces. These processings take place only in the neighboring space around the input figure, and it takes the order of $O(N°)$ except for special cases.

Next, development of the surface will be described. Entry of a wire frame is followed by the formation of surfaces. The surface development process for the figure A is implemented as shown in FIG. 15 (d). In the figure, the start point is selected at the end ai of X− on plane G of the figure A, and a partial plane aiT located on the G plane of the figure A and having a top line T perpendicular to the X-axis is developed while moving the top T from the X− end toward X+ so that SPP of the surrounding space around the aiT is renewed progressively. When the top line T moving toward the X+ direction has passed a polygonal line of the outer walls By and Bz of the space made by the existing figure, the topology of space division varies abruptly. This is called an event Ej (j=1, 2, ... ), and T immediately after the occurrence of Ej is named Tj. Vertex tables (characteristic point tables) are provided at intersections tjk (k=1, 2, ... ) of Tj and By/Bz, and SP constituting SPP of the surrounding space is set in these tables. The vertex tables are updated at each occurrence of an event Ej. Since the variation of topology of the space at an event Ej occurs only in the periphery of $t_{jk}$ related to the event Ej, maintenance for the vertex tables when the top line T has been moved can be done by the program which adds portion τj passing the event Ej at $T_{j-1}$ and deletes $τ_{j-1}$ as shown in FIG. 15 (e). Portions a and b in the figure have the same shape before and after the event Ej, and they can be used without change. Addition of τj is implemented as follows. As shown in FIG. 15 (e), line $t_{j,0}$ θ on the surface of the drawing A is extended along τj, and vertex tables are established at intersections with the existing space boundaries b3, b4, b5, etc. Subsequently, planes are formed on the X− side (expressed by providing separate SPP for each space on the Z+ and Z− sides of the figure A). This method can cope with events Ej in various shapes.

FIGS. 15 (f) and 15 (g) are examples of SPP connection before and after an event Ej. To find Ej+1 following the event Ej, the nearest (smallest X coordinate) of vertexes in the X+ direction of SPP originating from an edge making $t_{j,k}$ or $t_{j,k}$ is taken. When the top line T has been moved for the last event $E_{j}+1$, the developing process is complete.

The foregoing surface development is the process of the order of O(N°), since the entire process is closed in the neighboring space around the plane of the input figure A except for the special cases and unrelated to distant figures. In conclusion, all of vertex entry, wire framing and surface development are processes of O(N°), and initial generation for the overall SPF is expected to be as fast as O(N) when the special cases are ignored.

Next, insertion and addition of characteristic points will be described. In the overlaying process, graphic logic process, impingement process, etc., when it is intended to add or insert a specific characteristic point (or vertex) in a certain partial space, it is necessary to search for the space pointer pair representative of that partial space as described previously (FIG. 14 (e)) and form a new linkage relationship between it or its adjoining characteristic point and the specific characteristic point. For the formation of such linkage relationship, one method is to search space pointer pairs one by one, but it will take an excessive time. The search time can be reduced by the following method of setting a subsidiary characteristic point and searching for the space pointer pair in closest relation.

In the case of two-dimension, as seen in FIG. 16 (a), the space where a figure is placed has its coordinates controlled in a state of divided matrix-like blocks. At the center of each block of the geometrical space, characteristic points $g^1$, $g^2$, ..., bi, ..., gm (will be termed "guide post characteristic points" hereinafter) completely unrelated to the characteristic points in the geometrical space of the figure are set. A characteristic point table is provided for each of the subsidiary or guide post characteristic points $g^1$, $g^2$, ..., gi, ..., gm. For the characteristic point tables corresponding to the guide post characteristic point g1 or gm, a space pointer pair is set so that the g1 and gm relate to each other in such a manner. In case a figure exists in the geometrical space, space pointers are set between characteristic points of the figure and guide post characteristic points.

In searching for the space pointer pair representative of the partial space which includes the characteristic point ao to be added, guide post characteristic points $g^1$, g2, ..., gi, ..., gm are first searched basing on the coordinates of the characteristic point ao, and as a result the characteristic point gi which becomes the block including the coordinates of the characteristic point ao to be added is found. Subsequently, using the characteristic point gi as a start point, space pointer pair SPPao expressing the space including the characteristic point ao to be added is searched by the procedure shown in FIG. 14 (e). One of characteristic points to which SPPao is connected is named ko. Next, the space pointer pair SPPao is cut, and another space pointer pair SPPaIko for the characteristic point ao and the characteristic point ko is newly generated. In the same way, for another characteristic point ko' to which the SPPao is connected, a space pointer pair is generated in connection with the characteristic point ao.

In order to facilitate the search for guide post characteristic points near the characteristic point ao to be added or deleted, a guide post address table is established, although it is not limited to this. The guide post address table has memory areas which are accessed using data X1–X4 indicating the range in the X direction of the geometrical space and data Y1–Y4 indicating the range in the Y direction, as shown in FIG. 16 (a). Each memory area contains preset data indicative of the address of the characteristic point table for the guide post characteristic point. Although the geometrical space is divided into four in both X and Y axes for the easiness of explanation, it may be divided into arbitrary number in practice. More particularly, the guide post address table is used to obtain the space pointer pair for the guide post characteristic point gi from the coordinates (xo, yo) of one characteristic point ao, and thereafter the characteristic point ko for the real drawing in connection with the space pointer pair representative of the space in which the characteristic point ao is to be inserted is serached in the range of the space blocks for the characteristic point gi. The space pointer pair for guide post characteristic points are provided separately from the space pointer pair for characteristic points of the actual drawing, and it is paired with a space pointer of each characteristic point of another figure within the range of the block, although it is not limited to this. In case a certain number of figures are already set in SPF, no problem is imposed in using end points or characteristic points of these figures as guide posts.

In the case of a three-dimentional drawing, the geometrical space is divided into matrix-arranged blocks as shown in FIG. 16 (b), and the guide post characteristic point g1 or gm is set in each block. Accordingly, the processing for a three-dimensional drawing is identical to the case of a two-dimensional drawing.

In generating a space pointer pair, special conditions are applied to special figures and lines. One example is the case of the combination of lines such as seen in a polygonal graph. Problems imposed in handling figures such as polygonal graphs are equivalent to the problems of how to express the lines. A line is regarded to be a kind of edge of a figure, for example. The extremities of a polygonal graph are open, as opposed to edges of a figure such as a triangle, for example. Accordingly, each line constituting a polygonal graph is expressed by a space pointer pair established between the end points and an edge pointer pair. In the characteristic point tables corresponding to one end and another end of a polygonal graph, attribute data signifying the ends of the line is set.

In case two end points of a straight line or an edge of a figure have the same coordinate, it is necessary to retain the uniqueness of space modeling for making correspondence between partial spaces and space pointer pairs. On this account, if for example a line or edge perpendicular to the X-axis, as shown in FIG. 17 (a), exists, the line or edge is regarded as a tilt line. This assumption, however, is to be dealt with by the drawing processing program, and does not imply a change in the X coordinates which are set in the characteristic point table. Namely, if both end points of a line or edge are determined to have the same X coordinate as a result of reference to two characteristic point tables for the line or edge, the drawing processing program determines one end point having a larger y coordinate to be located more right or more left as shown in FIG. 17 (a). Similarly, a space pointer pair for the case of equal X coordinate is formed on the assumption that one of two points is located more right (or left) than the others as shown in FIG. 17 (b). In another case in which two lines have overlapping sections, they are assumed to be spaced out by a short distance as shown in FIG. 17 (c).

FIGS. 17 (d) and 17 (e) are diagrams explaining the special states of the edge pointer pair. These are examples of pairing by itself as a partner edge pointer. FIG. 17 (f) shows an example of the space pointer pair and edge pointer at the intersection. FIG. 17 (g) is a diagram explaining the formation of a space pointer pair when a figure partly includes a curve.

The similar states exist in a three-dimensional drawing. In the case of break-through drawing having a corner break-through point as shown in FIG. 18 (a), a characteristic point table as shown in FIG. 18 (b) is made. A three-plane intersecting relation results as shown in FIGS. 18 (c) and 18 (d).

In the case of the break-through drawing as shown in FIG. 18 (a), the edge pointer EPo expressing the front edge and the edge pointer EP2 expressing the rear edge inherently constitute a single edge. For facilitating the drawing process along the break-through edge, it is desirable to set pointers which point break-through edges with each other (termed penetration pointer hereinafter). Such a penetration pointer is symbolized by PEP in FIG. 18 (b). Since the EG block for a three-dimensional drawing has been shown in detail in FIG. 9 (b), FIG. 18 (b) is relatively simplified. In FIG. 18 (b), the pointer PEP of the EGo block is set in the RP field of the row at which the edge pointer EPj of the PEP of the EP2 block is set in the RP field of the row at which the edge pointer of the EGi block in FIG. 9 (b) is to be set. In the case of FIG. 18 (a), the edges EP1 and EP3 are not the break-through edges in a sense mentioned above. On this account, the attribute field for the break-through edge within the edge block is left vacant in the table of FIG. 18 (b). FIGS. 18 (c) and 18 (d) for three-plane intersection are arranged similarly to the foregoing case of two-plane intersection.

The motion of a figure, for the case of a two-dimensional drawing, is as shown in FIG. 19. It can be seen from the figure that the movement of a figure T results in a change in the space relationship only for the spaces shown by hatching. Accordingly, by expressing the space using such space pointer pairs as described above, the processing is confined in the range of neighboring spaces, and only data in the characteristic point table corresponding to the hatched spaces in the figure needs to be considered in the processing. The same is true for a three-dimensional drawing, which is processed with attention being paid to the neighboring spaces. This means that impingement detection and movement process for a drawing becomes an extemely simple process. Particularly, for a three-dimensional drawing, it is possible to process the impingement detection in the movement of a robot by loading the movement schedule of the robot in advance. It is of course possible to apply this principle to such a case of maze process in a two-dimensional drawing.

One of the important processes for three-dimensional drawings is the erasure of unseen surfaces. FIG. 20 is a diagram explaining the erasure of unseen surfaces. Through the matrix conversion for a three-dimensional drawing into a two-dimensional perspective drawing, unseen portions behind front visible portions can be deleted.

FIG. 20 shows the concept of three-dimensional display. In the unseen surface erasing process, overlap checking and display priority arbitration for a two-dimensional drawing projected on a screen are implemented on a two-dimensional screen SPF. Since SPF is capable of drawing process on a one-by-one basis, it is combined with the three-dimensional world SPF, and the processing speed can be enhanced dramatically by the visible space tracing method as will be described in the following.

FIG. 21 shows the principle of this method. In a three-dimensional SPF, the processing starts with a partial space $\Omega_o$ which includes the view point. Walls of (visible) partial spaces through which the view line originating from the view point has passed are perspectively transformed sequentially and subjected to overlap check on the screen SPF and visibility test for the drawing. Using the adjacent space search function of the SPF, spaces to be displayed are searched sequentially forwardly. In this case, based on the fact that a visible space is always contiguous to the other side of a visible transparent space and a space behind an opaque or invisible wall is unseen, only visible spaces are searched and invisible spaces are not, whereby the process efficiency can be enhanced incomparably as compared with the conventional method. This method has the following features.

(1) Continuous process on a three-dimensional SPF.

(2) High speed process for visible spaces only.

For example, in FIG. 20 when a house as a figure is seen from outside, the room arrangement, furniture, and the like are not searched. Invisible spaces out of the screen are not examined either, and therefore the efficiency is higher than the conventional clipping. The processing time is $O(N^o)$ except for special cases, and it is $O(n)$ where n denotes the number of visible spaces.

(3) Fast and arbitrary changes of the view point.

The conventional system implementing clipping after perspective transformation necessitates reprocessing for the entire drawing when the view point is changed, whereas the inventive system merely processes visible spaces which have been searched, and it is fast.

(4) High-speed pick mapping for three-dimensional drawings.

A figure on the screen designated by a stylus-pen, mouse, or the like can be searched at high speed on a two-dimensional SPF basis. A figure of three-dimensional world SPF can readily be identified by way of connection with the screen SPF with the pointer.

(5) Partial screen modification.

Only a modified portion can be rendered hidden-surface process by the screen SPF. Partial deletion of a drawing requires visible space tracing only for that portion.

(6) Easy vector-raster conversion for the screen.

The screen SPF takes logical AND between the drawing and the raster, and the result is directly outputted to an electrostatic plotter or the like.

(7) Special hardware such as a Z-buffer is not needed. Due to the entire software-based, versatile and high replanation design, there is no accuracy limit imposed by pixels, and the screen is not disturbed by zooming. Hidden-surface erasure output is possible even for a large screen such as a plotter.

FIG. 22 is a diagram used to explain the formation of space pointer pairs for a two-dimensional drawing when drawing data is so enormous as to be stored entirely in the main storage. In this case, the drawing space is divided into several regions. In boundary sections of regions, there are inserted boundary lines which are invisible for the user, and space pointers are arranged so that they are processed within the range of each region. This scheme is also applicable to three-dimensional drawings.

An effective method for partial processing is pattern recognition. For example, in searching for the figure R which is a square with a triangle included therein, it can easily be found by searching space pointers sequentially and determining an included figure in the adjacent drawing process. Two-dimensional and three-dimensional drawings can be dealt with identically also in this aspect.

Figure 24:
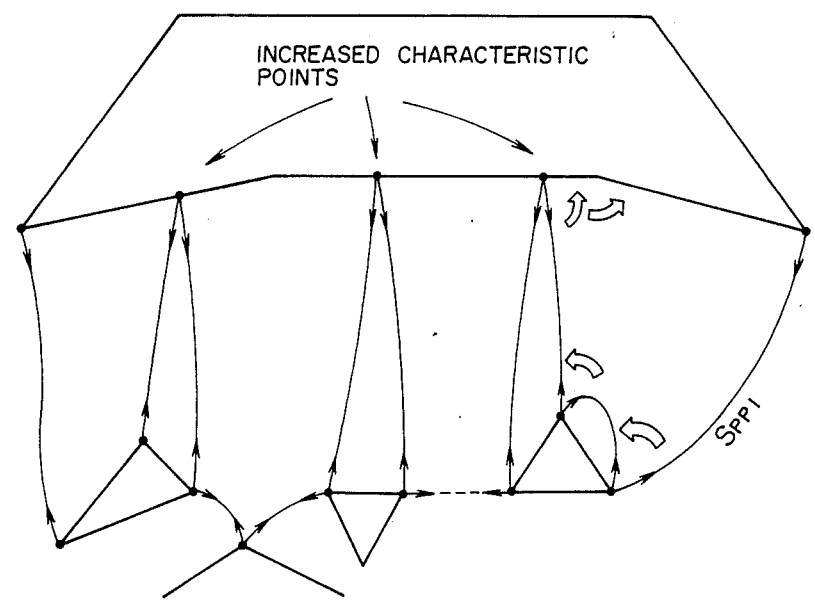
FIG. 24 is an explanatory diagram of an example in which vertices are added for space pointer pairs to minimize the time required for the rotary search processing in the two-dimensional representation.
Figure 25A:
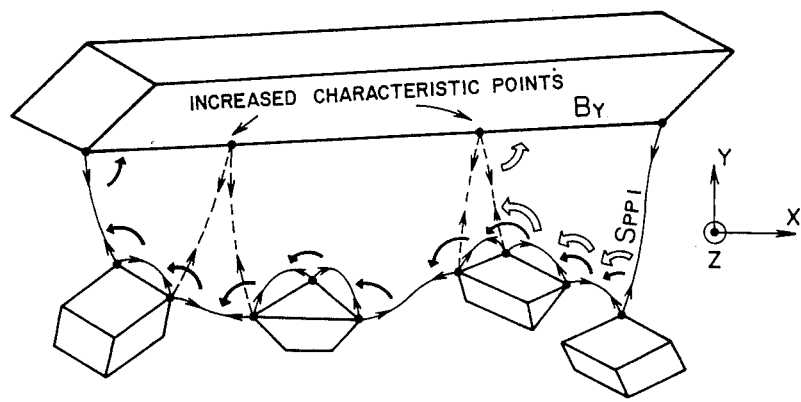
FIGS. 25 (a) and 25 (b) are schematic diagrams respectively showing relationships of space point pairs in a case where edges are added in the three-dimensional representation.
Figure 25B:
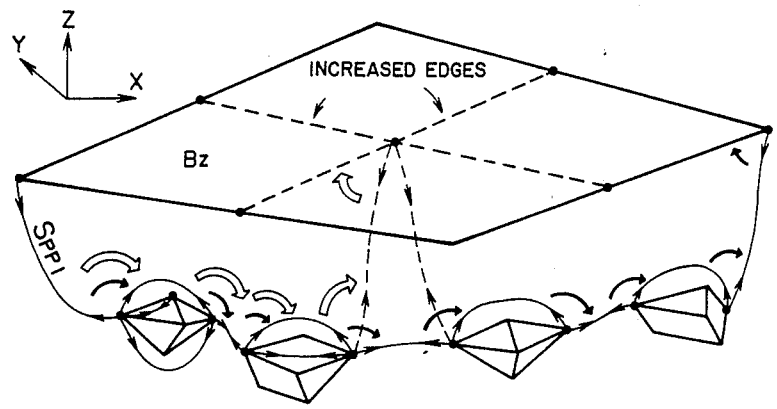

FIG. 24 (a) shows the case of two-dimensional space division in which characteristic vertexes are selected and the space is divided selectively, instead of using all vertexes of the figure. The concept is identical to the case of three-dimensional drawing as shown in FIGS. 25 (a) and 25 (b).

Figure 26:
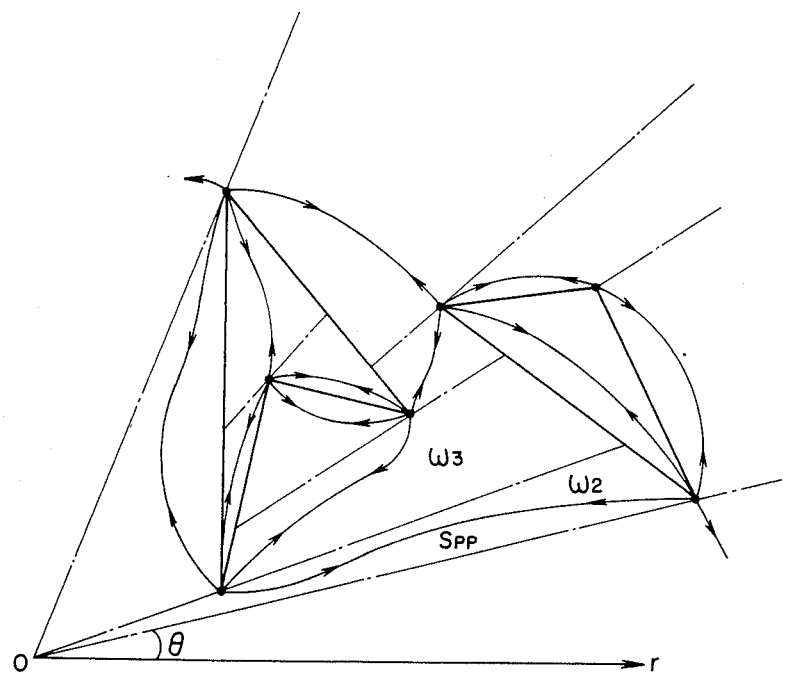
FIG. 26 is a diagram for explaining a case where the space partition is effected in the polar coordinate system.

FIG. 26 (b) shows an example in which the polar coordinate system is adopted for a two-dimensional space, and it can also be applicable to a three-dimensional space. Space modeling is independent of the coordinate system.

Figure 27:
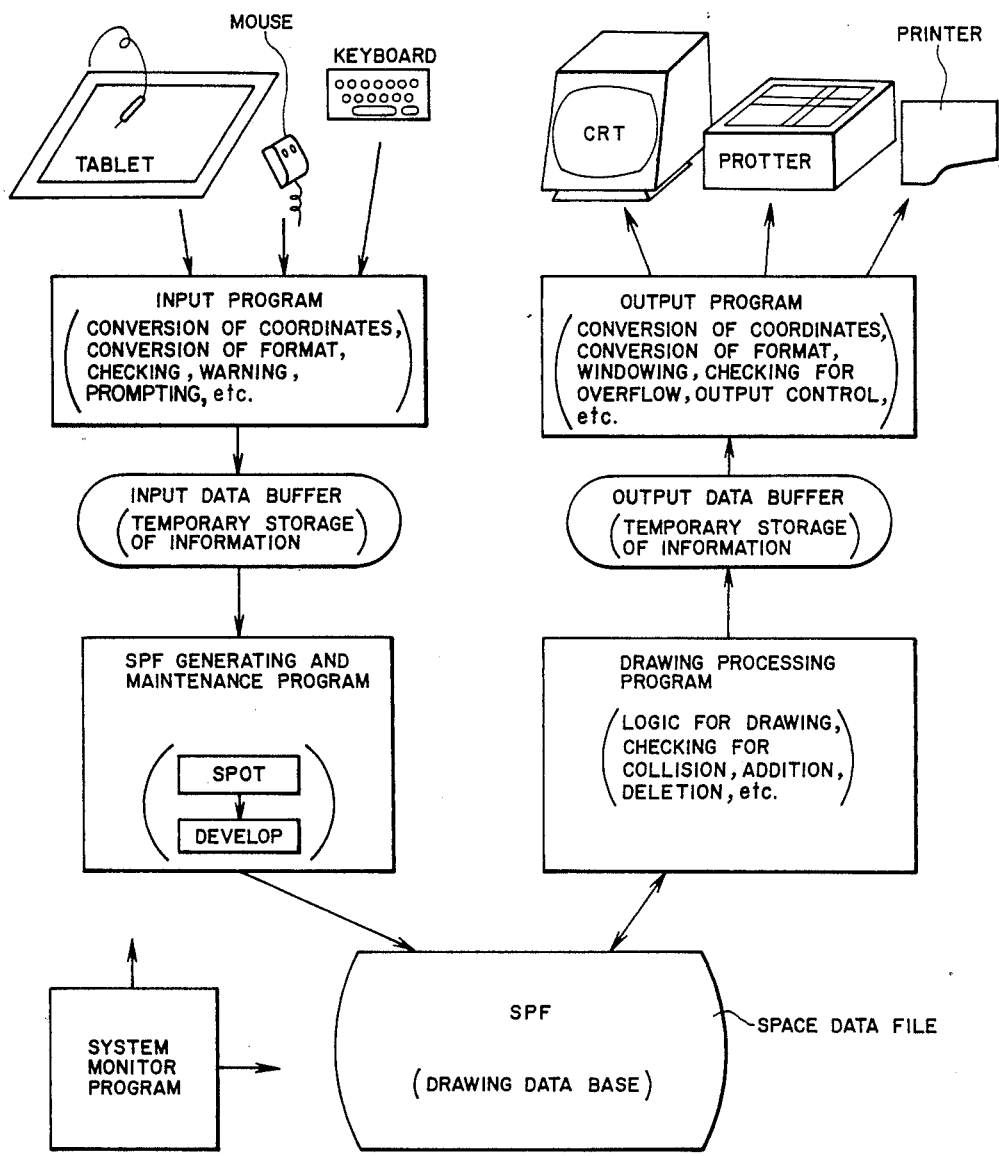
FIG. 27 is a block diagram of a geometric processing system in another embodiment of the present invention.

As shown in FIG. 27 (c), it is possible to process a drawing using a processing system incorporating a tablet, mouse, plotter and printer.

As has been described above, the inventive drawing processing is applicable extensively such as to the layout design of LSI devices, optimal route finding, robot motion control and impingement prevention.

The space pointer pair of a figure is not confined to the vertex, but any characteristic point of the figure is allowed. Although in the foregoing embodiments a space is divided by flat planes, boundaries may be made using slant planes, curving planes or the like, and the coordinate system can be chosen arbitrarily among three-dimension or n-dimension.

Although the embodiments have been described mainly for the drawing, the similar processing is applicable to video images through the direct development of characteristic points on the images and the translation into a drawing.

Although in the foregoing embodiments the drawing processing program is separated from space data processing, it is also possible to provide the whole data in the space data format and to produce drawing data from the space data.

Although in the foregoing embodiments a special space data processor is provided, it is of course possible to accomplish its process as a function of the central processing unit.

As will be appreciated from the above description of this invention, a space in which a figure is placed is divided by lines passing through the characteristic points of the figure, divisional spaces are defined by pairs of characteristic points (e.g., pointer pairs) on both sides of the spaces, and relational data indicative of the relationship of each characteristic point to other characteristic point (e.g., pointer pair) is set, whereby search of partial spaces is made possible by the vertex pair and processing of drawing, with attention being paid to a portion, becomes possible. In consequence, search of consecutive figures or overlapping figures can be processed efficiently, and high-speed drawing process is realized.

For the data processing on a figure placed in a stereographic coordinate system in which the figure is expressed by at least a first, second and third variables, the coordinate system is divided by parallel planes passing through the characteristic points of the figure with respect to the axis corresponding to the first variable, and characteristic point information is generated in correspondence to the characteristic points on both sides of the space between the parallel planes. A set of characteristic point information and adjoining one or more than one set of characteristic point information are generated with a linkage relationship, and a space between the parallel planes is defined based on the linkage relationship. This enables search of a partial stereographic space by the characteristic point pair, and the drawing process with attention being paid to a portion is made possible. In consequence, a search of consecutive figures and overlapping stereographic figures and a process of hidden surfaces can be done efficiently, whereby a high-speed three-dimensional drawing process is realized.

I claim:

1. A drawing processing system for processing drawing data representing figures having characteristic points in a geometrical space on the basis of space data including position information indicating the position of a plurality of partial spaces which divide said geometrical space, including spaces inside and outside of a plurality of figures therein, comprising:
   means for recognizing said plurality of partial spaces of said geometric space on the basis of imaginary division lines each passing through a respective characteristic point of said plurality of figures;
   means for generating said position information which defines each of said partial spaces by use of characteristic points of respective imaginary division lines which form the sides of a partial space, each characteristic point being used in common to identify partial spaces which are adjacent to each other;
   means for holding said position information for each of said characteristic points as said space data; and
   means, which responds to operator inputs, for accessing said holding means to obtain portions of drawing data located in partial spaces identified by said space data and for performing draw processings on said portions of drawing data.

2. A drawing processing system according to claim 1, wherein said characteristic points comprise vertexes of said figures.

3. A drawing processing system according to claim 2, wherein said geometrical space comprises a two-dimensional geometrical space, and said imaginary division lines extend in the direction of one coordinate axis of a two-dimensional coordinate system.

4. A drawing processing system according to claim 3, wherein said two-dimensional coordinate system comprises an X-Y coordinate system.

5. A drawing processing system according to claim 2, wherein said space comprises identification code data for vertexes corresponding to said data.

6. A drawing processing system according to claim 2, wherein said space data comprises identification code data identifying the position of vertexes on the imaginary division lines defining said parallel spaces.

7. A drawing processing system according to claim 2, wherein said space data comprises pointer information indicative of the position of data for a vertex, edge information for edges of a figure, and coordinate information of vertexes.

8. A drawing processing system according to claim 2, wherein said space data comprises pointer information indicative of the position of data for a vertex, edge information for edges of a figure, coordinate information for vertexes, and attribute information indicative of attributes of said partial spaces.

9. A drawing processing system according to claim 8, wherein said pointer information, edge information, coordinate information and attrubute information are set in tables in said holding means correspondence to respective vertexes.

10. A drawing processing system according to claim 9, wherein each set of said information is set in said table in an order corresponding to the order of reference made sequentially by turning a corresponding vertex in a certain direction.

11. A drawing processing system according to claim 8, wherein said attribute information comprises attribute information related to each overlapping figure.

12. A drawing processing system comprising:
  data holding means for holding space data which identifies partial spaces inside and outside of a plurality of figures within a geometric space which is divided into said plurality of partial spaces by imaginary division lines passing through characteristic points of said figures, said space data having characteristic point information corresponding to each characteristic point, said characteristic point information being formed as a set of two characteristic points, each characteristic point being used in common to identify partial spaces which are adjacent to each other; and
  means, which is coupled to said holding means and which responds to operator input, for accessing said holding means to obtain a portion of said space data and for performing draw processings on said portions of space data.

13. A drawing processing system according to claim 12, wherein each set of characteristic point information comprises a pointer for one characteristic point and a pointer for at least one other characteristic point adjacent to the first-mentioned characteristic point to indicate a position where the other characteristic point exists.

14. A drawing processing system according to claim 13, wherein said characteristic points comprise vertexes of said figure.

15. A drawing processing system according to claim 14, wherein said geometrical space comprises a two-dimensional coordinate system, said imaginary division lines extending along one coordinate axis of said two-dimensional coordinate system.

16. A drawing processing system according to claim 15, wherein said two-dimensional coordinate system comprises an X-Y coordinate system.

17. A drawing processing system according to claim 16, wherein said characteristic point information comprises identification code data for each corresponding vertex, pointers for edges of said figures, and coordinate information indicative of vertexes.

18. A drawing processing system according to claim 16, wherein said characteristic point information comprises identification code data for each corresponding vertex, pointers for edges of said figures, coordinate information indicative of vertexes, and attribute information indicative of attributes of said partial spaces.

19. A drawing processing system according to claim 18, wherein each set of said characteristic point information is set in said holding means in a table corresponding to each vertex.

20. A drawing processing system comprising:
  data holding means for holding space data which identifies partial spaces inside and outside of a plurality of figures within a three-dimensional geometrical space which is divided into a plurality of partial spaces by imaginary division planes which pass through characteristic points of said figures and are parallel to one coordinate axis, each partial space being defined by sets of characteristic point information corresponding to characteristic points disposed on respective sides of said partial space, each characteristic point being used in common to identify partial spaces which are adjacent to each other; and
  means, which is coupled to said holding means and which responds to operator input, for accessing said holding means to obtain portions of said space data and for performing draw processings on said portions of space data.

21. A drawing processing system according to claim 20, wherein said each set of said characteristic point information comprises pointers, said linkage relationship being formed by the pointing to each other of a pointer of characteristic point information corresponding to one characteristic point and a pointer of characteristic point information corresponding to at least one other characteristic point adjacent to the first-mentioned characteristic point.

22. A drawing processing system according to claim 21, wherein said characteristic points comprise vertexes a figure.

23. A drawing processing system according to claim 22, wherein said three-dimensional coordinate system comprises an X-Y-Z coordinate system.

24. A drawing processing system according to claim 23, wherein characteristic identification data for corresponding vertexes, said pointers, and point information comprises plane pointers for planes of said figure, edge pointers for edges of said figure, and coordinate information indicative of coordinates of vertexes.

25. A drawing processing system according to claim 23, wherein said characteristic point information comprises identification data for vertexes, said pointers, plane pointers for planes of said figure, edge pointers for edges of said figure, coordinate information indicative of coordinates of vertexes, and attribute information indicative of at least one attribute of said partial spaces and figure surfaces.

26. A drawing processing system according to claim 25, wherein said characteristic point information is set in said holding means in tables, each table corresponding to one vertex divided into blocks in correspondence to edges extending to said vertex, information set in each block having a relation to partial spaces on both sides of a figure surface constituting said edges.

27. A drawing processing system for processing drawing data representing figures having characteristic points in a geometrical space on the basis of space data including position information indicating the position of a plurality of partial spaces which divide said geometrical space, including spaces inside and outside of a plurality of figures therein, comprising:
  means for recognizing said plurality of partial spaces of said geometrical space on the basis of imaginary division lines each passing through a respective characteristic point of said plurality of figures;
  means for generating said position information which defines each of said partial space using characteristic points of respective imaginary division lines which form the sides of a partial space, each characteristic point being used to identify partial spaces which are adjacent to each other;

means for combining said position information with data related to at least a portion of at least one figure and position information for each characteristic point to form said space data;

means coupled to said combining means for holding said space data; and means, which responds to operator input, for accessing said holding means to obtain portions of drawing data located in partial spaces identified by said space data and for performing draw processings on said portions of drawing data.

28. A method of processing drawing data in a drawing processing system, in which the drawing data represents figures having characteristic points in a geometrical space, on the basis space data including position information indicating the position of a plurality of partial spaces which divide said geometrical space, including spaces inside and outside of a plurality of figures therein, comprising the steps of:

dividing said geometrical space into said plurality of partial spaces using imaginary division lines each passing through a respective characteristic point of said plurality of figures;

generating position information in the form of a pointer pair for each partial space with each pointer pair pointing to a pair of characteristic points of respective imaginary division lines which form the sides of a partial space, and such that each characteristic point is used to identify partial spaces which are adjacent to each other;

storing said pointer pairs forming said position information in a memory of said drawing processing system;

storing information including coordinate information for each characteristic point in said memory of said drawing processing system; and accessing said memory to obtain portions of drawing data and draw processing only said portions of drawing data located in partial spaces identified by selected pointer pairs in combination with said information including coordinate information for the characteristic points of selected partial areas, whereby the draw processing of the portions of drawing data for said geometric space may be effected at high speed by processing only the selected partial areas thereof.

29. A drawing processing method according to claim 28, wherein said characteristic points comprise vertexes of said figures.

* * * * *